(12) United States Patent
Melamud et al.

(10) Patent No.: US 12,707,162 B2
(45) Date of Patent: Aug. 11, 2026

(54) PHOTOSITE CIRCUIT USING SWITCHED OPERATIONAL PHASES

(71) Applicant: TriEye Ltd., Tel Aviv (IL)

(72) Inventors: Nadav Melamud, Tel Aviv (IL); Avraham Bakal, Tel Aviv (IL); Omer Kapach, Tel Aviv (IL); Uriel Levy, Tel Aviv (IL)

(73) Assignee: TriEye Ltd., Tel Aviv (IL)

( * ) Notice: Subject to any disclaimer, the term of this patent is extended or adjusted under 35 U.S.C. 154(b) by 43 days.

(21) Appl. No.: 18/900,994

(22) Filed: Sep. 30, 2024

(65) Prior Publication Data

US 2025/0030957 A1 Jan. 23, 2025

Related U.S. Application Data

(63) Continuation of application No. 18/699,933, filed as application No. PCT/IB2021/059635 on Oct. 19, 2021, now Pat. No. 12,133,004.

(51) Int. Cl.

| | |
|---|---|
| ***H04N 25/50*** | (2023.01) |
| ***H04N 25/63*** | (2023.01) |
| ***H04N 25/77*** | (2023.01) |
| ***H04N 25/78*** | (2023.01) |

(52) U.S. Cl.

CPC ............. *H04N 25/50* (2023.01); *H04N 25/63* (2023.01); *H04N 25/77* (2023.01); *H04N 25/78* (2023.01)

(58) Field of Classification Search

None

See application file for complete search history.

(56) References Cited

U.S. PATENT DOCUMENTS

| | | | | |
|---|---|---|---|---|
| 7,436,496 | B2 | 10/2008 | Kawahito | |
| 8,334,496 | B2 | 12/2012 | Guellec et al. | |
| 2006/0192938 | A1 | 8/2006 | Kawahito | |
| 2010/0301193 | A1 | 12/2010 | Guellec et al. | |
| 2012/0268727 | A1 * | 10/2012 | Schrey | G01C 3/08 250/214 R |

(Continued)

FOREIGN PATENT DOCUMENTS

| | | | |
|---|---|---|---|
| CN | 204666814 | U | 9/2015 |
| JP | 2004294420 | A | 10/2004 |
| JP | 2005121398 | A | 5/2005 |

(Continued)

OTHER PUBLICATIONS

Extended Search Report in related EP patent application 25153192.7, dated Apr. 14, 2025.

(Continued)

*Primary Examiner* — Mark T Monk

(74) *Attorney, Agent, or Firm* — Nathan & Associates Patent Agents Ltd.; Menachem Nathan

(57) ABSTRACT

Techniques are disclosed to accurately measure the integration or accumulation of charge measured by photosite readout circuitry due to a photodiode generated current, which is generated by a photodiode as a result of impinging light reflected onto the photodiode that forms part of an imaging sensor. The techniques described herein address shortcomings of photosite operation by using a series of sequential switching states that function to maintain the charge accumulated during idle sampling times between active detection windows.

21 Claims, 19 Drawing Sheets

(56) References Cited

U.S. PATENT DOCUMENTS

2018/0063450 A1 3/2018 Murao

FOREIGN PATENT DOCUMENTS

JP 2011514709 A 5/2011
JP 2020020612 A 2/2020

OTHER PUBLICATIONS

International Search Report and Written Opinion in related PCT application PCT/IB2021/059635, dated Jan. 28, 2022.
Office Action in related JP patent application 2024-523183, dated Sep. 10, 2024.
Office Action in related Japan Application 2024-203817, dated Jul. 29, 2025.

* cited by examiner

Figures 10, 12:
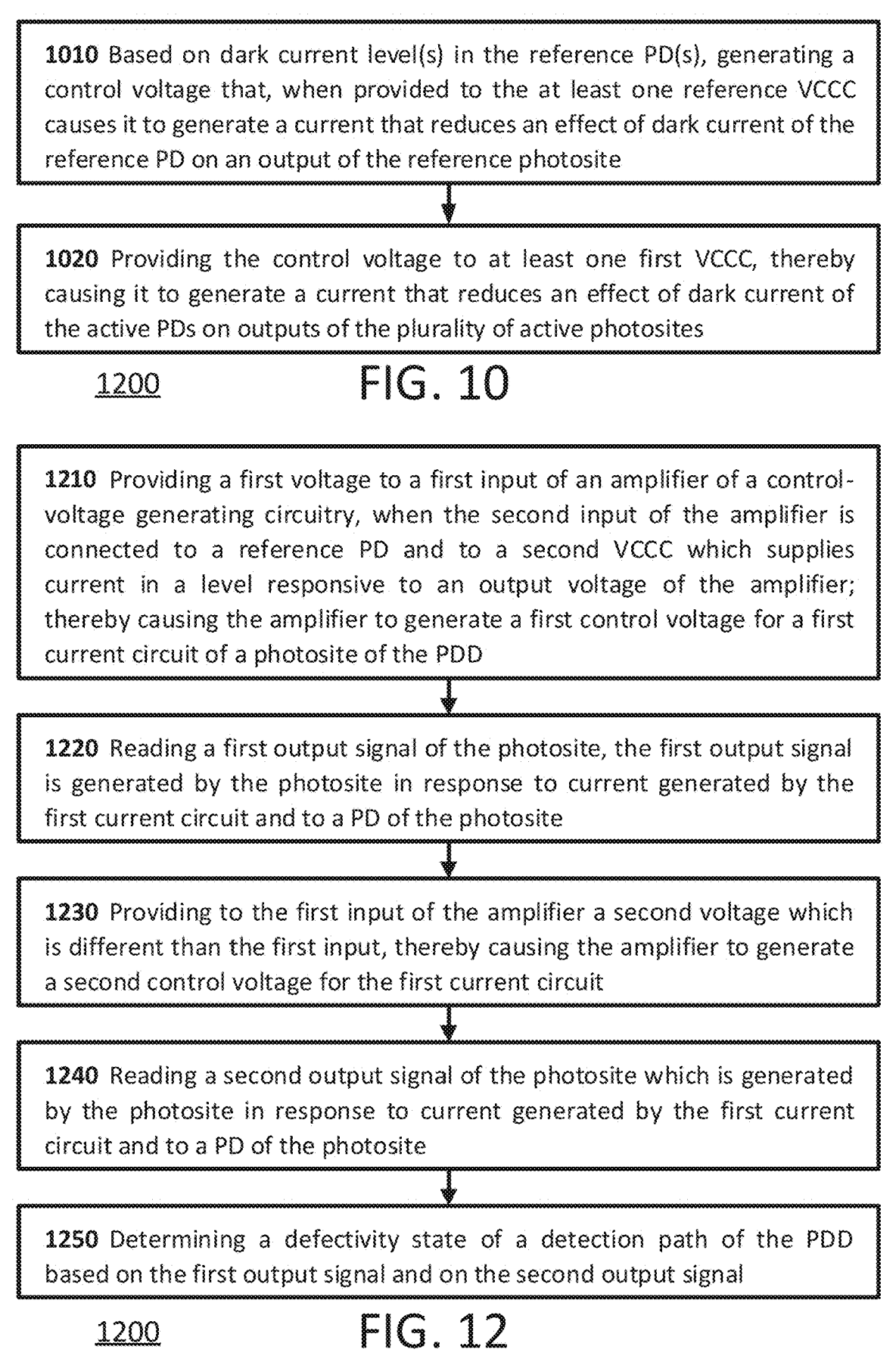

1010 Based on dark current level(s) in the reference PD(s), generating a control voltage that, when provided to the at least one reference VCCC causes it to generate a current that reduces an effect of dark current of the reference PD on an output of the reference photosite

1020 Providing the control voltage to at least one first VCCC, thereby causing it to generate a current that reduces an effect of dark current of the active PDs on outputs of the plurality of active photosites

1210 Providing a first voltage to a first input of an amplifier of a control-voltage generating circuitry, when the second input of the amplifier is connected to a reference PD and to a second VCCC which supplies current in a level responsive to an output voltage of the amplifier; thereby causing the amplifier to generate a first control voltage for a first current circuit of a photosite of the PDD

1220 Reading a first output signal of the photosite, the first output signal is generated by the photosite in response to current generated by the first current circuit and to a PD of the photosite

1230 Providing to the first input of the amplifier a second voltage which is different than the first input, thereby causing the amplifier to generate a second control voltage for the first current circuit

1240 Reading a second output signal of the photosite which is generated by the photosite in response to current generated by the first current circuit and to a PD of the photosite

1250 Determining a defectivity state of a detection path of the PDD based on the first output signal and on the second output signal

When a PDD operates in temperature $T_1$:

1110 Determining a first control voltage based on dark current of at least one reference PD of the PDD 1112 Providing the first control voltage to a first voltage controlled current circuit which is coupled to at least one active PD of an active photosite of the PDD, thereby causing the first voltage controlled current circuit to impose a first dark-current countering current in the active photosite 1114 Generating by the active PD a first detection current in response to: (a) light impinging of the active PD originating in an object in a field of view of the PDD, and (b) dark current generated by the active PD 1116 Outputting by the active photosite a first detection signal whose magnitude is smaller than the first detection current in response to the first detection current and to the first dark-current countering current, thereby compensating effect of dark current on the first detection signal 1118 Image the FOV based on multiple first detection signals

When the PDD operates in temperature $T_2$ higher than $T_1$ by at least 10°C

1120 Determining a second control voltage based on dark current of at least one reference PD of the PDD 1122 Providing the second control voltage to the first voltage controlled current circuit, thereby causing the first voltage controlled current circuit to impose in the active photosite a second dark-current countering current having magnitude which is larger than a magnitude of the first dark-current countering current by a factor of at least two 1124 Generating by the active PD a second detection current in response to: (a) light impinging of the active PD originating in the object, and (b) dark current generated by the active PD 1126 Outputting by the active photosite a second detection signal whose magnitude is smaller than the second detection current in response to the second detection current and to the second dark-current countering current, thereby compensating effect of dark current on the second detection signal 1128 Image the FOV based on multiple first detection signals

PHOTOSITE CIRCUIT USING SWITCHED OPERATIONAL PHASES

CROSS-REFERENCE TO RELATED APPLICATIONS

The present application is a continuation from U.S. patent application Ser. No. 18/699,933 filed Apr. 10, 2024 (now allowed), which was a 371 application from international patent application PCT/IB2021/059635 filed Oct. 19, 2021.

TECHNICAL FIELD

Aspects described herein generally relate to imaging sensors and, more particularly, to imaging sensors that perform imaging by detecting light impinging on photodiodes reflected from an illuminated target.

BACKGROUND

Photodetecting devices may include photosites. A photosite includes photosite readout circuitry coupled to a photodiode (PD) for detecting impinging light and a capacitance for storing charge provided by the photodiode. The capacitance may be implemented as at least one dedicated capacitor and/or using parasitic capacitance of the PD, transistors, and/or other components of the photosite.

Dark current is a well-known phenomenon, and when referring to photodiodes it pertains to an electric current that flows through the photodiode even when no photons are entering the device. Dark current in PDs may result from random generation of electrons and holes within a depletion region of the PD.

In some cases, there is a need to provide photosites with PDs characterized by a relatively high dark current, while implementing capacitors (which may include discrete components, parasitic capacitance, etc.) of limited size. In some cases, there is a need to provide photosites with PDs characterized by a relatively high dark current while reducing effects of the dark current on an output detection signal of the photosite. In photosites characterized by high dark current accumulation, there is a need for, and it would be advantageous to have, reduced dark current accumulation and associated effects.

Moreover, and with respect to the photosite readout circuitry, an image may be collected using electrical signals that are provided by the photodiode readout circuity. These electrical signals are the result of an aggregation of charge that is accumulated on one or more capacitors in response to several illumination pulses impinging on the PD over corresponding detection timeframes. However, during idle times between such illumination pulses, the PD may continue to generate current (e.g. due to ambient light and/or inherent dark current). The additional current generated in this way may contribute to an additional charge on the capacitor(s) of the photosite readout circuitry, which may adversely impact the accuracy of the read-out value.

Thus, current photodetecting devices have various drawbacks, some of which are discussed above.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary aspects of the present disclosure will be described with reference to the accompanying drawings. The drawing in which an element first appears is typically indicated by the leftmost digit(s) in the corresponding reference number.

Non-limiting examples of embodiments disclosed herein are described below with reference to figures attached hereto that are listed following this paragraph. Identical structures, elements or parts that appear in more than one figure may be labeled with a same numeral in all the figures in which they appear. The drawings and descriptions are meant to illuminate and clarify embodiments disclosed herein, and should not be considered limiting in any way. All the drawings show devices or flow charts in accordance with examples of the presently disclosed subject matter. In the drawings.

Figure 7:
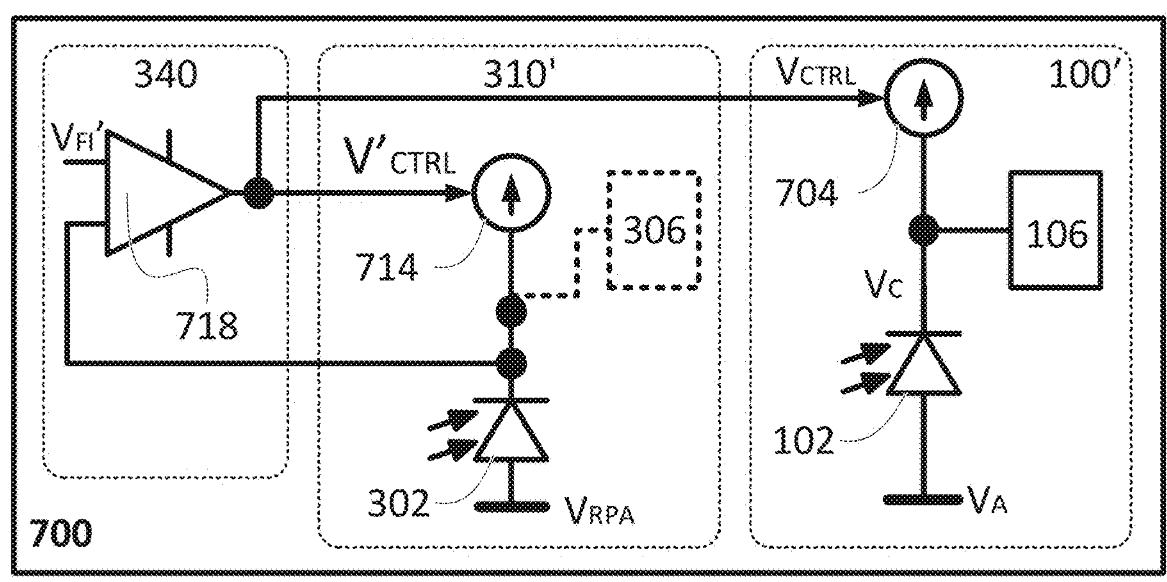
Figure 8:
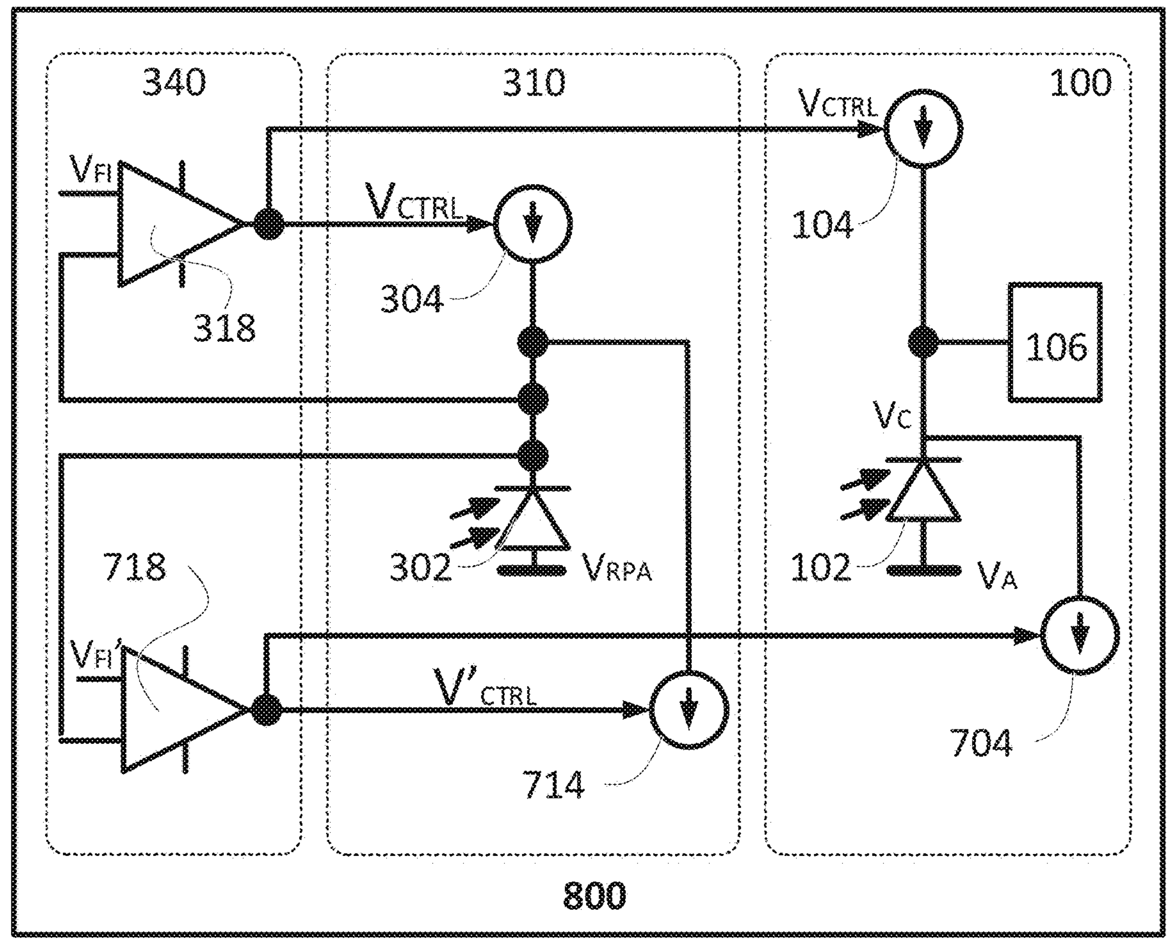
Figure 9:
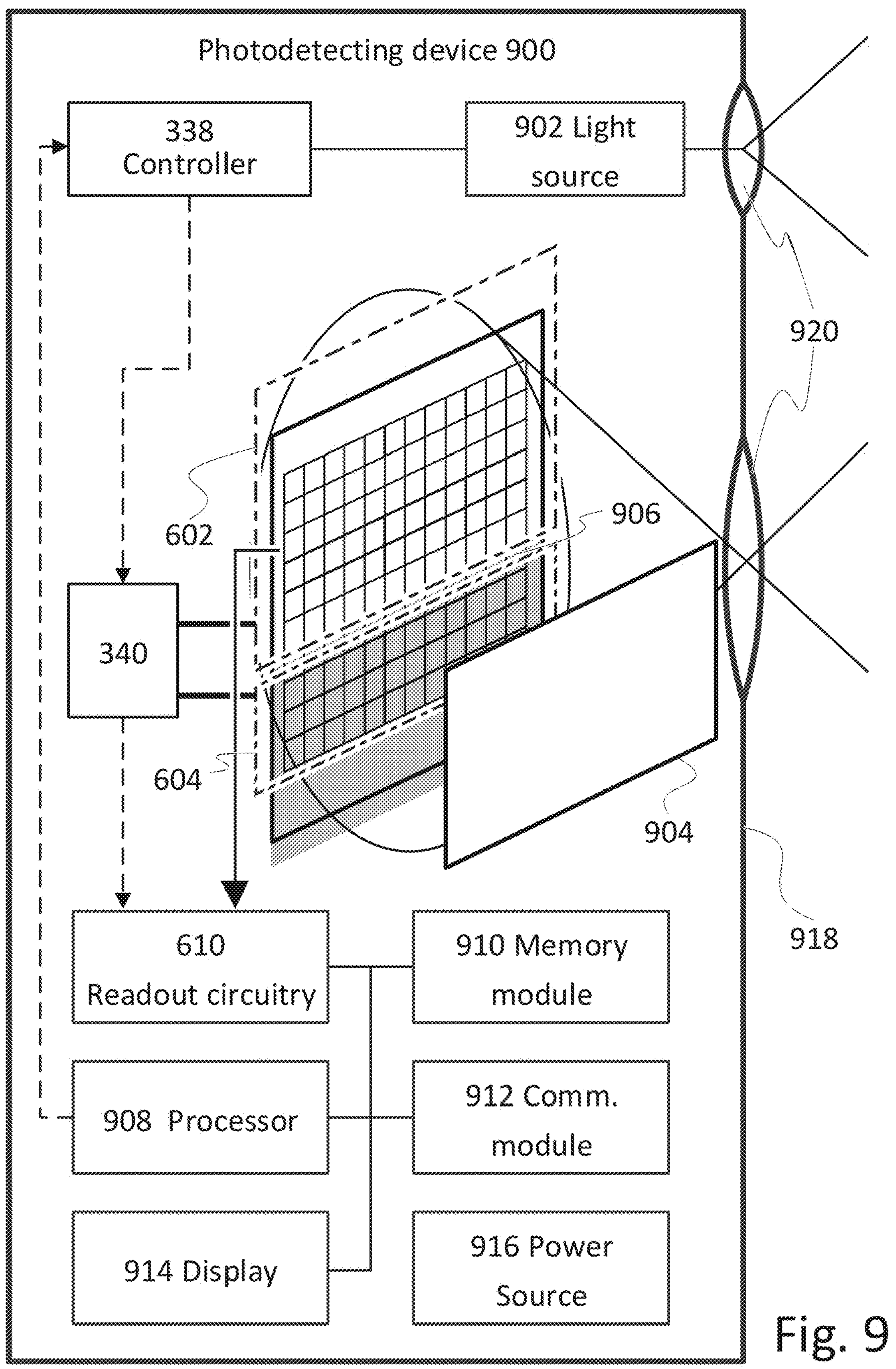
Figure 13:
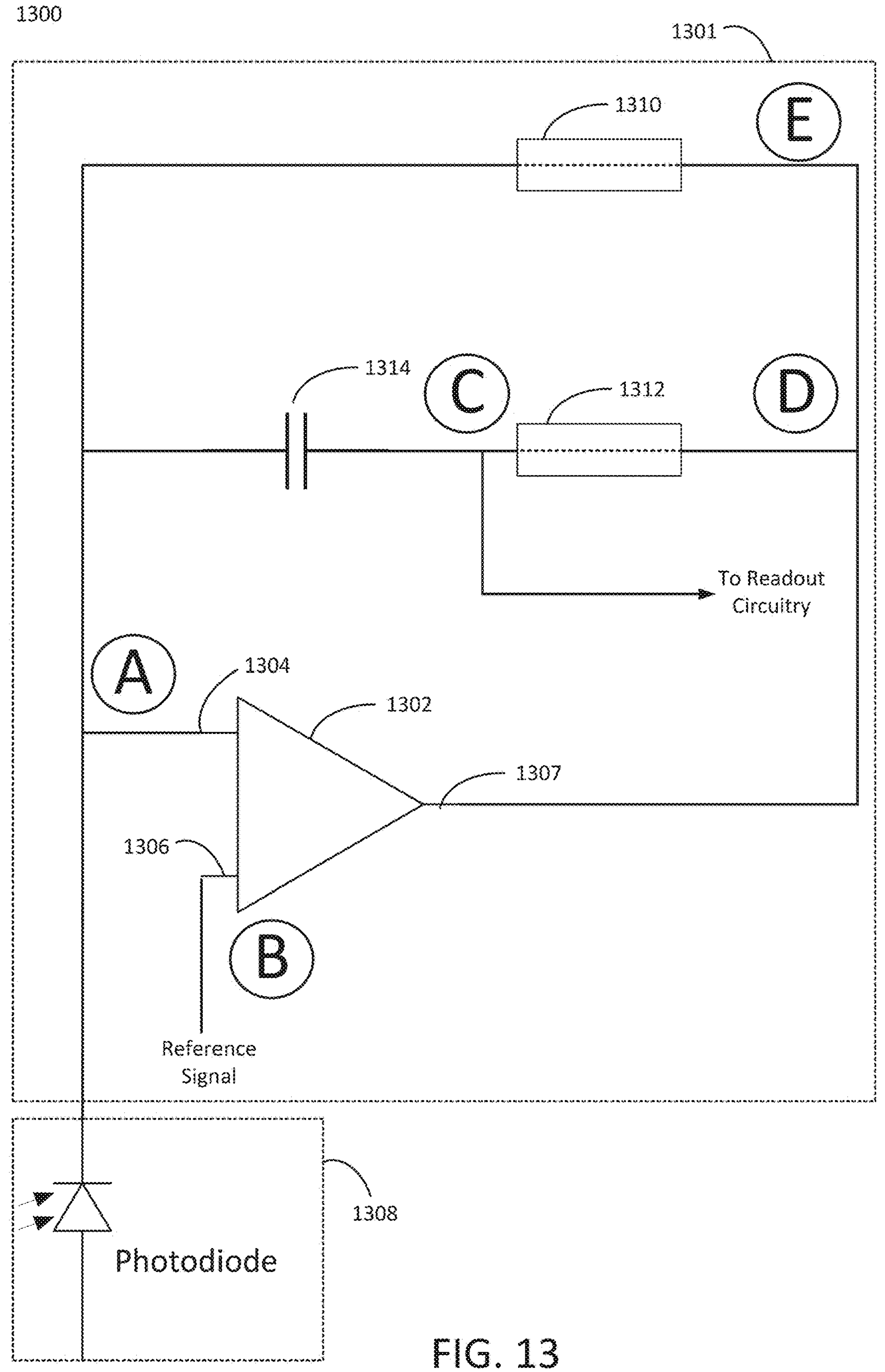
Figure 15:
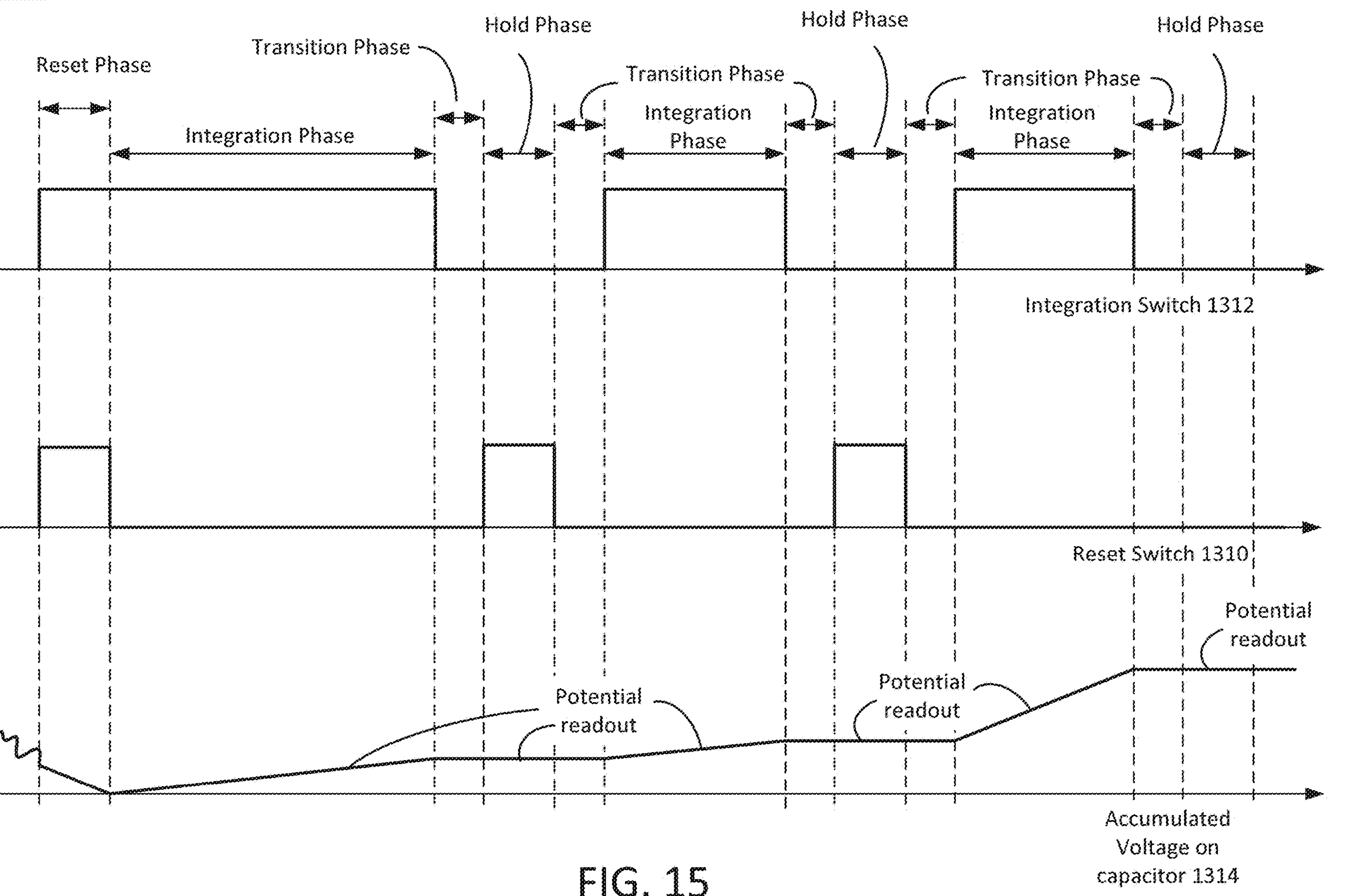
Figure 16:
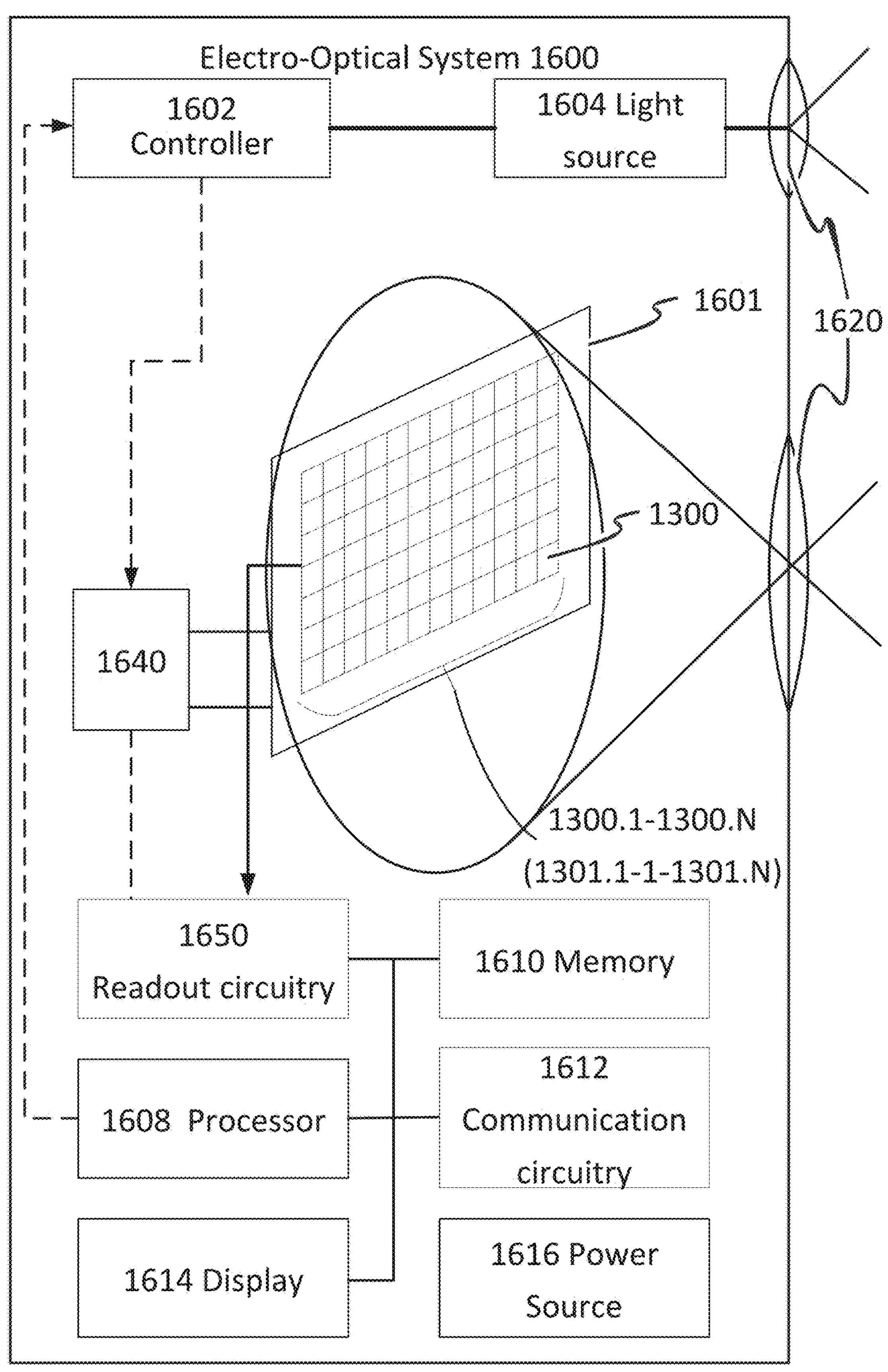
Figure 17:
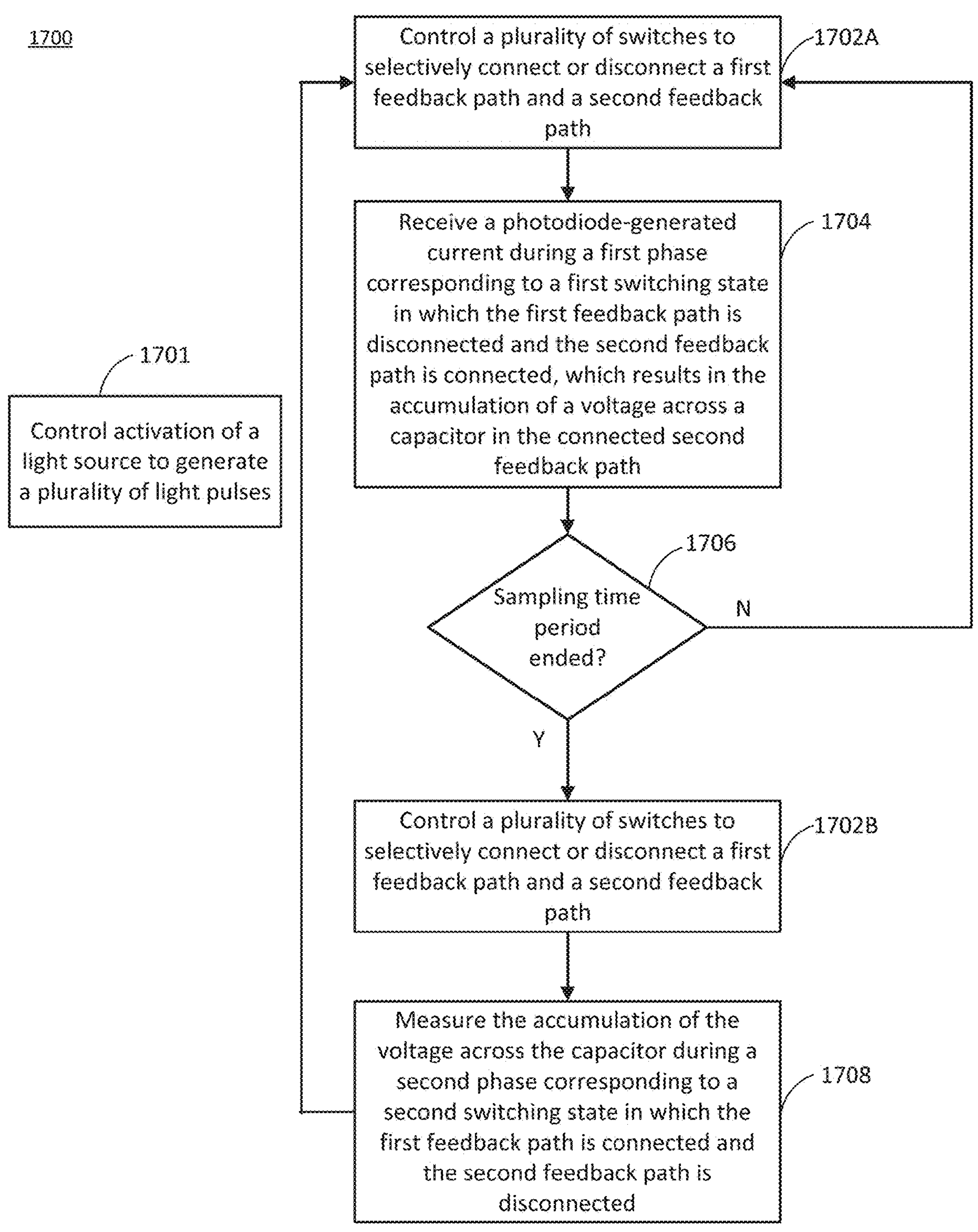
Figure 18:
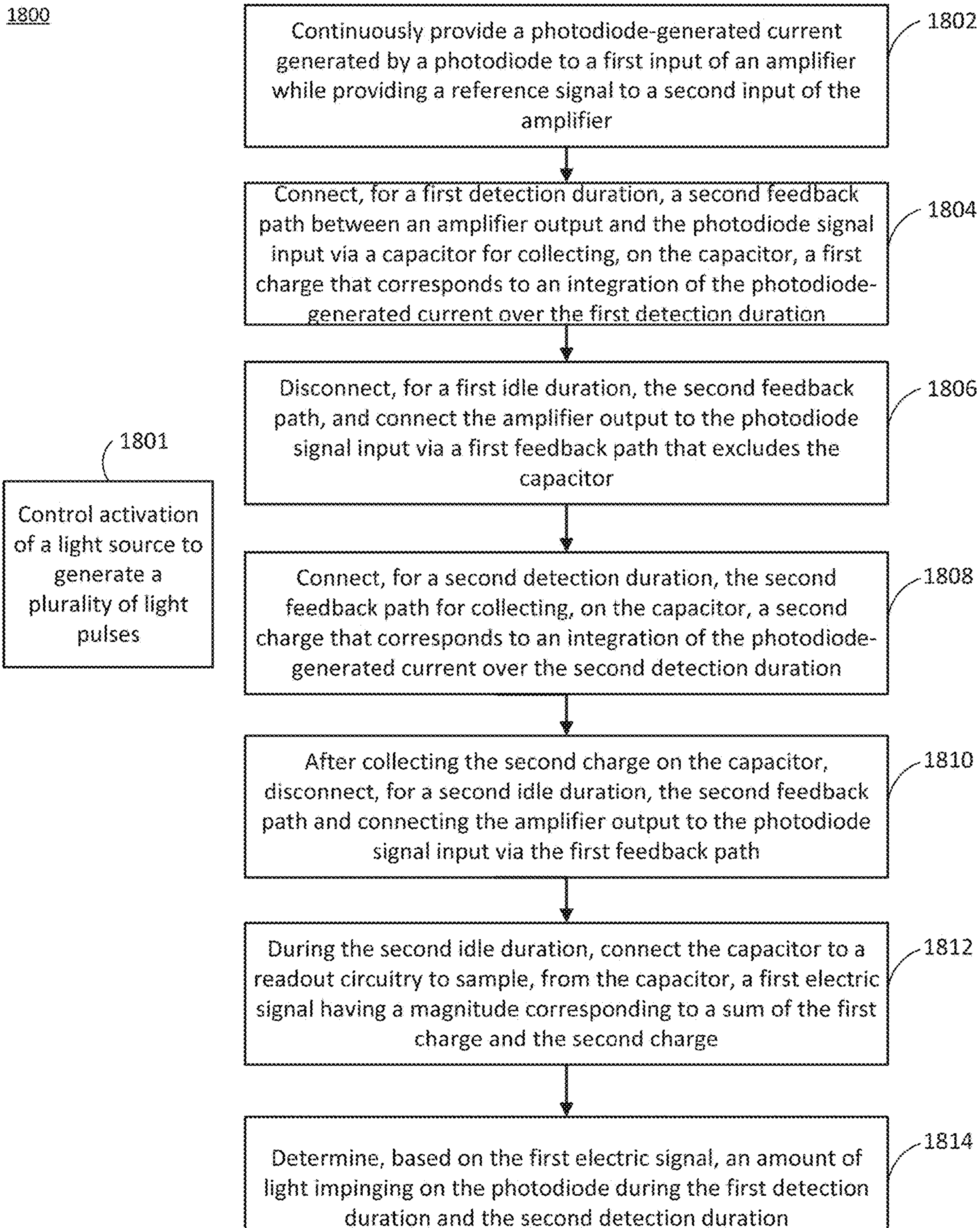

FIGS. 7, and 8 show PDDs, each comprising a photosite and circuitry operable to reduce effects of dark current;

FIG. 9 illustrates a PDD which includes optics, a processor, and additional components;

FIG. 10 is a flow chart illustrating a method for compensating for dark current in a photodetector;

FIG. 11 is a flow chart illustrating a method for testing a photodetector;

FIG. 12 is a flow chart illustrating method 1200 for testing a photodetecting device, in accordance with examples of the presently disclosed subject matter;

FIG. 13 illustrates an example photosite readout circuitry architecture, in accordance with embodiments of the present disclosure;

FIGS. 14A-14D illustrate example switching states of the photosite readout circuitry architecture as shown in FIG. 13, in accordance with embodiments of the present disclosure;

FIG. 15 illustrates an example of operational phases during a sampling time period that includes several sampling windows, in accordance with embodiments of the present disclosure;

FIG. 16 illustrates an electro-optical system, in accordance with embodiments of the present disclosure;

FIG. 17 illustrates a process flow, in accordance with one or more embodiments of the present disclosure; and FIG. 18 illustrates a process flow, in accordance with one or more embodiments of the present disclosure.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

The embodiments as described herein are divided into separate Sections for ease of explanation. However, these embodiments may be separately utilized or combined with one another. The first Section is directed to addressing issues related to photodetecting devices (PDDs) and, in particular, to the elimination or reduction of dark currents in PDDs. The second Section is directed to addressing issues related to inaccuracies in the readout values of photosite readout circuitry, which are introduced via the additional aggregation of charge during the idle time between adjacent light pulses due to the PD generating current during these idle time periods.

Section I—Circuitry for Compensating for Dark Current

A. Summary

In various exemplary embodiments, there are provided photodetecting devices (PDDs), comprising: an active photosite comprising an active photodiode (PD); a reference photosite comprising a reference PD; a first voltage controlled current circuit that includes a voltage-controlled current source or a voltage-controlled current sink, the first voltage controlled current circuit coupled to the active PD; and control-voltage generating circuitry coupled to the active voltage controlled current circuit and to the reference photosite and used to provide to the voltage controlled current circuit a control voltage having a voltage level that is responsive to dark current of the reference PD, to reduce an effect of dark current of the active PD on an output of the active photosite.

In some embodiments, the control-voltage generating circuitry comprises an amplifier for providing the control voltage.

In some embodiments, the voltage controlled current circuit comprises a current source.

In some embodiments, the voltage controlled current circuit comprises a current sink.

In some embodiments, the PDD comprises a reference voltage controlled current circuit that includes a voltage-controlled current source or a voltage-controlled current sink, the reference voltage controlled current circuit coupled to the reference PD, wherein a first input of the amplifier is supplied with a first input voltage and wherein a second input of the amplifier is electrically coupled between the reference PD and the reference voltage controlled current circuit.

In some embodiments, the first voltage controlled current circuit and the reference voltage controlled current circuit are coupled to an output of the amplifier, and the amplifier continuously reduces a difference between an output of the reference voltage controlled circuit and the first input voltage, thereby generating the control voltage.

In some embodiments, the control-voltage generating circuitry includes an amplifier and wherein the voltage controlled current circuit includes a current sink coupled to the amplifier.

In some embodiments, a PDD comprises a plurality of active photosites, each active photosite comprising an active PD, a plurality of reference photosites, each reference photosite comprising a plurality of reference PDs, a plurality of first voltage controlled current circuits, each first voltage controlled current circuit coupled to at least one of the active PDs, and a plurality of reference voltage controlled current circuits, each reference voltage controlled current circuit coupled to at least one of the reference PDs, wherein the second input of the amplifier is electrically coupled to each of the reference PDs, and wherein the control voltage is supplied to each of the plurality of first voltage controlled current circuits.

In some embodiments, each active photosite comprises a corresponding voltage controlled current circuit In some embodiments, different active PDs concurrently generate different levels of dark current, wherein different reference PDs concurrently generate different levels of dark current, and wherein the control-voltage generating circuitry provides to the different active PDs a same control voltage based on averaging of the differing dark currents of the reference PDs.

In some embodiments, a PDD comprises a plurality of first voltage controlled current circuits, the plurality of first voltage controlled current circuits comprising at least one voltage-controlled current source collectively coupled to each active photosite and at least one voltage-controlled current sink collectively coupled to each active photosite, and wherein the control-voltage generating circuitry includes: (a) a first amplifier coupled to the at least one voltage-controlled current source for providing at a first time a first control voltage to the plurality of active photosites, a second amplifier coupled to the at least one voltage-controlled current sink for providing at a second time a second control voltage to the plurality of active photosites, and switching circuitry for selecting between providing of the first control voltage and providing of the second control voltage.

In some embodiments, a PDD comprises a controller for providing the first input voltage, wherein the first input voltage has a level that is determined corresponding to a bias on the active PD.

In some embodiments, the controller provides the first input voltage such that a bias on the reference PD is substantially the same as a bias on the active PD.

In some embodiments, a PDD comprises a physical barrier preventing light from a field of view of the PDD from reaching the reference PDs.

In some embodiments, a PDD comprises a plurality of photosites and a controller for setting at least one photosite of the plurality of photosites to operate as an active photosite or as a reference photosite.

In some embodiments, a PDD comprises a plurality of active photosites, each comprising an active PD, a plurality of reference photosites, each comprising a plurality of reference PDs, a plurality of first voltage controlled current circuits, each coupled to at least one of the active PDs, and a plurality of reference voltage controlled current circuits, each coupled to at least one of the reference PDs, wherein when the PDD operates at a first temperature, the control-voltage generating circuitry provides to the voltage controlled current circuit a first control voltage for providing a current at a first level in response to dark currents of the plurality of reference PDs to reduce effect of dark currents of the active PDs on output of the active photosites, wherein when the PDD operates at a second temperature higher than the first temperature, the control-voltage generating circuitry provides to the voltage controlled current circuit a second control voltage for providing a current at a second level in response to dark currents of the plurality of reference PDs to reduce effect of dark currents of the active PDs on output of the active photosites, wherein the second level is larger in magnitude than the first level.

In some embodiments, a PDD comprises a plurality of active photosites, each comprising an active PD, a plurality of reference photosites, each comprising a plurality of reference PDs, a plurality of first voltage controlled current circuits, each coupled to at least one of the active PDs, a plurality of reference voltage controlled current circuits, each coupled to at least one of the reference PDs, optics for directing light from a field of view of the PDD to the plurality photosite, a power source for providing power to the active photosites, to the reference photosites, and to the amplifier, readout circuitry for providing detection information in response to detection signals of the active photosites, a processor for processing the detection information to provide an image of at least object in the field of view, and a memory module for storing at least one of the detection information and the detection signals.

In some embodiments, reference PDs are copies of the active PDs.

In some embodiments, a PDD comprises "sample and hold" circuitry.

In some embodiments, an active PD generates a detection signal in response to impinging light and to dark current generated by the active PD, wherein a capacitance of the active photosite collects over a sampling duration charge resulting from the detection signal and from current of the voltage controlled current circuit, wherein integration of the detection signal over the sampling period would exceed the capacitance of the active photosite.

B. Details Regarding Example Embodiments

Figure 1:
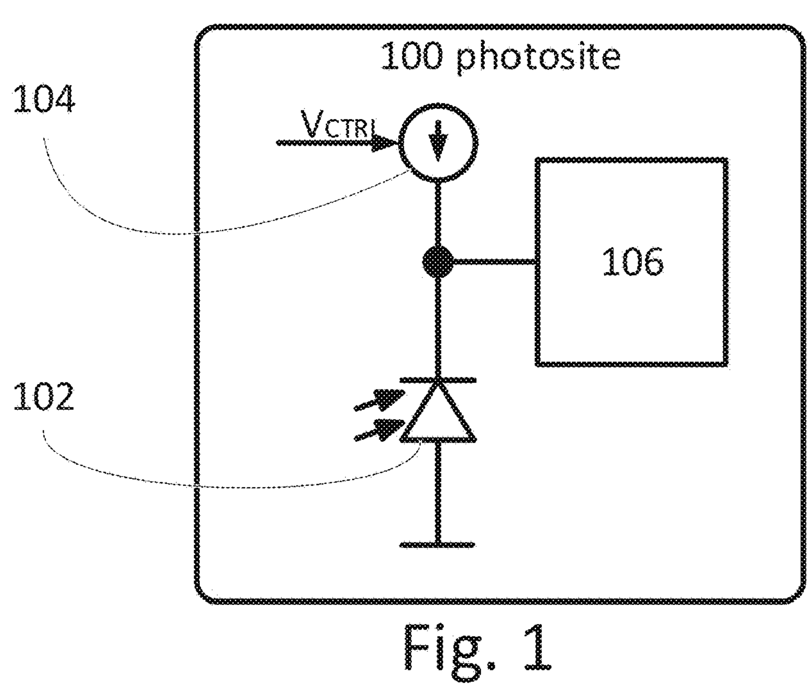
FIG. 1 shows schematically a photosite that includes a photodiode controlled by a voltage-controlled current source.

FIG. 1 schematically shows an example of a photosite numbered 100 that includes a photodetector (e.g. PD) 102 controlled by a voltage-controlled current source (VCCS) 104. It is noted that voltage-controlled current source 104 may optionally be external to photosite 100 (e.g., if a single VCCS 104 provides current to several photosites). VCCS 104 is a dependent current source that delivers a current which is proportional to a control voltage (denoted VCTRL in the diagram). The photosites and PDDs disclosed in the present disclosure may include any suitable type of VCCS. Other ("additional") components of photosite 100 (not shown) are collectively represented by a general box 106. When used for sensing, photosites like photosite 100 and photodetectors like photodetector 102 may also be referred to below as "active" or "non-reference" photosites/photodetectors (differentiating from photosites and photodetectors which are used as input for determining the control voltage for the current source).

Figure 2:
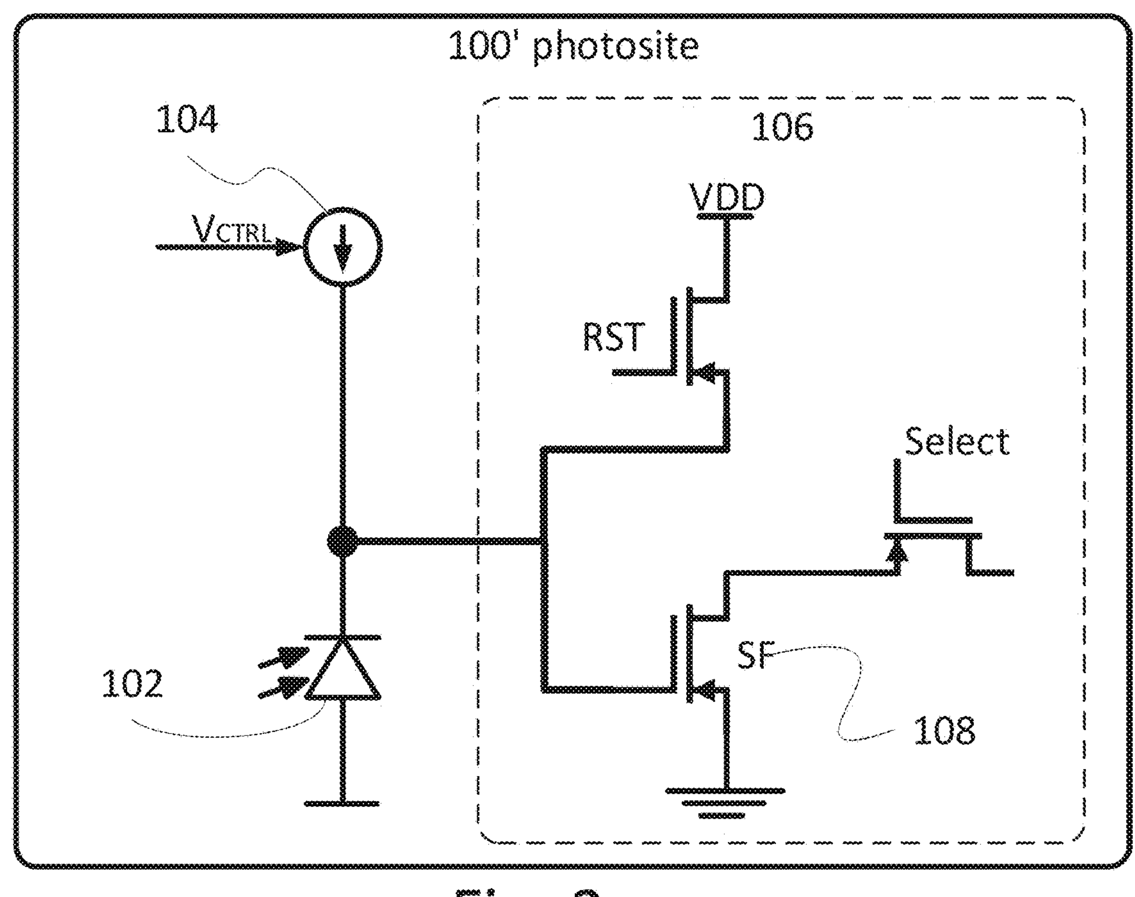
FIG. 2 shows schematically a photosite that includes a photodiode controlled by a voltage-controlled current source in a "3T" structure.

FIG. 2 shows schematically another example of a photosite numbered 100', which is an example of photosite 100. In photosite 100', other components 106 are in the form of a "3T" (three-transistor) structure. Any other suitable circuitry may serve as additional components 106.

CCS 104 may be used to provide a current of the same magnitude but of opposite direction to the dark current generated by PD 102, thereby cancelling the dark current (or at least reducing it). This is especially useful if PD 102 is characterized by high dark current. This way, the charge which flows from the photodiode to a capacitance (which, as aforementioned, may be provided by one or more capacitors, by parasitic capacitance of the photosite, or by a combination thereof) and the charge that results from the dark current can be canceled out. Notably, providing by VCCS 104 of a current which is substantially equal in magnitude to the dark current means that the provided current does not cancel out the actual electric signal generated by PD 102 as a result of detected light impinging on PD 102.

Figure 3A:
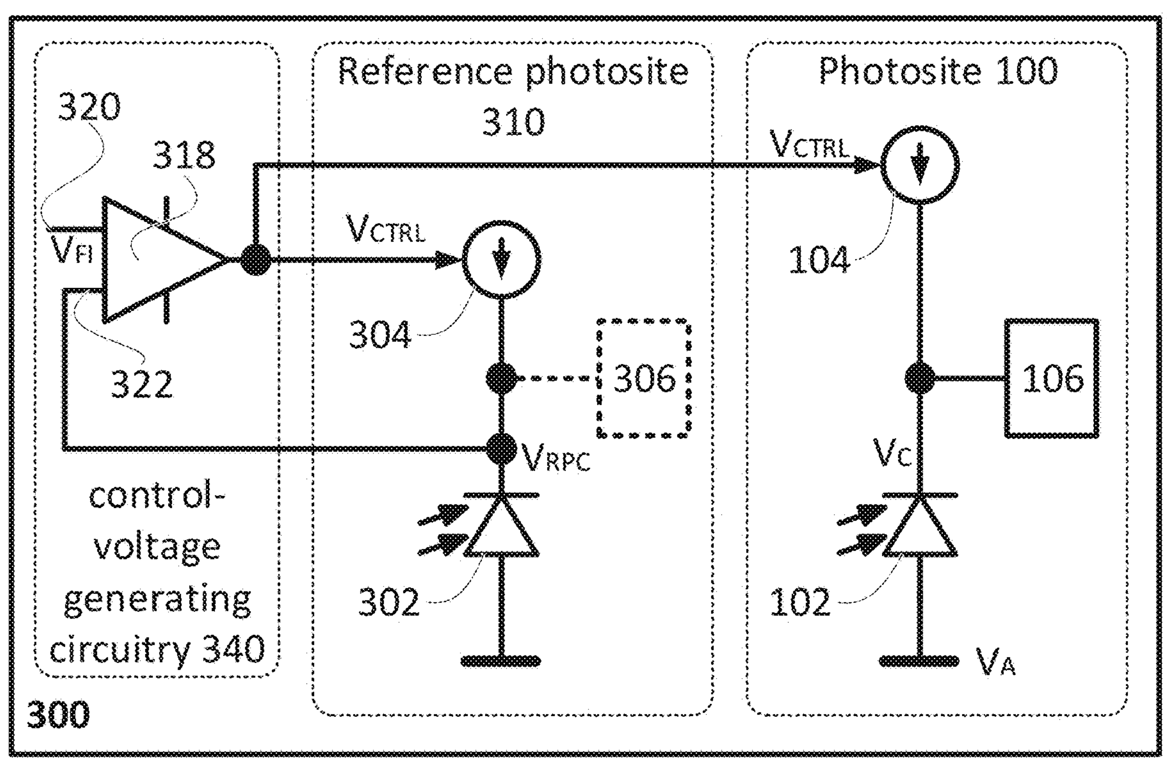
FIGS. 3A and 3B show a PDD comprising a photosite and circuitry operable to reduce effects of dark current.

FIG. 3A shows a photodetecting device 300 in accordance with examples of the presently disclosed subject matter. PDD 300 includes circuitry that can controllably match the current issued by VCCS 104 to the dark current generated by PD 102, even in cases in which the generated dark current is not constant (changes with time). It is noted that the level of dark current generated by PD 102 may depend on different parameters such as operational temperature and the bias applied to the photodiode (which may also change from time to time).

The reducing of the dark current effects within photosite 100 as done by PDD 300 (and not in later stages of signal processing, either analog or digital), enable utilization of a relatively small capacitance, without saturating the capacitance or reducing the linearity of its response to the collected charge.

PDD 300 comprises a photosite 100 for detecting impinging light, and a reference photosite 310 whose outputs are used by additional circuitry (discussed below) for reducing or eliminating effects of dark current in photosite 100. Like photosite 100 (and 100'), reference photosite 310 includes a PD 302, a VCCS 304 and, optionally, additional circuitry ("other components", collectively denoted 306). In some examples, reference photosite 310 of PDD 300 may be identical to photosite 100 of PDD 300. Optionally, any one or more components of photosite 310 may be identical to a corresponding component of photosite 100. For example, PD 302 may be substantially identical to PD 102. For example, VCCS 304 may be identical to VCCS 104. Optionally, any one or more components of photosite 310 may differ from those of photosites 100 (e.g., photodiodes, current source, additional circuitry). It is noted that substantially identical components of photosite 100 and of photosite 310 (e.g., photodiodes, current source, additional circuitry) may be operated in different operational conditions. For example, different biases may be applied to PDs 102 and 302. For example, different components of additional components 106 and 306 may be operated using different parameters, or selectively connected/disconnected, even when their structure is substantially identical. For the sake of simplicity and clarity, components of photosite 310 are numbered with numerals 302 (for the PD), 304 (for the VCCS) and 306 (for the additional circuitry), without implying that this indicates such components are different from components 102, 104 and 106.

In some examples, reference additional circuitry 306 may be omitted or disconnected, so as to not affect the determination of the dark current. PD 102 may operate at one of: reverse bias, forward bias, zero bias, or selectively between any two or three of the above biases (e.g., controlled by a controller such as controller 338 discussed below). PD 302 may operate at one of: reverse bias, forward bias, zero bias, or selectively between any two or three of the above biases (e.g., controlled by a controller such as controller 338 discussed below). PDs 102 and 302 may operate under substantially the same bias (e.g., about −5V, about 0V, about +0.7V), bus this is not necessarily so (e.g., when testing photodetecting device 300, as discussed below in greater detail). Optionally, a single photosite of PDD 300 may operate at some times as photosite 100 (detecting light from a field of view (FOV) of PDD 300) while in other time as photosite 310 (whose detection signal outputs are used for determining a control voltage for a voltage-controlled current source VCCS of another photosite 100 of the photodetecting device). Optionally, the roles of the "active" photosite used for detecting impinging light and of the reference photosite may be exchanged. PDD 300 further comprises a control-voltage generating circuitry 340 which includes at least amplifier 318 and electrical connections to multiple photosites of PDD 300. Amplifier 318 has at least two inputs: first input 320 and second input 322. First input 320 of amplifier 318 is supplied with a first-input voltage (VFI) which may be directly controlled by controller (implemented on PDD 300, on an external system, or in combination thereof), or derived from other voltages in the system (which may, in turn, be controlled by the controller). Second input 322 of amplifier 318 is connected to the cathode of PD 302 (of reference photosite 310).

In a first use case example, PD 102 is maintained at a working bias, between a first voltage (also referred to as "anode voltage", denoted VA) and a second voltage (also referred to as "cathode voltage", denoted VC). The anode voltage may be directly controlled by the controller (implemented on PDD 300, on an external system, or in combination thereof), or derived from other voltages in the system (which may, in turn, be controlled by the controller). The cathode voltage may be directly controlled by the controller (implemented on PDD 300, on an external system, or in combination thereof), or derived from other voltages in the system (which may, in turn, be controlled by the controller). Each of the anode voltage VA and the cathode voltage VC may or may not be kept constant in time. For example, VA may be provided by a constant source (e.g., via a pad, from an external controller). VC may be substantially constant or changing with time, depending on the implementation. For example, when using a 3T structure for photosite 100, VC changes with time, e.g., due to operation of additional components 106 and/or to current from PD 102. VC may optionally be determined/controlled/affected by additional components 106 (and not by the reference circuit).

VCCS 104 is used to provide (feed) a current to the cathode end of PD 102 to counter dark current generated by PD 102. It is noted that at other times, VCCS 104 may feed other current in order to achieve other ends (e.g., for calibrating or testing photodetecting device 300). The level of the current generated by VCCS 104 is controlled in response to an output voltage of amplifier 318. The control voltage for controlling VCCS 104, denoted VCTRL, may be identical to an output voltage of amplifier 318 (as illustrated). Alternatively, VCTRL may be derived from the output voltage of amplifier 318 (e.g., due to resistance or impedance between the output of amplifier 318 and VCCS 104.

In order to cancel out (or at least reduce) the effect of the dark current of PD 102 on the output signal of photosite 100, PDD 300 may subject PD 302 to substantially the same bias to which PD 102 is subjected. For example, subjecting PD 302 and PD 102 to the same bias may be used when PD 302 is substantially identical to PD 102. One way to apply the same bias to both PDs (102 and 302) is to apply voltage VA to the anode of PD 302 (where the voltage applied is denoted VRPA, RPA standing for "reference photodiode anode"), and to apply voltage VC to the cathode of PD 302 (where the voltage applied is denoted VRPC, RPC standing for "reference photodiode cathode"). Another way of applying the same bias is apply $VRPA=VA+\Delta V$ to the anode of PD 302 and $VRPC=VC+\Delta V$ to the cathode of PD 302. Optionally, anode voltage VA, reference anode voltage VRPA, or both may be provided by an external source (e.g., via a PCB to which PDD 300 is connected).

Figure 3B:
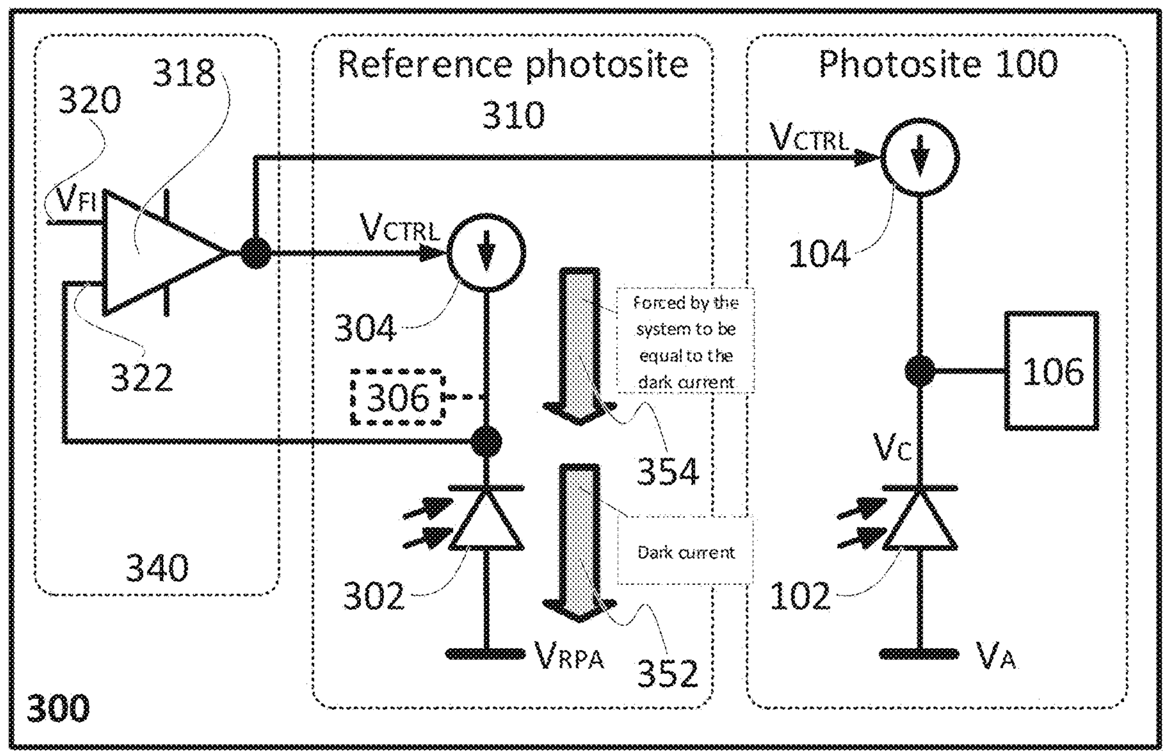

As mentioned, first input 320 of amplifier 318 is supplied with first-input voltage VFI. Second input 322 of amplifier 318 is connected to the cathode of PD 302. Operation of amplifier 318 reduces differences in voltage between its two inputs (320 and 322), thereby bringing the voltage on second input 322 towards the same controlled voltage which is applied to the first-input (VFI). Refer now to FIG. 3B, in which the dark current over PD 302 (hereinbelow denoted DCReference) is represented by an arrow 352 (the illustrated circuit is identical to that of FIG. 3A). The current over PD 302 is equal to the dark current of PD 102 in the case PD 102 is kept in the dark during that time. PDD 300 (or any system component connected or adjacent to it) may block light to PD 302, so it is kept in the dark. The blocking may be by a physical barrier (e.g., opaque barrier), by optics (e.g., diverting lenses), by electronic shutter, and so on. In the explanation below it is assumed that all current on PD 302 is dark current generated by PD 302. Alternatively, if PD 302 is subjected to light (e.g., low levels of known stray light in the system), a current source may be implemented to offset the known light-originating signal, or the first-input voltage VFI may be amended to compensate (at least partly) for the stray illumination. The barrier, optics, or other dedicated components intended to keep light away from PD 302 may be implemented on the wafer-level (on the same wafer from which PDD 300 is made), may be connected to that wafer (e.g., using adhesive), may be rigidly connected to a casing in which the wafer is installed, and so on.

Assuming VFI is constant (or changes slowly), the output of VCCS 304 (represented by arrow 354) has to be substantially equal in magnitude to the dark current of PD 302 (DCReference), which means VCCS 304 provides the charge carriers for the dark current consumption of PD 302, thus allowing the voltage to remain at VFI. Since the output of VCCS 304 is controlled by VCTRL which is responsive to the output of amplifier 318, amplifier 318 is operated to output the required output such that VCTRL would control the current output by VCCS 304 which would be identical in magnitude to the dark current over PD 302.

If PD 102 is substantially identical to PD 302 and VCCS 104 is substantially identical to VCCS 304, the output of amplifier 318 would also cause VCCS 104 to provide the same level of current (DCReference) to the cathode of PD 102. In such a case, for the output of VCCS 104 to cancel out the dark current generated by PD 102 (hereinbelow denoted DCActivePD), it is required that both PD 102 and PD 302 would generate a similar level of dark current. In order to subject both PDs (102 and 302) to the same bias (which would cause both PDs to generate substantially the same level of dark current, as both PDs are maintained in substantially the same conditions, e.g., temperature), the voltage provided to the first input of amplifier 318 is determined in response to the anode voltage and the cathode voltage of PD 102, and to the anode voltage of PD 302. For example, if VA is equal to VRPA, then VFI which is equal to VC may be provided to first input 320. It is noted that VC may change with time, and is not necessarily determined by a controller (for example, VC may be determined as result of additional components 106). If PD 102 differs from PD 302 and/or if VCCS 104 differs from VCCS 304, the output of amplifier 318 may be modified by matching electric components (not shown) between amplifier 318 and VCCS 104 to provide the relevant control voltage to VCCS 104 (e.g., if it is known that the dark current over PD 102 is linearly correlated to the dark current over PD 302, the output of amplifier 318 may be modified according to the linear correlation). Another way of applying the same bias is to apply VRPA=VA+ΔV to the anode of PD 302 and VRPC=VC+ΔV to the cathode of PD 302.

Figure 3C:
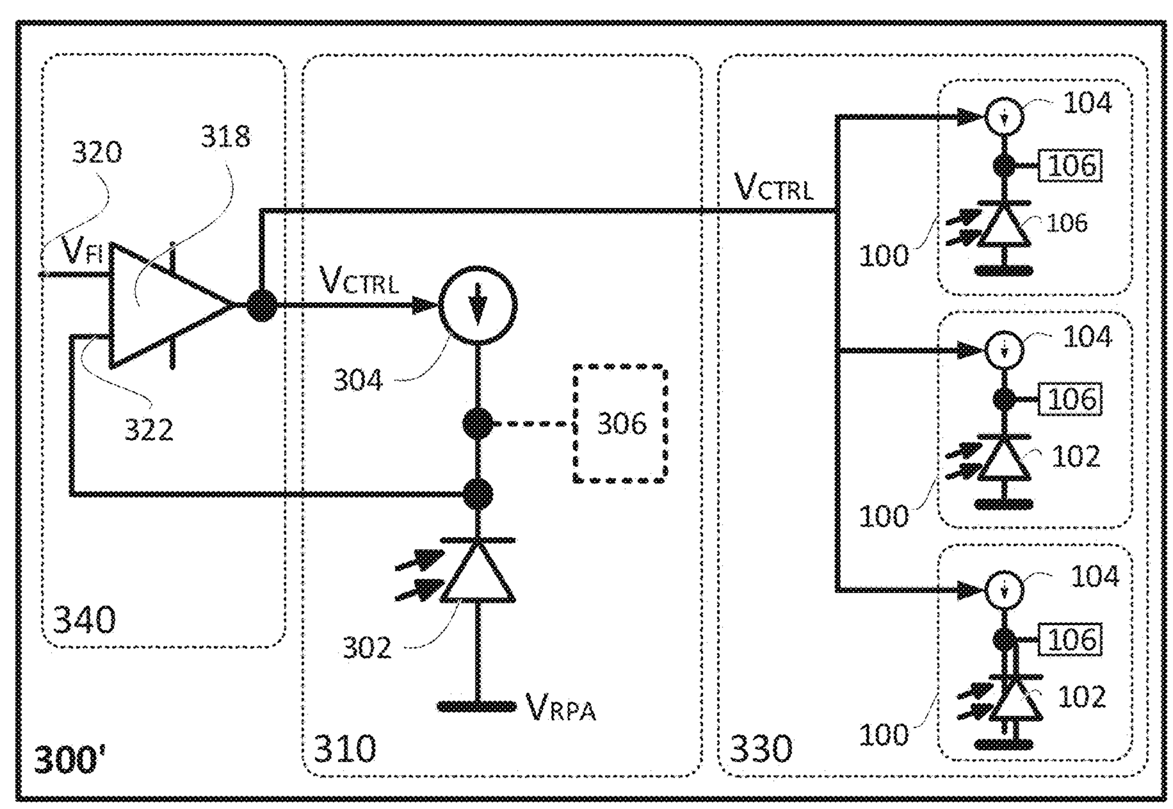
FIG. 3C shows a PDD comprising a plurality of photosites and circuitry operable to reduce effects of dark current.

FIG. 3C shows a photodetecting device 300' that includes a plurality of photosites 100, in accordance with examples of the presently disclosed subject matter. PDD 300' includes all of the components of PDD 300, as well as additional photosites 100. The different photosites of photodetecting device 300' are substantially identical to one another (e.g., all are part of a two-dimensional photodetector array), and therefore the PDs 302 of the different photosites 100 generate similar dark current as one another. Therefore, the same control voltage VCTRL is supplied to all of the VCCSs 104 of the different photosites 100 of PDD 300', causing these VCCSs 104 to cancel out (or at least reduce) the effects of the dark current generated by the respective PDs 102. Any option discussed above with respect to PDD 300 may be applied, mutatis mutandis, to PDD 300'.

In some cases (e.g., if VC is not constant and/or is not known), it is possible to provide a first-input voltage VFI (e.g., by a controller) which is selected to cause a similar dark current on PD 302 as on PD 102.

Figure 4:
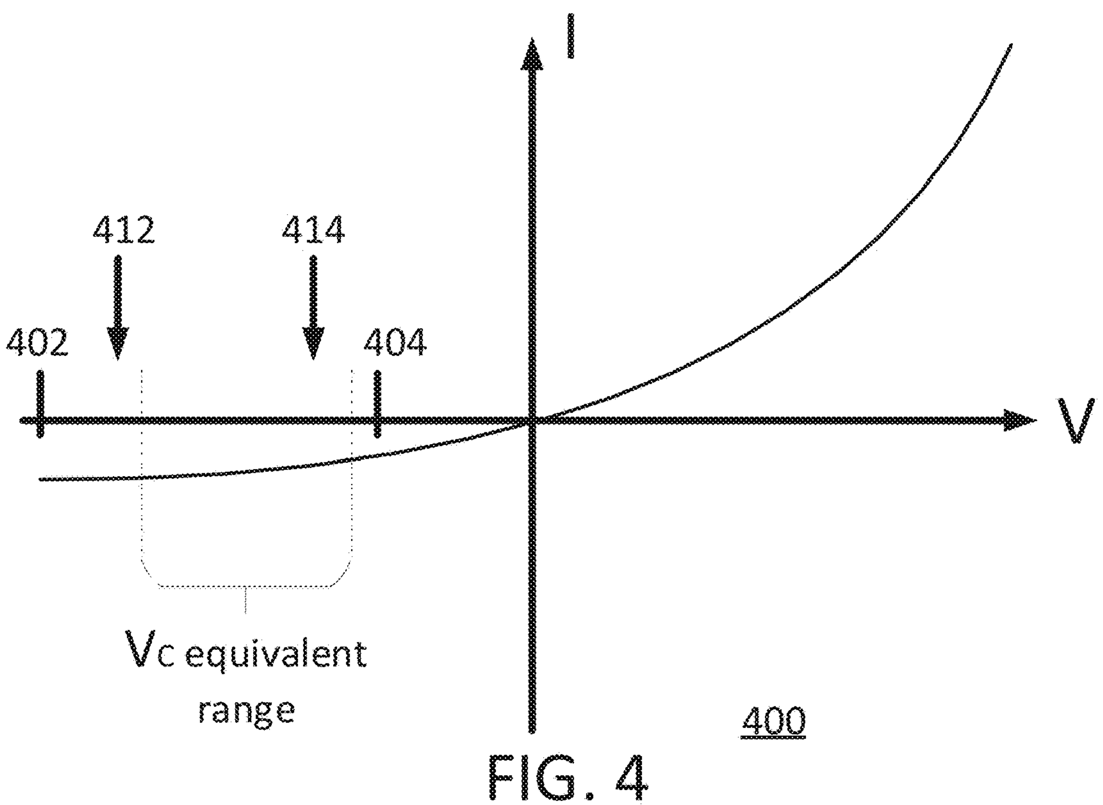
FIG. 4 shows an exemplary photodiode I-V curve and possible operational voltages for a PDD.

Refer now to FIG. 4, which shows an exemplary photodiode I-V curve 400 in accordance with examples of the presently disclosed subject matter. For simplicity of explanation, curve 400 represents the I-V curves of both PD 302 and PD 102, which are assumed to be substantially identical for the purpose of the present explanation, as well as subject to the same anode voltage (i.e., for this explanation, VA=VRPA). I-V curve 400 is relatively flat between voltages 402 and 404, which means different biases between 402 and 404 which are applied to the relevant photodiode would yield similar levels of dark current. If VC is changing within a cathode voltage range which, given a known VA, means the bias on PD 102 is confined between voltages 402 and 404, then applying a VRPC which causes the bias on PD 302 to also be between voltages 402 and 404 would cause VCCS 104 to output a current which is sufficiently similar to DCActivePD, even though PD 102 and PD 302 are subject to different biases. The VRPC in such case may be within the cathode voltage range—as exemplified by equivalent voltage 414, or outside it (but still maintaining the bias on PD 302 between 402 and 404—as exemplified by equivalent voltage 412. Modifications to other configurations, such as those discussed above, may be implemented, mutatis mutandis. It is noted that different biases may be applied to different PDs 102 and 302 for other reasons as well. For example, different biases may be applied as part of testing or calibrating of the photodetector array.

In real life, different photodiodes (or other components) of different photosites of a single photodetecting device are not manufactured exactly identically, and the operation of this photosites is also not exactly identical to one another. In a photodiode array, photodiodes may be somewhat different from one another and may have somewhat different dark currents (e.g., because manufacturing differences, slight difference in temperatures, etc.).

Figure 5:
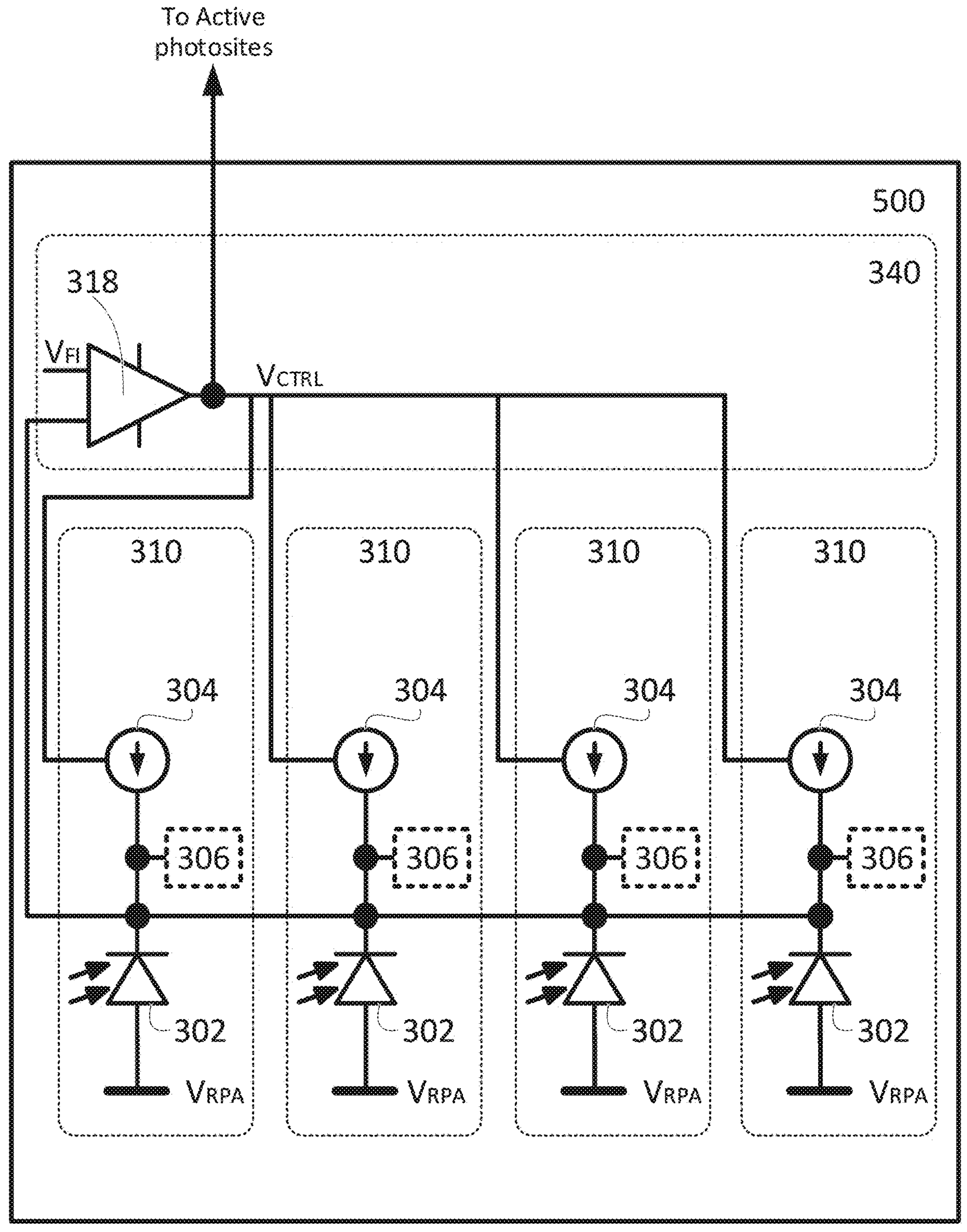
FIG. 5 shows a control-voltage generating circuitry connected to a plurality of reference photosites.

FIG. 5 shows a control-voltage generating circuitry 340 connected to a plurality of reference photosites 310 (collectively denoted 500), in accordance with examples of the presently disclosed subject matter. The circuit of FIG. 5 (also referred to as reference circuit 500) may be used for determining a control voltage (denoted VCTRL) for one or more VCCSs 104 of corresponding one or more photosites 310 of PDDs 300, 300', and any of the photodetecting device variations discussed in the present disclosure. Especially, reference circuit 500 may be used for determining a control voltage for canceling out (or limiting) the effects of dark current in one or more photosites 100 of a photodetecting device based on data collected from a plurality of reference photosites 310 which are varying to some extent (e.g., as a result of manufacturing inaccuracies, somewhat different operational conditions, etc.). As aforementioned, dark currents of photodiodes, even if similar, may be different from one another. It is noted that in some photodiode technologies, photodiodes intended to be identical may feature dark currents that are different by a factor of ×1.5, ×2, ×4, and even more. The averaging mechanism discussed herein allows to compensate for even such significant divergences (e.g., in manufacture). In cases amplifier 318 is connected to a plurality of reference photosites 310 for averaging dark current levels of several photosites 310, such photosites 310 are kept in the dark, e.g., using any of the mechanisms discussed above. The voltages applied to the different VCCSs 304 of the various photosites 310 are short-circuited such that all of the VCCSs 304 receive substantially the same control voltage. The cathode voltages of the different reference PDs 302 are short-circuited to different nets. This way, while the currents in the different reference photosites 310 are somewhat different from one another (resulting from reference photosites 310 being slightly different from one another), the average control voltage supplied to the one or more photosites 100 of the respective photodetecting device (which may also somewhat differ from one another and from reference photosites 310) is sufficiently accurate for canceling out the effects of dark current on the different photosites 100, and in a sufficiently uniform manner. Optionally, the output voltage of a single amplifier 318 is supplied to all photosites 100 and to all reference photosites 310. Optionally, the selected photodiodes for the photodetecting device have a flat I-V response (as discussed above, e.g., with respect to FIG. 4), such that the average control voltage discussed with respect to reference circuitry 500 cancels out the dark current in the different photosites 100 to a very good degree. Non-limiting examples of photodetecting devices which include multiple reference photosites 310 whose averaged output signals are used for modifying the output signals of multiple active photosites 100 (e.g., in order to reduce effects of dark current of output signal) are provided in FIGS. 6A and 6B. Different configurations, geometries, and numerical ratios may be implemented between the reference photosites 310 and the active photosites 100 of a single photodetecting device. For example, in a rectangular photodetecting array that includes a plurality of photosites arranged in rows and columns, an entire row of photosites (e.g., 1,000 photosites) or a few rows or columns of photosites may be used as the plurality of reference photosites 310 (and optionally kept in the dark), while the rest of the array receives the control signal that is based on averaging the outputs of those reference photosite rows. This way of generating control current greatly reduces the effects of dark current by removing the average dark current, leaving only photosite-to-photosite variations.

Figure 6A:
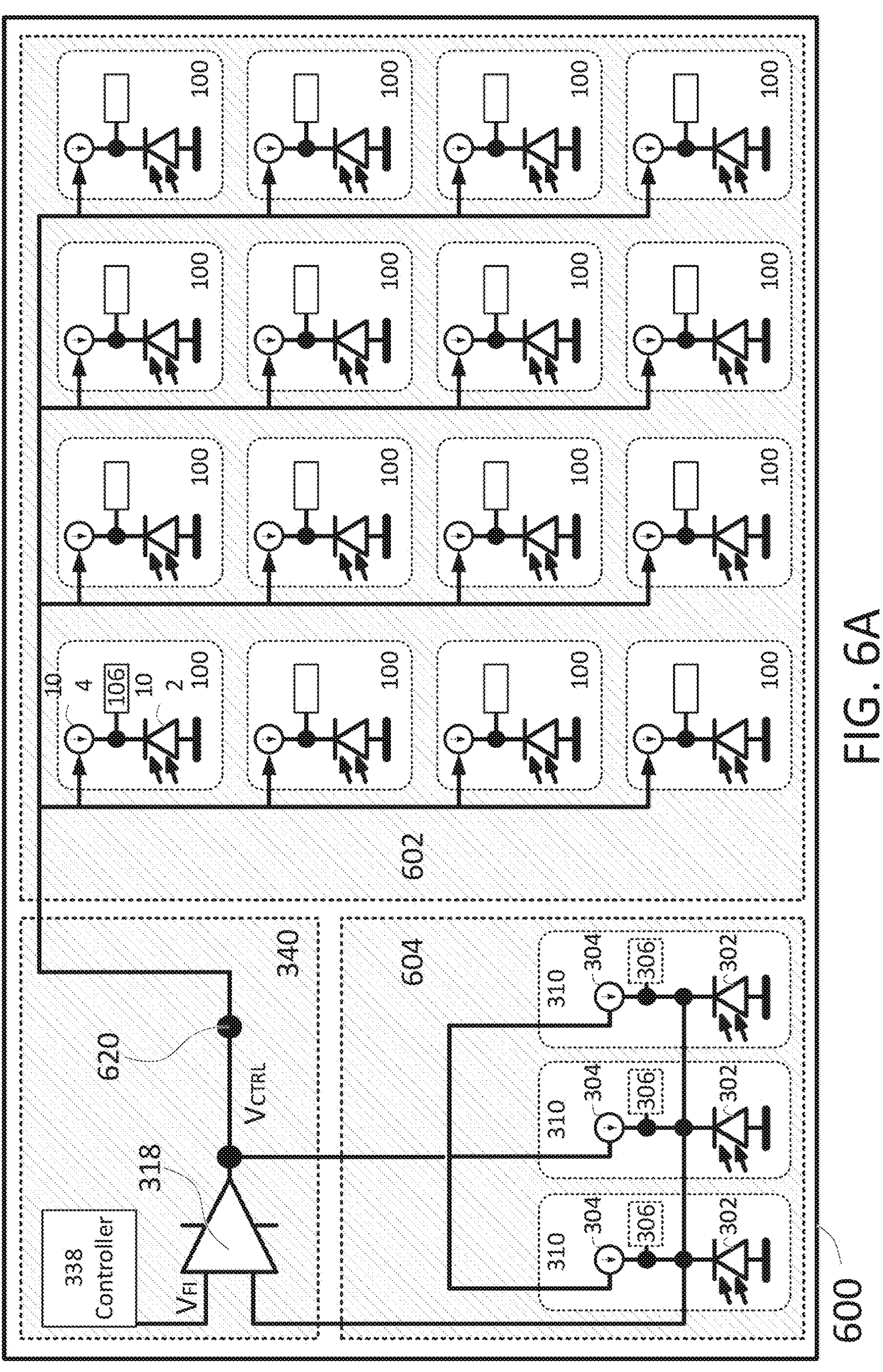
FIGS. 6A and 6B show PDDs which comprise an array of photosites and reference circuitry which is based on a plurality of photodiodes.
Figure 6B:
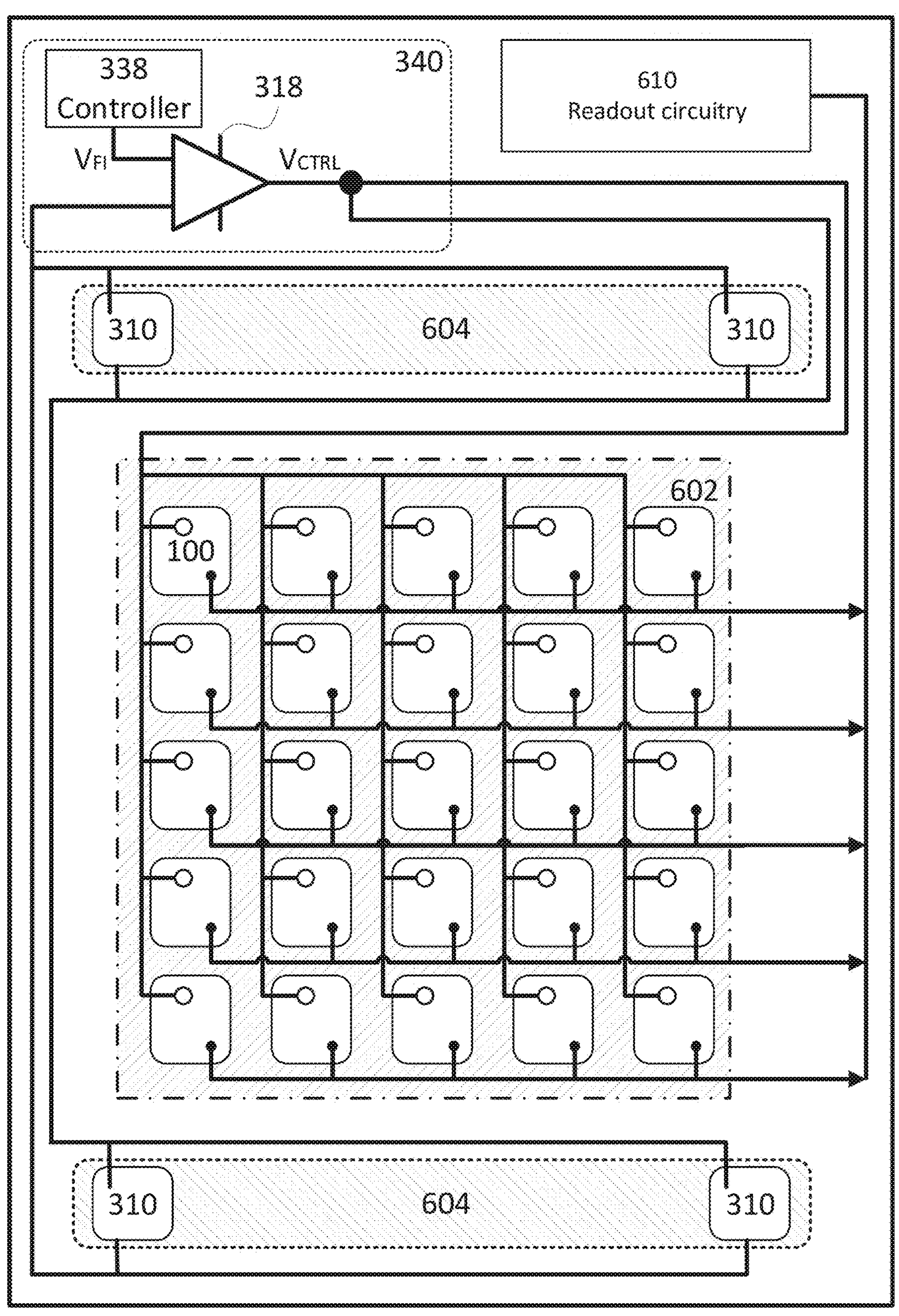

FIGS. 6A and 6B show photodetecting devices that comprise an array of photosites and reference circuitry which is based on a plurality of photodiodes, in accordance with examples of the presently disclosed subject matter. PDD 600 (illustrated in FIG. 6A) and PDD 600' (illustrated in FIG. 6B, which is a variation of PDD 600) include all of the components of PDD 300, as well as additional photosites 100 and photosites 310. Optionally, the different photosites of photodetecting device 600 (and, separately, of PDD 600')

are substantially identical to one another. Any option discussed above with respect to PDDs 300 and 300' as well as with respect to circuit 500 may be applied, mutatis mutandis, to PDDs 600 and 600'.

FIG. 6A shows a photodetector device 600 comprising a photosensitive area 602 (which is exposed to external light during operation of photodetector device 600) with a plurality (array) of photosites 100, an area 604 with a plurality of reference photosites 310 that are kept in the dark (at least during reference current measurements, optionally at all times), and control-voltage generating circuitry 340 which further includes controller 338. Controller 338 may control operation of amplifier 318, voltages that are supplied to amplifier 318, and/or operation of reference photosites 310. Optionally, controller 338 may also control operations of photosites 100 and/or of other components of PDD 600. Controller 338 may control both active photosites 100 and reference photosites 310 to operate under the same operational conditions (e.g., bias, exposure time, managing readout regimes). It is noted that any functionality of controller 338 may be implemented by an external controller (e.g., implemented on another processor of an electro-optical system in which the photodetecting device is installed, or by an auxiliary system such as a controller of an autonomous vehicle in which the photodetecting device is installed). Optionally, controller 338 may be implemented as one or more processors fabricated on the same wafer as other components of PDD 600 (e.g., photosites 100 and 310, amplifier 318). Optionally, controller 338 may be implemented as one or more processors on a printed circuit board (PCB) connected to such a wafer. Other suitable controllers may also be implemented as controller 338.

FIG. 6B shows a photodetector device 600' in accordance with examples of the presently disclosed subject matter. Photodetector device 600' is similar to device 600, but with the components are arranged in a different geometry and without showing internal details of the different photosites. Also illustrated is readout circuitry 610 which is used to read the detection signals from photosites 100 and to provide them for further processing (e.g., in order to reduce noise, for image processing), for storage, or for any other use. For example, readout circuitry 610 may temporally arrange the readout values of the different photosites 100 sequentially (possibly after some processing by one or more processors of the photodetecting device, not shown) before providing them for further processing, storage, or any other action. Optionally, readout circuitry 610 may be implemented as one or more units fabricated on the same wafer as other components of PDD 600 (e.g., photosites 100 and 310, amplifier 318). Optionally, readout circuitry 610 may be implemented as one or more units on a printed circuit board (PCB) connected to such a wafer. Other suitable readout circuitries may also be implemented as readout circuitry 610. It is noted that a readout circuitry such as readout circuitry 610 may be implemented in any of the photodetecting devices discussed in the present disclosure (e.g., PDDs 300, 700, 800, and 900). Examples for analog signal processing that may be executed in the photodetecting device (e.g., by readout circuitry 610 or by one or more processors of the respective photodetecting device) prior to an optional digitization of the signal include: modifying gain (amplification), offset and binning (combining output signals from two or more photosites). Digitization of the readout data may be implemented on the photodetecting device or external thereto.

Optionally, PDD 600 (or any of the other photodetecting devices disclosed in the present disclosure) may include a sampling circuitry for sampling the output voltage of amplifier 318 and/or the control voltage VCTRL (if different), and for holding that voltage level for at least a specified minimum period of time. Such sampling circuitry may be positioned at any place between the output of amplifier 318 and one or more of VCCSs 104 (e.g., at location 620). Any suitable sampling circuitry may be used; for example, in some cases, exemplary circuitry may include "sample and hold" switches. Optionally, the sampling circuitry may be used only some of the times, and direct real-time readout of the control voltage is executed in other times. Using a sampling circuitry may be useful, for example, when the magnitudes of dark currents in the system change slowly, when photosites 310 are shielded from light only at parts of the times.

FIGS. 7 and 8 show other photodetecting devices in accordance with examples of the presently disclosed subject matter. In the photodetecting devices described above (e.g., 300, 300', 600, 600'), a voltage-controlled current source was used for both of the active photosites 100 and the reference photosites 310. A current source is one example of a voltage-controlled current-circuit which may be used in the disclosed photodetecting device. Another type of voltage-controlled current-circuit which may be used is voltage-controlled current-sink, which absorbs current in magnitude which is controlled by the control voltage supplied to it. A current sink may be used, for example, in which the bias over the PDs (102, 302) is opposite in direction to the bias exemplified above. More generally, whenever a voltage-controlled current source is discussed above (104, 304), this component may be replaced by a voltage-controlled current sink (denoted, respectively, 704 and 714). It is noted that using a current sink instead of a current source may require using different types of components or circuits in other parts of the respective photodetecting device. For example, an amplifier 318 which is used together with VCCSs 104 and 304 is different in power, size, etc. than amplifier 718 which is used together with voltage-controlled current sinks 704 and 714. In order to differentiate photosites which include voltage-controlled current sinks rather than VCCSs, the reference numbers 100' and 310' are used correspondingly to photosites 100 and 300 discussed above.

In FIG. 7, a PDD 700 includes voltage-controlled current circuits that are voltage-controlled current sinks (in both photosite 100' and photosite 310'), and a suitable amplifier 718 is used instead of amplifier 318. All variations discussed above regarding current sources are equally applicable to current sinks.

In FIG. 8, a PDD 800 includes both types of voltage-controlled current circuits-both voltage-controlled current sources 104 and 314 and voltage-controlled current sinks 704 and 714, with matching amplifiers 318 and 718. This may allow, for example, operating the photodiodes of PDD 800 in either forward or reverse bias. At least one switch (or other selection mechanisms) may be used to choose which of the reference circuits is activated/deactivated—the one based on VCCSs or the one based on voltage-controlled current sinks. Such selection mechanism may be implemented, for example, to prevent the two feedback regulators working "against" one another (e.g., if working in near-zero biases over the photodiodes). Any option, explanation or variation discussed above with respect to any of the previously discussed photodetecting devices (e.g., 300, 300', 600, 600') may be applied, mutatis mutandis, to PDDs 700 and 800. Especially, PDDs 700 and 800 may include a plurality of photosites 100' and/or a plurality of reference photosites 310', similar to the discussions above (e.g., with respect to FIGS. 5, 6A, and 6B).

It is noted that in any of the photodetecting devices discussed above, one or more of the photosites (e.g., of a photodetecting array) may optionally be controllable to be used selectively as a reference photosite 310 (e.g. at some times) or as a regular photosite 100 (e.g. at other times). Such photosites may include the required circuitry for operating in both roles. This may be used, for example, if the same photodetecting device is used in different types of electro-optical systems. In one example, one system may require the accuracy of averaging between 1,000 and 4,000 reference photosites 310 while another system may require a lower accuracy which may be achieved by averaging between 1 and 100 reference photosites 310. In another example, averaging of control voltage based on some (or even all) of the photosites may be executed when the entire photodetector array is darkened and stored in a sample-and-hold circuitry as discussed above, and all of the photosites may be used for detection of FOV data using the determined control voltage in one or more following frames.

It is noted that in the discussion above, it was assumed for the sake of simplicity that the anode side of all photodiodes on the respective photodetector array are connected to a known (and possibly controlled) voltage, and the detection signals as well as connection of VCCSs and additional circuities is implemented on the cathode side. It is noted that optionally, the PDs 102 and 302 may be connected the opposite way (where the readout is on the anode side, and so on), mutatis mutandis.

Referring to all of the photodetecting devices discussed above (e.g., 300, 600, 700, 800), it is noted that the photosites, the readout circuitry, the reference circuitry and the other aforementioned components (as well any additional components that may be required) may be implemented on a single wafer or on more than one wafer, on one or more PCBs or another suitable type of circuit connected to the photosites, and so on.

FIG. 9 illustrates a PDD 900, in accordance with examples of the presently disclosed subject matter. PDD 900 may implement any combination of features from any one or more of the photodetecting devices described above, and further include additional components. For example, PDD 900 may include any one or more of the following components:

At least one light source 902, operable to emit light onto the FOV of PDD 900. Some of the light of light source 902 is reflected from objects in the FOV and is captured by photosites 100 in photosensitive area 602 (which is exposed to external light during operation of photodetector device 900) and is used to generated an image or another model of the objects. Any suitable type of light source may be used (e.g., pulsed, continuous, modulated, LED, laser). Optionally, operation of light source 902 may be controlled by a controller (e.g., controller 338).

A physical barrier 904 for keeping area 604 of the detector array in the dark. Physical barrier 904 may be part of the detector array or external thereto. Physical barrier 904 may be fixed or movable (e.g., a moving shutter). It is noted that other type of darkening mechanisms may also be used. Optionally, physical barrier 904 (or other darkening mechanism) may darken different parts of the detection array in different times. Optionally, operation of barrier 904, if changeable, may be controlled by a controller (e.g., controller 338).

Ignored photosites 906. It is noted that not all photosites of the photodetector array are necessarily used for either detection (photosites 100) or as reference (photosites 310). For example, some photosites may reside in an area that is not entirely darkened and not entirely lit, and are therefore ignored in the generation of the image (or other type of output generated in response to the detection signals of photosites 100). Optionally, different photosites may be ignored at different times by PDD 900.

At least one processor 908 for processing the detection signals output by photosites 100. Such processing may include, for example, signal processing, image processing, spectroscopy analysis, and so on. Optionally, processing results by processor 908 may be used for modifying operation of controller 338 (or another controller). Optionally, controller 338 and processor 908 may be implemented as a single processing unit. Optionally, processing results by processor 908 may be provided to any one or more of: a tangible memory module 910 (for storage or later retrieval, see next), for external systems (e.g., a remote server, or a vehicle computer of a vehicle in which PDD 900 is installed), e.g., via a communication module 912, a display 914 for displaying an image or other type of result (e.g., graph, textual results of spectrograph), another type of output interface (e.g. a speaker, not shown), and so on. It is noted that optionally, signals from photosites 310 may also be processed by processor 908, for example to assess a condition of PDD 900 (e.g., operability, temperature).

A memory module 910 for storing at least one of detection signals output by the active photosites or by readout circuitry 610 (e.g., if different), and detection information generated by processor 908 by processing the detection signals.

Power source 916 (e.g., battery, AC power adapter, DC power adapter). The power source may provide power to the photosites, to the amplifier, or to any other component of the photodetecting device.

A hard casing 918 (or any other type of structural support).

Optics 920 for directing light of light source 902 (if implemented) to the FOV and/or for directing light from the FOV to the active photosites 100. Such optics may include, for example, lenses, mirrors (fixed or movable), prisms, filters, and so on.

As aforementioned, the photodetecting devices described above can be used for matching the control voltage determining the level of current provided by the at least one first voltage controlled current circuits (VCCCs) 104 to account for differences in operation conditions of the photodetecting device, which change the levels of dark current generated by the at least one PD 102. For example, for a photodetecting device that includes a plurality of photosites 100 and a plurality of photosites 320: when the photodetecting device operates at a first temperature, control-voltage generating circuitry 340 provides to the voltage controlled current circuit a control voltage for providing a current at a first level in response to dark currents of the plurality of reference PDs 302, to reduce effect of dark currents of the active PDs 102 on output of active photosites 100; and when the photodetecting device operates at a second temperature (higher than the first temperature), control-voltage generating circuitry 340 provides to the voltage controlled current circuit a control voltage for providing a current at a second level in response to dark currents of the plurality of reference PDs 302, to reduce effect of dark currents of the active PDs 102 on output of active photosites 100; such that the second level is larger in magnitude than the first level.

FIG. 10 is a flow chart of method 1000 for compensating for dark current in a photodetector, in accordance with examples of the presently disclosed subject matter. Method 1000 is executed in a photodetecting device which includes at least: (a) a plurality of active photosites, each including at least one active PD; (b) at least one reference photosite that includes a reference PD; (c) at least one first VCCC connected to one or more active PDs; (d) at least one reference VCCC connected to one or more reference PDs; and (c) a control-voltage generating circuitry that is connected to the active VCCC and to the reference VCCC. For example, method 1000 may be executed in any of PDDs 300', 600, 600', 700, and 800 (the latter two in implementations which include a plurality of active photosites). It is noted that method 1000 may include executing any action or function discussed above with respect to any component of the various aforementioned PDDs.

Method 1000 includes at least stages 1010 and 1020. Stage 1010 includes: based on a level (or levels) of dark current in the at least one reference PD, generating a control voltage that, when provided to the at least one reference VCCC causes the at least one reference VCCC to generate a current that reduces an effect of dark current of the reference photodiode on an output of the reference photosite. Stage 1020 includes providing the control voltage to the at least one first VCCC, thereby causing the at least one first VCCC to generate a current that reduces an effect of dark current of the active photodiodes on outputs of the plurality of active photosites. VCCC stands for "Voltage Controlled Current Circuit", and it is implemented either as a voltage-controlled current source or as a voltage-controlled current sink.

Optionally, stage 1010 is implemented using an amplifier that is a part of the control-voltage generating circuitry. In such a case, stage 1010 includes supplying to a first input of the amplifier a first input voltage when a second input of the amplifier is electrically connected between the reference photodiode and the reference voltage controlled current circuit. The amplifier may be used to continuously reduce a difference between an output of the reference voltage-controlled circuit and the first input voltage, thereby generating the control voltage. Optionally, both the first VCCC(s) and the reference VCCC(s) are connected to an output of the amplifier.

In case the photodetecting device includes a plurality of different reference photodiodes which generate different levels of dark current, stage 1010 may include generating a single control voltage based on averaging of the differing dark currents of the reference photodiodes.

Method 1000 may include preventing light from a field of view of the photodetecting device from reaching the reference photodiodes (e.g., using a physical barrier or diverting optics).

Method 1000 may include sampling outputs of the active photosites after the reduction of the effects of dark current, and generating an image based on the sampled outputs.

FIG. 11 is a flow chart illustrating a method 1100 for compensating for dark current in a photodetecting device (PDD), in accordance with examples of the presently disclosed subject matter. Method 1100 have two phases which are executed in different temperature regimes; a first group of stages (1110-1116) is executed when the PDD operates in a first temperature (T1), and a second group of stages (1120-1126) is executed when the PDD operates in a second temperature (T2) which is higher than the first temperature. The degree by which the first temperature and the second temperature may be different in different implementations or in different instances of method 1100. For example, the temperature difference may be at least 5° C.; at least 10° C.; at least 20° C.; at least 40° C.; at least 100° C., and so on. Notably, method 1100 may be effective in even smaller temperature differences (e.g., less than 1° C.). It is noted that each of the first temperature and the second temperature may be implemented as a temperature range (e.g., spanning 0.1° C.; 1° C.; 5° C., or more). Any temperature in the second temperature range is higher than any temperature in the first temperature range (e.g., by the ranges mentioned before). Method 1000 may optionally be executed in any of the PDDs discussed above (300, 600, etc.). It is noted that method 1100 may include executing any action or function discussed above with respect to any component of the various aforementioned PDDs, and that the PDD of method 1100 may include any combination of one or more of the components discussed above with respect to any one or more of the aforementioned PDDs.

Referring to stages carried out when the PDD operates in the first temperature (which may be a first temperature range): Stage 1110 includes determining a first control voltage based on dark current of at least one reference PD of the PDD. Stage 1112 includes providing the first control voltage to a first VCCC which is coupled to at least one active PD of an active photosite of the PDD, thereby causing the first VCCC to impose a first dark-current countering current in the active photosite. Stage 1114 includes generating by the active PD a first detection current in response to: (a) light impinging of the active PD originating in an object in a field of view of the PDD, and (b) dark current generated by the active PD. Stage 1116 includes outputting by the active photosite a first detection signal whose magnitude is smaller than the first detection current in response to the first detection current and to the first dark-current countering current, thereby compensating effect of dark current on the first detection signal. Method 1100 may also include optional stage 1118 of generating at least one first image of a FOV of the PDD based on a plurality of first detection signals from a plurality of photosites of the PDD (and optionally all of them). Stage 1118 may be executed when the PDD is at the first temperature, or at a later stage.

Referring to stages carried out when the PDD operates in the second temperature (which may be a second temperature range): Stage 1120 includes determining a second control voltage based on dark current of at least one reference PD of the PDD. Stage 1122 includes providing the second control voltage to the first VCCC, thereby causing the first VCCC to impose a second dark-current countering current in the active photosite; Stage 1124 includes generating by the active PD a second detection current in response to: (a) light impinging of the active PD originating in the object, and (b) dark current generated by the active PD. Stage 1126 includes outputting by the active photosite a second detection signal whose magnitude is smaller than the second detection current in response to the second detection current and to the second dark-current countering current, thereby compensating effect of dark current on the second detection signal. A magnitude of the second dark-current countering current is larger than a magnitude of the first dark-current countering current, and could be by any ratio larger than one. For example, the ratio may be by a factor of at least two, or significantly higher (e.g., by one, two, three—or more—orders of magnitude). Method 1100 may also include optional stage 1128 of generating at least one second image of a FOV of the PDD based on a plurality of second detection signals from a plurality of photosites of the PDD (and optionally all of them). Stage 1128 may be executed when the PDD is at the second temperature, or at a later stage.

Optionally, a first level of radiation (L1) from the object impinging on the active photodiode during a first time (t1) at which the first dark-current countering current is generated is substantially equal to a second level of radiation (L2) from the object impinging on the active photodiode during a second time (t2) at which the second dark-current countering current is generated, wherein a magnitude of the second detection signal is substantially equal to a magnitude of the first detection signal. It should be noted that optionally, the PDD according to the present disclosure can be used to detect signal levels which are significantly lower than the levels of dark current generated its photodiodes at certain operational temperatures (e.g., by one, two or more orders of magnitude). Therefore, method 1100 may be used to issue similar levels of output signals in two different temperatures, in which the dark currents are two or more order of magnitudes larger than the detection signals, and significantly different than one another (e.g., by a factor ×2, ×10).

Optionally, the determining of the first control voltage and the determining of the second control voltage are executed by a control-voltage generating circuitry which includes at least one amplifier having an input electrically connected between the reference photodiode and a reference voltage controlled current circuit which is coupled to the reference photodiode.

Optionally, method 1100 may further include supplying to another input of the amplifier a first-input voltage whose level is determined corresponding to a bias on the active photodiode. Optionally, method 1100 may include supplying the first input voltage such that a bias on the reference photodiode is substantially the same as a bias on the active photodiode. Optionally, method 1100 may include determining the first control voltage and the second control voltage based on differing dark currents of a plurality of reference photodiodes of the photodetecting device, wherein the providing of the first control voltage includes providing the same first control voltage to a plurality of first voltage controlled current circuits, each coupled to at least one active photodiode out of a plurality of active photodiodes of the photodetecting device having differing dark currents, wherein the providing of the second control voltage includes providing the same second control voltage to the plurality of first voltage controlled current circuits, when the plurality of active photodiodes are having yet differing dark currents.

Optionally, different active photodiodes concurrently generate different levels of dark current, and concurrently different reference photodiodes generate different levels of dark current, and the control-voltage generating circuitry provides to the different active photodiodes a same control voltage based on averaging of the differing dark currents of the second photodiodes. Optionally, method 1100 may include directing light from the field of view to a plurality of active photosites of the photodetecting device using dedicated optics, and preventing light from the field of view from reaching a plurality of reference photodiodes of the photodetecting device.

With the PDD operating at a first temperature T1: a first control voltage VCTRL1 based on dark current of at least one reference PD of the PDD is determined in step 1010; VCTRL1 is provided in step 1020 to a first voltage controlled current circuit (VCCC1) coupled to at least one active PD of the PDD, thereby causing VCCC1 to impose a first dark countering current DC1COUNTERING that counters a dark current in the active photosite; in step 1030, the active PD generates a first detection current D1DETECTION in response to light originating or reflected from an object within a FOV of the PDD and impinging on the active PD and from the dark current generated by the active PD; in step 1040, in response to D1DETECTION and to DC1COUNTERING, the active photosite outputs a first detection signal with a magnitude smaller than that of D1DETECTION.

With the PDD operating at a second temperature T2 that is higher than T1 by at least 10 degrees C.: a second control voltage VCTRL2 based on dark current of at least one reference PD of the PDD is determined in step 1050; VCTRL2 is provided in step 1060 to VCCC1, thereby causing VCCC1 to impose a second dark countering current DC2COUNTERING that counters a dark current in the active photosite, where DC2COUNTERING is at least twice as large as DC1COUNTERING; in step 1070, the active PD generates a second detection current D2DETECTION in response to light originating or reflected from an object within a FOV of the PDD and impinging on the active PD and from the dark current generated by the active PD; and, in step 1080, in response to D2DETECTION and to DC2COUNTERING, the active photosite outputs a second detection signal with a magnitude smaller than that of D2DETECTION.

FIG. 11 is a flow chart illustrating a method for using a device such as device 300 for calibration/testing of the device. For example, one can set the reference voltage of the reference circuit so that it will force very high current (positive or negative) to all of the photosites, thus forcing a very bright overall image or a very dark one (in the "real" sensing array), regardless of the ambient lighting (without need to control the environment, could be during a real-time operation). This may be used for example for testing individual photosites periodically.

For example, one can apply a first current to the reference circuit, thus forcing the capacitance of all of photosites 301 to be charged to their full extent, and by sampling their charge to determine if one or more of the photosites are defective. On the same token, one can apply a second current to the reference circuit, thus forcing all of the "real" capacitors to be discharged to their full extent, and by sampling their charge to determine if one or more of the photosites are defective.

FIG. 12 is a flow chart illustrating method 1200 for testing a photodetecting device, in accordance with examples of the presently disclosed subject matter. For example, the testing may be implemented by any of the aforementioned photodetecting devices. That is, the same circuitries and architectures which were described above as being useful for reducing the effects of dark current may be put to additional use, in order to test the detection paths of the different photosites in real time. Optionally, the testing may be done while the PDD is in operational mode (i.e., not in testing mode). In some implementations, some photosites may be tested while exposed to ambient light from the FOV, and even when other photosites of the same PDD capture an actual image of the FOV (with or without compensation for dark current). It is nevertheless noted that method 1200 may also optionally be implemented in other types of PDDs. It is also noted that method 1200 may also optionally be implemented using circuitries or architectures similar to the ones discussed above with respect to the aforementioned PDDs, but when the photodiodes are not characterized by high dark current, and when no reduction of dark current is required or carried out. Method 1200 is described as applied to a single photosite, but it may be applied to a plurality of photosites of a PDD, or to all of them.

Stage 1210 of method 1200 includes providing a first voltage to a first input of an amplifier of a control-voltage generating circuitry, wherein the second input of the amplifier is connected to a reference photodiode and to a second current circuit which supplies current in a level governed in response to an output voltage of the amplifier; thereby causing the amplifier to generate a first control voltage for a first current circuit of a photosite of the photodetecting device. Referring to the examples set forth with respect to the previous drawings, the amplifier may be amplifier 318 or amplifier 718, and the photosite may be photosite 310 or photosite 310'. Examples of which first voltages may be provided to the first input are discussed below.

Stage 1220 of method 1200 includes reading a first output signal of the photosite, the first output signal is generated by the photosite in response to current generated by the first current circuit and to a photodiode of the photosite.

Stage 1230 of method 1200 includes providing to the first input of the amplifier a second voltage which is different than the first input, thereby causing the amplifier to generate a second control voltage for the first current circuit. Examples of which second voltages may be provided are discussed below.

Stage 1240 of method 1200 includes reading a second output signal of the photosite which is generated by the photosite in response to current generated by the first current circuit and to a photodiode of the photosite.

Stage 1250 of method 1200 includes based on the first output signal and on the second output signal, determining a defectivity state of a detection path of the photodetecting device, the detection path including the photosite and readout circuitry associated with the photosite. Examples of which types of defects may be detected while using different combinations of first voltage and second voltage are discussed below.

A first example includes using at least one voltage out of the first voltage and the second voltage in order to attempt to saturate the photosite (e.g., by providing by the VCCS a very high current to the capacitance of the photosite, regardless of the actual detection level). Failing to saturate the photosite (e.g., receiving a detection signal which is not white—possibly completely black or halftoned) indicates on a problem in the relevant photosite, or in further components in its readout path (e.g., photosite amplifier, sampler, analog-to-digital converter). In such a case, the first voltage (for example) causes the amplifier to generate a control voltage which causes the first current circuit to saturate the photosite. The determining of the defectivity state at stage 1250 in such a case may include determining that the detection path of that photosite is malfunctioning in response to determining that the first output signal is not saturated. The second voltage in such a case may be one which does not cause saturation of the photosite (e.g., which causes the VCCS to issue no current, to compensate for the dark current only, to prevent current from being collected by the capacitance). Testing whether a photosite detection path can be saturated can be implemented in real time.

When attempting to saturate one or more of the photosites in order to test the PDD, method 1200 may include reading the first output signal while the photosite is exposed to ambient light during a first detection frame of the photodetecting device, where the determining of the malfunctioning status is executed after previously determining that the detection path is operable in response to reading a saturated output signal at a second detection frame which is earlier than the first frame. For example, during an ongoing operation of the PDD (e.g., while capturing a video), a photosite may be determined as defective or if saturation attempt failed, after it succeeded at a previous time during the same operation. The testing may be executed at a testing frame which is not part of the video, or for individual photosites whose saturated output is ignored (e.g., the pixel color corresponding to these photosites may be completed from neighboring pixels at the frame in which they are tested, treating these photosites as unusable for the span of this frame).

A second example includes using at least one voltage out of the first voltage and the second voltage in order to attempt to deplete the photosite (e.g., by providing by the VCCS a very high opposite current to the capacitance of the photosite, regardless of the actual detection level). Failing to deplete the photosite (e.g., receiving a detection signal which is not black—possibly completely white or halftoned) indicates on a problem in the relevant photosite, or in further components in its readout path. In such a case, the second voltage (for example) causes the amplifier to generate a second control voltage which causes the first current circuit to deplete a detection signal resulting from field of view light impinging on the photosite. The determining of the defectivity state at stage 1250 in such a case may include determining that the detection path is malfunctioning in response to determining that the second output signal is not depleted. The first voltage in such a case may be one which does not cause saturation of the photosite (e.g., which causes the VCCS to issue no current, to compensate for the dark current only, to saturate the capacitance). Testing whether a photosite detection path can be depleted can be implemented in real time (e.g., without darkening the respective photosite).

When attempting to deplete one or more of the photosites in order to test the PDD, method 1200 may include reading of the second output signal while the photosite is exposed to ambient light during a third detection frame of the photodetecting device, wherein the determining of the malfunctioning status is executed after previously determining that the detection path is operable in response to reading a depleted output signal at a fourth detection frame which is earlier than the third frame.

Yet another example of using method 1200 to test a photosite using applying of multiple control voltages includes applying more than two voltages. For example, three or more different voltages may be provided to the first input of the amplifier at different times (e.g., at different frames). In such a case, stage 1250 may include determining the defectivity state of the detection path of the PDD based on the first output signal, on the second output signal, and on at least one other output signal corresponding to the third or more voltages applied to the first input of the amplifier. For example, three, four, or more different voltages may be applied to the first input of the amplifier at different times (e.g., monotonously, where every voltage is greater than a previous voltage), and the output signals of the same photosite corresponding to the different voltages may be tested to correspond to the applied voltages (e.g., the output signals are also monotonously increasing in magnitude).

An example of using method 1200 to test a portion of a PDD (or even all of it) includes reading from each out of a plurality of photosites of the PDD at least two output signals responsive to at least two different voltages provided to the amplifier of the respective photosites, determining for at least one first detection path an operable status based on the at least two output signals outputted by at least one photosite associated with the respective first detection path, and determining for at least one second detection path an malfunctioning status based on the at least two output signals outputted by at least one other photosite associated with the respective second detection path.

Optionally, method 1200 may be executed in combination with designated test targets (e.g., black target, white target), when the PDD is shielded from ambient light, and/or when using designated illumination (e.g., of a known magnitude, of a dedicated internal illumination, and so on), but not necessary so.

Optionally, stage 1250 may be replaced with determining an operational state of the detection path. This may be used, for example, in order to calibrate different photosites of the PDD to the same level. For example, when the PDD is darkened and without a dedicated target or dedicated illumination, the same voltage may be applied to VCCS of different photosites. The different output signals of the different photosites may be compared to one another (at one or more different voltages applied to the first input of the amplifier). Based on the comparison, correction values may be assigned to the different photosites detection paths, such they would provide a similar output signal for similar illumination level (which is simulated by the included current by the VCCSs of the different photosites). For example, it may be determined that the output of photosite A should be multiplied by 1.1 in order to output a calibrated output signal to photosite B. For example, it may be determined that a delta signal $\Delta S$ should be added to the output of photosite C in order to output a calibrated output signal to photosite D. nonlinear corrections may also be implemented.

Such (and similar) techniques may be used for calibration and testing, which means that both in operation (i.e., light detection) mode and in other modes (e.g., calibration mode and/or testing mode, as discussed below) the same cathode voltage is applied to both photodiodes. Operational biasing (in operational mode) is in a specific value of first-input voltage VFI. Examples of testing methods include:

- Example 1: (a) change first-input voltage VFI/Vy to different values, and (b) check for each photosite if receiving constantly different output levels, in order to (c) test readout circuitry/readout path.
- Example 2: check for defective photosites: (a) change first-input voltage VFI/Vy to very high/very low, and (b) verify which photosites are left unchanged/insufficiently black/white.

Section II—Photosite Readout Circuitry Architecture to Prevent Charge Aggregation During Idle Time Periods The embodiments discussed in this Section are directed to the operation and architecture of photosites that collect light from an environment, and especially reflected light of a pulsed light source. For example, such photosites may be used for capturing an image of an environment by illuminating objects using illumination pulses generated by a light source, in a similar manner as discussed in Section I above with respect to the electro-optical system of FIG. 9. The illumination pulses are reflected off one or more objects in the environment, and the reflected light then impinges on one or more photodiodes of the photosite, which results in the generation of a photodiode-generated current by each such photodiode. The illumination pulses may be timed or otherwise synchronized with what are referred to herein as detection, readout, or sampling windows, which may be successive sampling windows that occur within a larger sampling time period such as an imaging frame. Thus, the photodiode-generated current is generated during each of the aforementioned sampling windows, and a resulting accumulated charge across capacitor(s) identified with one or more photosite readout circuitries is then measured during these sampling windows or at the end of the larger sampling time period, as discussed in further detail below.

As discussed in further detail below, an electro-optical system and/or an imaging sensor may implement one or more photosite readout circuitries, each being implemented with an amplifier and one more capacitors that form part of an amplifier feedback path. It is noted that optionally, the collection of charge generated by the one or more photodiodes may be facilitated by parasitic capacitance of other components of the photosite, and that whenever a capacitor is mentioned below, a parasitic capacitance may be used for the collection of charge, mutatis mutandis. During operation of the photosite, the amplifier is coupled to the photodiode such that the amplifier outputs an electric signal that represents an integration or accumulation of charge over the capacitor due to the photodiode generated current. Thus, for each frame, the electrical signal is indicative of an amount of light captured by the photosite readout circuity during that respective frame (i.e., over each of the successive sampling windows in that frame). From this overview of operation, it is clear that accumulation of additional charge during idle time periods (i.e., between the sampling windows within each frame) may cause an erroneous accumulation of charge, and thus the electrical signal may erroneously indicate a greater amount of light captured by the photosite readout circuity during a respective frame, which may lead to saturation of the capacitance of the photosite, or to other detrimental consequences. The architecture and operation of the photosite readout circuitry as discussed in this Section aims to address these issues.

FIG. 13 illustrates an example photosite readout circuitry architecture, in accordance with embodiments of the present disclosure. The photosite readout circuitry 1301 as shown in FIG. 13, together with a coupled photodiode 1308, form what is referred to throughout the current Section as a "photosite" 1300. It is noted that while FIG. 13 and many of the examples below pertains to a photosite which includes a single photodiode, photosite 1300 may optionally include a plurality of photodiodes 1308 which are read by a single photosite readout circuitry 1301. In any place in which the discussion below pertains to a photosite readout circuitry 1301 which is coupled to a single photodiode 1308, it may also be connected for reading a plurality of photodiodes 1808, mutatis mutandis, even if not explicitly stated. In such cases, different photodiodes 1308 may be read by a single photosite readout circuitry 1301 in parallel (i.e., concurrently), in different times (e.g., in different sampling windows), or in any other suitable manner. The photosite 1300 may be from among any suitable number of photosites that are implemented as part of an imaging sensor and/or an electro-optical system as discussed herein. By way of example, such a sensor may be a part of a camera, a Lidar sensor, a spectrometer, and so on. The different photosite readout circuitries 1301 may share one or more photodiodes 1308, or each of the various photosite readout circuitries 1301 may be identified with a dedicated photodiode 1308, in various embodiments.

Furthermore, in various embodiments the photodiode 1308 may be integrated as part of the photosite readout circuitry 1301 (e.g., on the same wafer, silicon, chip, etc.) or as a separate component (e.g., on a separate wafer, silicon, chip, etc.). In any event, the photodiode 1308 is configured to generate a photodiode-generated current in response to impinging light of a particular wavelength or range of wavelengths, which may be dependent upon the particular implementation the imaging sensor and/or electro-optical system of which the photosite 1300 forms a part. For instance, the impinging light may be identified with the illumination pulses reflected off various objects within an environment as discussed above. Thus, the photodiode 1308 may generate the photodiode-generated current in response to impinging light having wavelengths identified with short-wave infrared (SWIR) for instance, which are typically considered within the 0.9-1.7 μm wavelength range, but may also be classified from 0.7-2.5 μm. However, these wavelengths are provided as examples, and the embodiments discussed herein are not limited to operation within these particular wavelengths.

The photosite readout circuitry 1301 includes an amplifier 1302, which includes two input terminals 1304 and 1306 and an output terminal 1307. The amplifier 1302 may be implemented as any suitable type of amplifier, such as an operational amplifier, for instance. Additional connections such as power pins and rails are not shown for purposes of brevity, although the amplifier 1302 may utilize power rails of any suitable voltage or range of voltages, depending upon the particular application. As shown in FIG. 13, one input terminal of the amplifier 1302 is coupled to the photodiode 1308 at point A to which one or more photodiodes 1308 may be connected, and thus represents a photodiode signal input 1304. The other input terminal of the amplifier 1302 is coupled to a reference signal at point B to which a source providing a reference signal (e.g., as discussed below) may be connected, and thus represents a reference signal input 1306. The output terminal of the amplifier 1302 is identified with an amplifier output 1307, which is coupled to two separate and selectively-coupled feedback paths, as discussed in further detail below.

Thus, the amplifier 1302 is configured to receive a signal at the photodiode signal input 1304 that is generated via the photodiode 1308, which again may represent a photodiode-generated current that is generated in response to light of a particular wavelength impinging on the photodiode 1308, as discussed herein, and may also include additional components such as dark current generated by photodiode 1308 during the sampling window. The amplifier 1302 is also configured to receive a reference signal that is generated via an external reference signal source. The reference signal may be a voltage reference or a current reference, and thus the reference signal represents either a current level or a voltage level that is maintained by the reference signal source. The reference voltage or current, as the case may be, is used to bias the photosite readout circuitry 1301 by bringing the transistors identified with the amplifier 1302 to their working point. Furthermore, and regardless of whether the reference signal is a reference voltage or a reference current level, the reference signal causes a reference voltage level to be formed at point B in the photosite readout circuitry 1301, which is also generated at point A due to the virtual short circuit between the input terminals of the amplifier 1302. The reference voltage level at point A of the photosite readout circuitry 1301 creates a bias for the photodiode 1308 by way of the coupling of the photodiode signal input 1304 as shown in FIG. 13. For example, any of the ways discussed above for providing a reference signal (e.g., using one or more reference photosites) may be used for providing a reference signal to amplifier 1302.

The reference signal may be generated in any suitable manner, which may be determined by a controller (and, like the photodiode 1308, may be integrated as part of or external to the photosite readout circuitry 1301). The controller may optionally change the amplitude of the reference signal for various sampling windows and/or for larger sampling periods (e.g., per frame) depending on operational conditions (e.g., ambient light levels, temperature, etc.). The controller that controls the reference signal level may be identified, for instance, with the controller 338, and the reference signal may be identified with the output of the reference photosite 310 as discussed above in Section I. Alternatively, the controller may be identified with the controller 1602 as discussed in further detail in this Section, and the reference signal may be generated by any suitable reference source (e.g., the reference signal generating source 1640), including known techniques to do so.

Regardless of how the reference signal is generated and whether the reference signal represents a reference current or a reference voltage, the amplifier 1302 may provide an output voltage that is proportional to the integral of the input voltage. For instance, the photodiode-generated current results in an accumulation of charge over the capacitor 1314 during each sampling window, as discussed in this Section above, and this charge translates to a voltage across the two terminals of the capacitor 1314. Thus, at the end of a particular cumulative sampling time period (e.g., a frame), which may include several successive sampling windows, the voltage at point C is read out via readout circuitry, as discussed in this Section in further detail below.

The readout circuitry is not shown in FIG. 13 for purposes of brevity, but may be integrated as part of or external to the photosite readout circuitry 1301. The readout circuitry may be implemented, for instance, as the readout circuitry 610 as discussed above with reference to Section I or, alternatively, the readout circuitry may be implemented as any suitable components configured to perform these functions as discussed in further detail in this Section (e.g., the readout circuitry 1650 as discussed in detail further below with reference to FIG. 16), including known techniques of readout circuitry implementation. Therefore, the photosite readout circuitry 1301 as discussed herein may include both the amplifier 1302 and associated interconnections and components, which function to generate a voltage or another electric signal that is indicative of an amount of light captured by the photosite readout circuity 1301 during one or more sampling windows. The photosite readout circuitry 1301 may include additional circuitry components identified with the readout circuitry that function to actually measure or read the generated voltage during the one or more sampling windows, as discussed in further detail throughout this Section. As discussed below in greater detail, the number of sampling windows during which charge is collected to be cumulatively read out can be determined by resetting of the charge on capacitor 1314 before a first sampling window of a sequence of sampling windows to be read out.

To perform the measurement of the generated voltage while reducing or eliminating contributions of the photodiode-generated current during idle time windows, the photosite readout circuitry 1301 may implement two separate feedback paths for the amplifier 1302 as shown in FIG. 13. Each of the feedback paths is selectively connected or disconnected via a coupled switching component 1310, 1312, the different combinations of the states of the switching components 1301, 1312 yielding different respective switching states and corresponding operational phases. As discussed in further detail below, the use of the two separate selectively-coupled feedback paths in this manner ensures that the capacitor 1314 retains its charge during off- or idle-time periods while maintaining the photodiode 1308 at a designated bias. Doing so prevents ambient or dark current from accumulating due to the parasitic capacitance of the photodiode 1308 and also maintains the output of the amplifier 1302 at its working point.

For instance, the first feedback path may include the switching component 1310 and the connections between the photodiode signal input 1304 and the amplifier output 1307. The second feedback path may include the switching component 1312, the capacitor 1314, and the connections between the photodiode signal input 1304 and the amplifier output 1307. It is noted that although the capacitor 1314 is illustrated as a single component in the Figures, this is by way of example and not limitation, and the capacitor 1314 may represent an equivalent capacitance of any suitable number and/or configuration of capacitors depending upon the desired implementation.

Each of the switching components 1310, 1312 may be implemented as any suitable number and/or type of electronically-controlled switches, such as field-effect transistors or any suitable type of transistors. Thus, the switching components 1310, 1312 may alternatively be referred to herein as "switches" as well as "reset switch 1310" and "integrate switch 1312", respectively. The state of the switching components 1310, 1312 may thus be electronically-controlled via the controller as discussed in further detail in this Section. In this way, the first switching component 1310 is configured to selectively connect or disconnect the first feedback path, which couples the photodiode signal input 1304 and the amplifier output 1307 directly to one another. The second switching component 1312 is configured to selectively connect or disconnect a second feedback path that couples the photodiode signal input 1304 and the amplifier output 1307 to one another via the capacitor 1314.

Again, the photosite 1300 operates by detecting light impinging on the photodiode 1308, which is converted to a measured voltage as a result of the accumulated charge over the terminals of the capacitor 1314. Each frame (or other suitable sampling time period) may include several successive sampling windows, which may each be synchronized with the receipt of the light pulses at the photodiode 1308. These sampling windows may be alternatively referred to herein as detection windows. During a light-collecting operation of the photosite 1300 (which may be alternatively be referred to herein as an "integration phase"), a charge is accumulated over the capacitor 1314 in response to the photodiode-generated current during each respective detection window. However, the time between each of the detection windows, (e.g., the time when emitted light pulses which are reflected from objects within a predefined detection range from the photosite are not being expected to be received at the photodiode 1308) is considered an idle time period. Ideally, the photodiode-generated current should not contribute to a further accumulation of charge over the capacitor 1314 during such idle time periods, and the accumulated charge should be maintained and not diminish. When this is the case, the voltage accumulated on the capacitor 1314 accurately represents the amount of light captured by the photosite readout circuity 1301 during each of a set of sampling windows in response to the desired impinging light pulses, which again may be identified with a single frame or other suitable sampling time period. The voltage accumulated during the detection windows may, in some cases, also represent dark current and noises collected throughout the detection windows, but it is possible to mitigate the collection of such charge, at least partly, e.g., as discussed above with respect to photodetecting device 300.

As discussed in further detail below, this goal is better achieved by synchronizing specific switching states and respective operational phases of the photosite readout circuitry 1301 with the detection window schedule. As shown in each of FIGS. 14A-14D, each switching state represents a unique combination of a conductive state (e.g., the binary conductive states of "on" or "closed", versus "off" or "open") of each of the switching components 1310, 1312. The transitions between the different conductive states of switching components 1310 and 1312 may be controlled via a controller as noted herein.

Figure 14A:
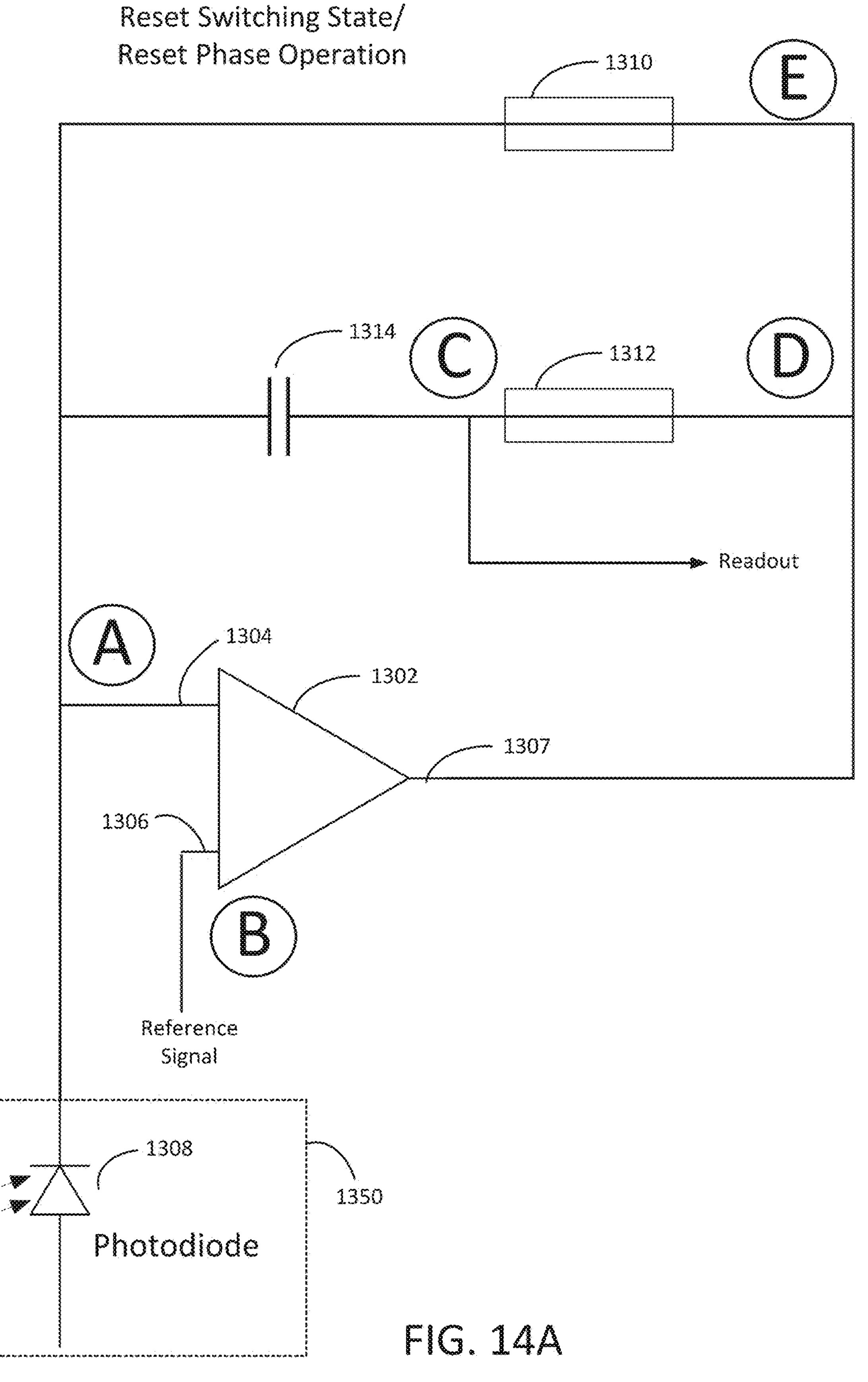

For instance, and as illustrated in FIG. 14A, one of these operational phases is identified with a reset phase of the photosite readout circuitry 1301, during which the photosite readout circuitry 1301 is in a reset switching state. The reset switching state as shown in FIG. 14A corresponds to each of the switching components 1310, 1312 being closed or short-circuited. During the reset phase, the capacitor 1314 is discharged through the first feedback path, and thus the output voltage at point C is initialized or reset to a predetermined reset voltage value. This predetermined reset voltage value may be any suitable predetermined voltage value such as zero volts, for instance. As another example, the predetermined reset voltage value may be a reference voltage that is provided by the reference signal at the reference signal input 1306 or, if the reference signal represents a current value, the predetermined reset voltage value may be a function of and/or proportional to the reference current.

In other words, the reset phase of operation is applied before (and optionally after) a particular sampling time period, which functions to fully discharge the capacitor 1314 such that point A is brought to the predetermined reset voltage value by the amplifier 1302, in accordance with a reference signal provided to the other input of amplifier 1302. The reference signal may represent a reference voltage or current (e.g., constant, predetermined, or controllably modified). Such a reference signal may optionally be set via the controller as discussed herein (e.g., with respect to photodetecting device 300). In the reset phase, any photodiode-generated current provided by the photodiode 1308 is compensated by the amplifier 1302 such that the voltage at point A is maintained (e.g., in accordance with the reference signal).

Turning now to FIG. 15, which illustrates an example of operational phases during a sampling time period that includes several detection windows, in accordance with embodiments of the present disclosure, it is shown that the reset phase is used at the beginning of a sampling time period (e.g., a frame). The example sampling time period as shown in FIG. 15 may thus represent a single frame as discussed herein, which includes three sampling windows for purposes of brevity, although it is noted that a frame may include any suitable number of sampling windows depending upon the particular application, either lower or higher than 3 (e.g., between two and ten, on the order of tens, or on the order of hundreds, etc.).

The sampling time period as shown in FIG. 15 illustrates three graphs overlaid with each operational phase and the accompanying charge accumulated on the capacitor 1314 over several sampling windows in accordance with the embodiments as discussed herein. With reference to FIG. 15, it is assumed that the switching components 1310, 1312 are placed into an "on" (also referred to as "closed" or "conductive") state when the graph is in high position (e.g., in response to a logic high value of an accompanying control signal). It is further assumed that the switching components 1310, 1312 are placed into an "off" (also referred to as "open", or "non-conductive") state when the graph is in low position (e.g., in response to a logic low value of an accompanying control signal). Thus, the upper two graphs represent the logic values of the control signals over time for each of the switching components 1310 (middle graph) and 1312 (top graph) during the sampling time period, whereas the lower graph illustrates the accumulation of the voltage on the capacitor 1314 over time during the sampling time period.

Figure 14B:
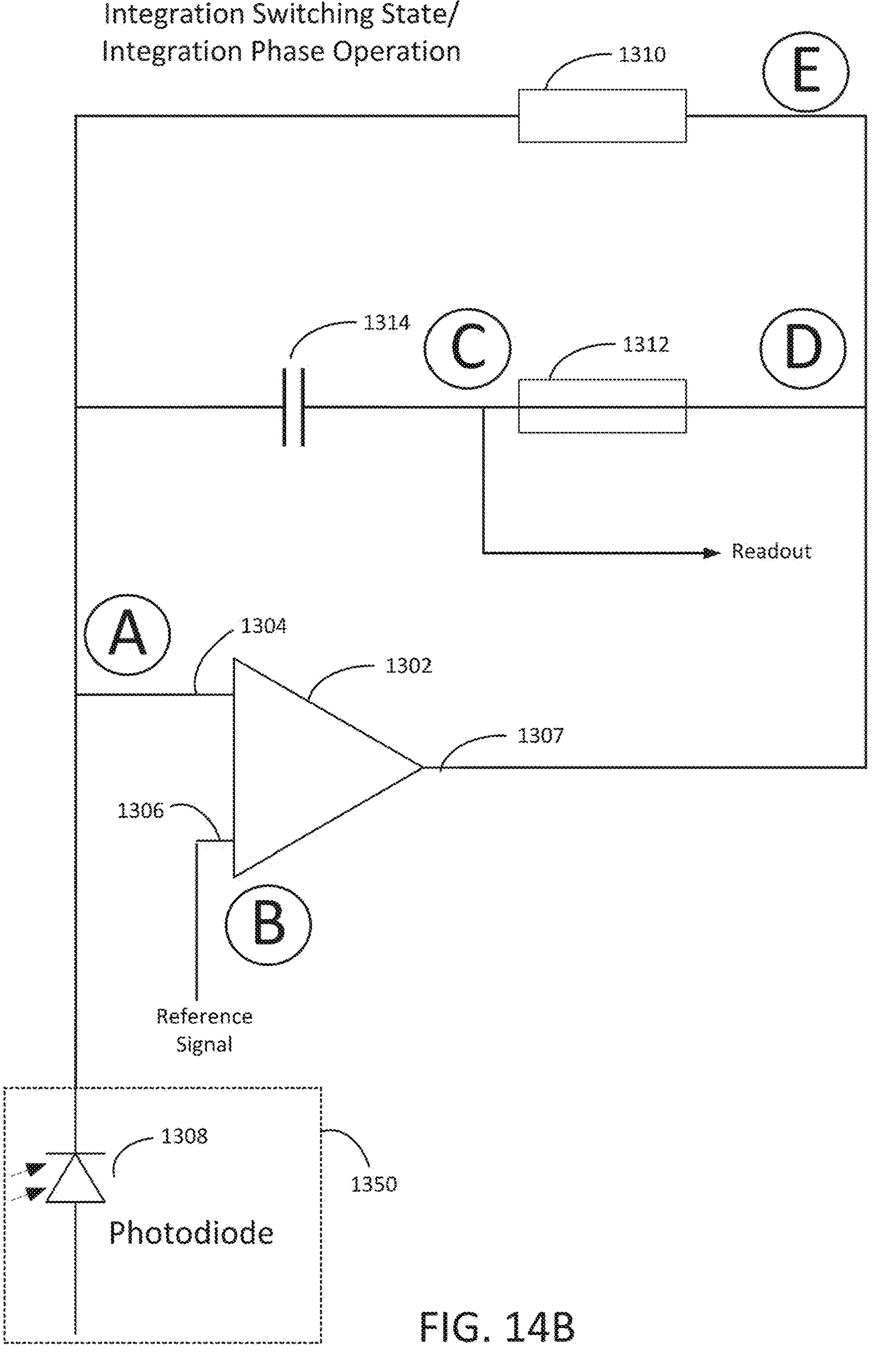

Thus, prior to the photosite readout circuitry 1301 performing a sampling or measurement for the sampling time period as shown in FIG. 15, the first reset phase initially resets the voltage at point A to the predetermined reset voltage value. The next sequential operational phase after the reset phase is shown in FIG. 14B, during which the photosite readout circuitry 1301 is placed into an integration switching state. It is noted that optionally, the photosite readout circuitry 1301 may be switched to a transition phase between the reset phase and the integration phase, but this is not necessarily so. The integration switching state as shown in FIG. 14B corresponds to the switching component 1310 being open, thus disconnecting the first feedback path between the photodiode signal input 1304 and the amplifier output 1307, and the switching component 1312 being closed or short-circuited, thus connecting the second feedback path between the photodiode signal input 1304 and the amplifier output 1307 via the capacitor 1314. During this integration phase, the configuration of the first and second feedback paths in the integration switching state results in the accumulation of a voltage across the capacitor 1314.

Several integration phases are shown in FIG. 15, each corresponding (e.g., are synchronized with) to a different detection window within the sampling time period. During each detection window, charge is collected on the capacitor 1314 as a result of the photodiode-generated current of the photodiode 1308. Again, each detection window may be synchronized with a time period when any suitable number of light pulses generated by the light source as discussed herein is/are to be received by, i.e., impinge upon, the photodiode 1308. Although the integration phase and corresponding detection window is referenced herein with respect to receiving a single light pulse at the photodiode 1308, this is by way of example and not limitation, and the integration phase and corresponding detection window may represent any suitable number of light pulses impinging on the respective photodiode 1308 (e.g., a condense train of pulses emitted within a short time span from one another, which is shorter than an intended detection range of the system, such as 200 meters). Thus, each integration phase may be considered a "light-collecting" mode of operation of the photosite readout circuitry 1301 as noted herein. The time of integration for each light pulse, i.e., the detection window time, may be determined by a controller as discussed herein. For example, the controller may thus synchronize the integration phases of the photosite readout circuitry 1301 in this manner using a priori knowledge of the timing of the light source light pulses and the range of distances that are of interest in being captured depending upon the specific implementation (e.g., between 10 m to 100 m), based on a triggering signal initiating the emission of light, and so on.

Figure 14C:
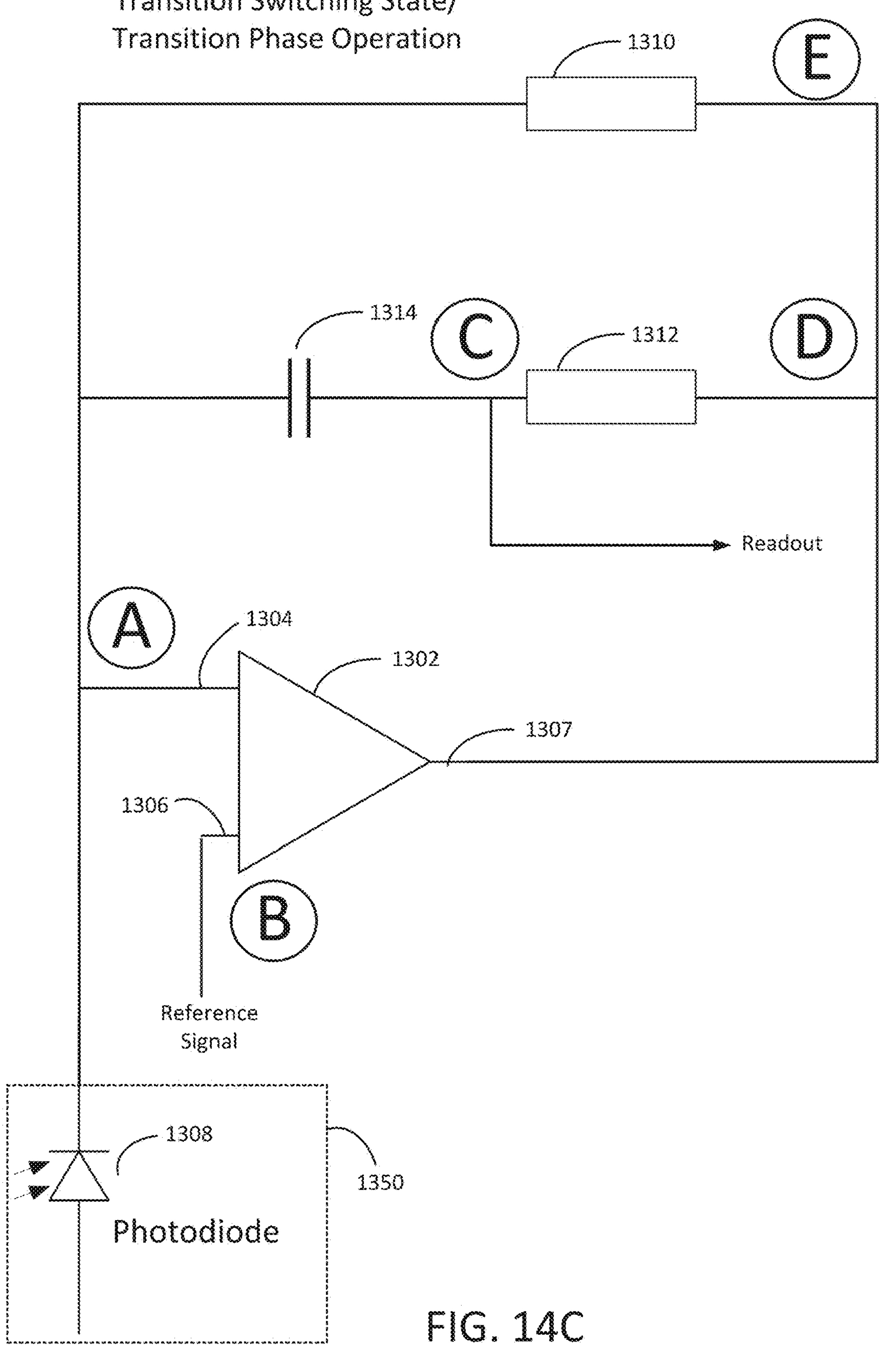

The next sequential operational phase after the integration phase is shown in FIG. 14C, during which the photosite readout circuitry 1301 is placed into a transition switching state. The transition switching state as shown in FIG. 14C corresponds to the switching components 1310, 1312 both being open, thus disconnecting the first feedback path between the photodiode signal input 1304 and the amplifier output 1307, as well as disconnecting the second feedback path between the photodiode signal input 1304 and the amplifier output 1307 via the capacitor 1314. As shown in FIG. 15, the transition phase may be used between an integration phase and a hold phase and/or between a hold phase and an integration phase to prevent a state in which both feedback paths are concurrently on, thereby preventing discharging of the accumulated charge on the capacitor 1314 through the first feedback path when it is not desired (i.e., preventing undesirable occurrences of the reset switching state). It is noted that the hold phase is referred to as such because the accumulated charge on the capacitor 1314 is held (i.e. maintained) during this time period, and thus this time period may be used as a holding time period between adjacent detection windows, as illustrated by the example in FIG. 15 by way of the first two hold phases. However, the time period identified with the hold phase may also be identified with a readout phase in which the readout circuitry may read the voltage value on the capacitor 1314, as illustrated by the example in FIG. 15 by way of the last hold phase. Thus, the hold phase may be identified with either a maintain operation (i.e. a hold operation) or a readout operation, as discussed herein.

Figure 14D:
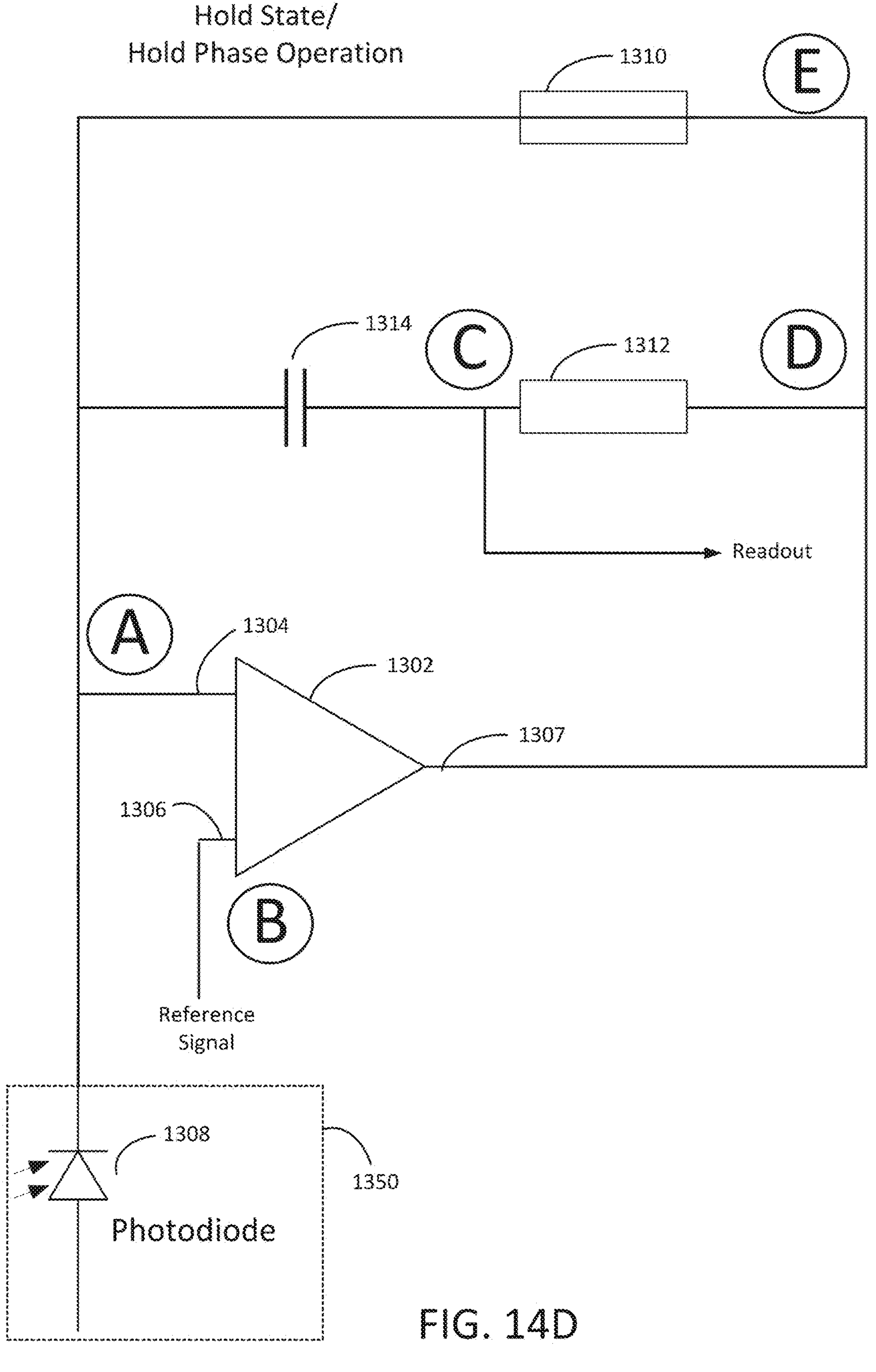

The next sequential operational phase after the transition phase is shown in FIG. 14D, during which the photosite readout circuitry 1301 is placed into a hold switching state. The hold switching state as shown in FIG. 14D corresponds to the switching component 1310 being closed, thus connecting the first feedback path between the photodiode signal input 1304 and the amplifier output 1307, and the switching component 1312 being open, which disconnects the second feedback path between the photodiode signal input 1304 and the amplifier output 1307 via the capacitor 1314. As shown in FIG. 15, the hold phase is also used between adjacent integration phases to hold, or maintain, the integrated charge over the capacitor 1314 so that the readout circuitry may read the voltage value. It is noted that the voltage values read in this manner may alternatively be referred to as detection signals. Moreover, it is noted that while not necessarily so, the transition phases between the integration phase and the hold phase and/or between the hold phase and the integration phase may be very brief in time (e.g., between 1 nanosecond to 1 microsecond), possibly depending on the toggling speed capability of the specific system in which the photosite readout circuitry 1301 is implemented.

The configuration of the switching components 1310, 1312 as shown for the hold phase in FIG. 14D ensures that the accumulated charge across the capacitor 1314 is maintained. The substantially constant voltage across the photodiode 1308 (assuming that the voltage at the other terminal of the photodiode 1308 is maintained constant, or is synchronized with changes in the reference signal provided to the amplifier 1302) is implemented by way of the amplifier 1302 as a result of the first feedback path, i.e., the direct connection between the photodiode signal input 1304 and the amplifier output 1307. The voltage at the point A is held substantially constant during the hold phase (due to the operation of the amplifier 1302 based on the substantially constant reference signal during that time), which keeps the voltage on the terminal (e.g. "plate") of the capacitor 1314 that is connected to the photodiode 1308 also constant, even as the photodiode 1308 continues to emit a current (e.g., due to "dark current," ambient light impinging on the photodiode 1308, etc.). In this way, the readout switching configuration as shown in FIG. 14D ensures that any additional undesired current emitted by the photodiode 1308 does not contribute to a further accumulation of charge across the capacitor 1314 as the voltage across the capacitor 1314 is readout or is simply maintained until the next detection window.

Again, the voltage across the capacitor 1314 may be collected (e.g. read) by the photosite readout circuitry over several successive detection windows. In such a case, the hold phase functions to maintain the voltage on the capacitor 1314 between each consecutive detection window, as shown in FIG. 15, such that the next integration phase results in a further accumulation or integration of the voltage on the capacitor 1314. The configuration of the first and second feedback paths in the hold switching state thus functions to simultaneously maintain a predetermined or constant voltage or current bias (e.g., zero bias, reverse bias, etc.) at the photodiode 1308, thereby preventing ambient or dark current from accumulating in the diode's parasitic capacitance. Again, this is the result of the use of the reference signal as noted above, which may provide a reference voltage or current, as the case may be, at the reference signal input 1306 of the amplifier 1302. Thus, at the same time, the hold switching state configuration also maintains the output of the amplifier 1302 at its working point, e.g., at the predetermined voltage or current reference value, which is set via the controller using the reference signal as discussed herein.

When the voltage across the capacitor 1314 is readout during a hold phase identified with the end of a larger sampling time period (e.g., a frame), the photosite readout circuitry 1301 may operate in accordance with another reset phase to begin sampling for the next successive frame. The voltage across the capacitor 1314 may be readout during the last hold phase of a frame or, optionally, be readout both before and after the reset phase at the end of the frame. For instance, at the end of a particular frame, the voltage across the capacitor 1314 may be first readout during the hold phase as shown in FIG. 14D to obtain a first voltage value, which may be used as the detection signal for that particular frame. Optionally, however, the voltage across the capacitor 1314 may also be readout during the reset phase as shown in FIG. 14A (which may occur after other phases such as the transition phase) to obtain a second voltage value, e.g., zero volts or a predetermined reference voltage value as discussed herein. In accordance with such an operation, the difference between these two signals (i.e., the first voltage measured before the reset phase and the second voltage measured after the draining of the capacitor 1314) is indicative of the amount of light captured by the photodiode 1308 during the relevant frame.

A summary of each of the switching states and corresponding operational phases of the photosite readout circuitry 1301 is shown below in Table 1.

TABLE 1

| Phase | Integrate Switch 1312 | Reset Switch 1310 | Description of phase |
|---|---|---|---|
| Reset | Connected | Connected | Both switches are short circuited, capacitor is discharged and ready for next frame/detection window. |
| Integration | Connected | Disconnected | Light-Collection/integration of photodiode-generated current into the capacitor. |
| Transition | Disconnected | Disconnected | Momentary phase to prevent accumulated charge from discharging through the first feedback path. |
| Hold | Disconnected | Connected | Hold the integrated charge for reading and/or the next integration phase. |

To provide various examples, the duration for each cycle (e.g. between two readouts of the photosite readout circuitry 1301) as well as the duration of any of the aforementioned phases as shown in Table 1 and discussed in further detail herein may be any suitable time period depending upon the particular application. For example, the duration between each cycle may be between 0.01 and 0.1 seconds (which may correspond to 10-100 frames per second, respectively). As another example, the integration phase time duration (e.g. per pulse) may be between 0.1 and 2.0 microseconds (e.g. depending on desired detection range). To provide a further example, the transition phase time duration may be between 1 and 1,000 nanoseconds (e.g. depending on switching technology). As yet another example, the hold phase time duration may be between 1 microsecond and 100 milliseconds (e.g. depending on desired number of pulses, laser emission frequency, FOV illumination considerations (e.g., is the entire FOV illuminated concurrently or in parts)), etc. As an additional example, the reset phase time duration may be any suitable time period depending upon the particular frame rate, application, and duration for each cycle as noted above (e.g. 100 nanoseconds to 100 microseconds). Of course, any of the example durations for each of the operational phases of the photosite readout circuitry 1301 as shown in Table 1 and discussed herein may be shorter or longer depending upon the particular application, the technology implemented, etc.

It is noted that the accumulated voltage may be readout during any one of the hold phases as shown in FIG. 15, which corresponds to the hold switching state as shown in FIG. 14D. Again, the sampling time period shown in FIG. 15 may represent several sampling or detection windows identified with a frame of an imaging sensor, which may operate over several successive frames. In other implementations, the charge may be readout of the photosite in accordance with a timing that is not associated with a transition between frames (e.g., twice a frame, or at a different frequency than adjacent photosites, if any). Thus, the last hold phase as shown in FIG. 15 may be used to read the total accumulated voltage over the duration of several sampling windows. Then, prior to performing sampling over the next frame, the photosite readout circuitry 1301 may be placed into the reset switching state (not shown in FIG. 15) to reset the value of the voltage accumulated over the capacitor 1314 to zero or other predetermined voltage value, as noted above, and the voltage across the capacitor 1314 may optionally be read again during this reset switching state. In this way, the imaging sensor of which the photosite 1300 forms a part is configured to accumulate the voltage across the capacitor 1314 for each one of a set of successive frames by sequentially operating in accordance with the reset switching state, the integration state, the transition state, and the readout state as shown in FIG. 15.

It is further noted that the voltage across the capacitor 1314 may alternatively or additionally be readout during other operational phases (i.e. switching states) of the photosite readout circuitry 1301. For example, and as illustrated in FIG. 15 via the "potential readout" labels, the voltage across the capacitor 1314 may be readout during an integration phase in addition to or instead of during the hold phase as noted above. This may be particularly useful, for instance, during development, testing, calibration, etc., to evaluate the accumulated charge across the capacitor 1314 at specific times within specific detection windows.

FIG. 16 illustrates an electro-optical system, in accordance with embodiments of the present disclosure. The electro-optical system 1600 may implement any combination of features from any one or more of the photodetecting devices as described above with reference to Section I. Additionally or alternatively, the electro-optical system 1600 may implement any suitable number of the photosites 1300 (e.g., 1, 2-10, 10-100, 100-10,000, 10,000-1,000,000, 1M-10M photosites, and so on), which may operate collectively as an imaging sensor 1601 that is implemented by the electro-optical system 1600 to perform imaging in accordance with any suitable type of wavelength, as noted herein. In an embodiment, the imaging sensor 1601 is configured to detect light impinging on one or more photodiodes 1308 in accordance with an SWIR imaging sensor. Such an imaging system may output an image of objects in its field of view (e.g., a SWIR image), a three-dimensional (3D) mapping of objects in its FOV (e.g., LIDAR map, SWIR LIDAR map), and so on.

For instance, the imaging sensor 1601 may include any suitable number of the photosites 1300, each including photosite readout circuitry similar or identical to the photosite readout circuitry 1301 as shown in FIG. 13. Thus, the imaging sensor 1601 may include any suitable number N of photosites that are identified with the photosite 1300 as discussed in this Section and as shown in FIG. 13. Of course, each of the photosites 1300 as shown in FIG. 16 may also include the photosite readout circuitry 1301 and the photodetector 1308 as separate or integrated components. The imaging sensor 1601 may therefore be identified with a detection array, which may include each of the photosites 1300 as discussed in this Section, and may additionally include other photosites not shown in FIG. 16 for purpose of brevity. For example, the detection array identified with the imaging sensor 1601 may include any suitable number of the photosites 1300, and additionally include any suitable number of reference photosites that are kept in the dark at least a portion of the time during operation, such as the reference photosites 310 identified with the area 604 as shown and discussed above in Section I with respect to FIG. 9. The reference photosites may include photosite readout circuitries 1301 (e.g., in order to demonstrate comparable response to dark current), but this is not necessarily so. Optionally, the imaging sensor 1601 may include both photosites 1300 and other types of photosites which do not include the two feedback paths as discussed with respect to photosite readout circuitry 1301.

Thus, the imaging sensor 1601 may be identified with any suitable number of pixels, with each pixel corresponding to at least one (but possibly more) of the photosites 1300. Furthermore, a single photosite 1300 may include more than one photodiode 1308, which may be identical or of different types. Thus, a photosite may be considered a basic unit from which a "pixel value" is read for each sampling time period (e.g. a frame), but a pixel may include multiple photodiodes 1308. Therefore, there may not necessarily be a 1:1 relation between photosites 1300 and pixels. As one example, an image pixel may be based on the output of 2, 4, etc. adjacent photosites 1300 (e.g., in low lighting conditions), and the technique of grouping multiple adjacent photosites in this manner is known as "binning." The output of each photosite 1300 may therefore be indicative of light impinging on any suitable number of corresponding photodiodes. The output of each photosite 1300 implemented by the imaging sensor 1601 may be read separately (e.g., in different frames), or combined in any suitable manner.

For instance, although not shown in FIG. 16 for purposes of brevity, the electro-optical system 1600 may implement any of the components and/or functionality of the PDD 900 or other embodiments as discussed in Section I above. For example, the reference signal as discussed herein with respect to FIG. 13 may be generated and/or determined in response to a reference photosite electric signal that is output by a reference photosite of a detection array to which the photodiode 1308 belongs, and which is shielded from ambient light. The reference signal may be generated for each respective photosite readout circuitry 1301 at any suitable time (e.g., for each frame) using a reference signal received from a respectively coupled or otherwise assigned one of the reference photosites, such as those discussed above in Section I for instance. The reference signal generated by the reference photosite may be adjusted over any suitable time period based upon any suitable conditions such as temperature or other operating conditions. The reference signal generated by the reference photosite may be maintained at a constant value for certain time periods (e.g., for each detection window within a frame) but be adjusted over other time periods (e.g., between successive frames), for instance, such that the reference signal differs in magnitude (e.g., current or voltage value) over two or more successive frames or between other suitable sampling time periods.

The electro-optical system 1600 may additionally include a light source 1604, which is configured to emit light onto the field of view (FoV) of the electro-optical system 1600. Some of the light of light source 1604 is reflected from objects in the FoV and is captured by the photosites 1300, which are exposed to external light during operation of the electro-optical system 1600. The electro-optical system 1600 uses the light detected by the imaging sensor 1601 in this manner to generate an image or another model of the objects. The light source 1604 may be implemented as any suitable type of light source (e.g., pulsed, continuous, modulated, LED, laser, etc.). The operation of the light source 1604 may be controlled by a controller 1602, which may be implemented as the controller 338 as discussed herein in Section I above or as any suitable type of controller, as discussed in further detail below.

The controller 1602 may additionally control operation of each of the photosites 1300 as discussed herein, which may include controlling the amplifier 1302, voltages and/or currents that are supplied to the amplifier 1302 as the reference signal, the switching states of the switching components 1310, 1312, etc. The controller 1602 may additionally control operations of any suitable components of the electro-optical system 1600. The controller 1602 may be implemented, for example, as any suitable type of controller device, microcontroller, processing circuitry, processors, hardware components, executable instructions, or combinations of these. To provide additional examples, the controller 1602 may be implemented as one or more processors fabricated on the same wafer as other components of the electro-optical system 1600 and/or the imaging sensor 1601 (e.g., the photosites 1300). As another example, the controller 1602 may be implemented as one or more processors on a printed circuit board (PCB) connected to such a wafer.

The electro-optical system 1600 may further include a processor 1608 configured to process the detection signals (e.g., the accumulated voltages) output by the photosites 1300. Such processing may include, for example, signal processing, image processing, spectroscopy analysis, and so on. Optionally, processing results by the processor 1608 may be used for modifying operation of the controller 1602 (or another controller). Optionally, the controller 1602 and the processor 1608 may be implemented as a single processing unit.

The electro-optical system 1600 may also include a memory 1610, which may be of any suitable size and type (e.g., a non-volatile memory, RAM, etc.). The electro-optical system 1600 may store processing results of the processor 1608 in the memory 1610 (e.g., for storage or later retrieval), for external systems (e.g., a remote server, or a vehicle computer of a vehicle in which the electro-optical system 1600 is installed, e.g., via a communication circuitry 1612. The processing results stored in the memory 1610 may additionally or alternatively transmitted for display to a display 1614, which may display an image or other type of result (e.g., graph, textual results of spectrograph), another type of output interface (e.g., a speaker, not shown), etc. It is noted that optionally, signals from photosites 1300 may also be processed by processor 1608, for example to assess a condition of the imaging sensor 1601 (e.g., operability, temperature).

The electro-optical system 1600 may also include a power source 1616 (e.g., battery, AC power adapter, DC power adapter, etc.). The power source 1616 may provide power to the photosites 1300 or to any other component of the electro-optical system 1600.

The electro-optical system 1600 may also include optics 1620 for directing light of light source 1604 to the FOV and/or for directing light from the FOV to the photosites 1300. Such optics may include, for example, lenses, mirrors (fixed or movable), prisms, filters, etc.

The electro-optical system 1600 may also include reference signal generating circuitry 1640, which may be coupled to one or more of the photosites 1300. The reference signal generating circuitry 1640 may be implemented as the control-voltage generating circuitry 340 discussed above with reference to Section I. Alternatively, the reference signal generating circuitry 1640 may be implemented with any suitable number and/or type of hardware components to provide a reference current or voltage signal to the reference signal input 1306 of the amplifier 1302 of one or more of the photosites 1300 that constitute the imaging sensor 1601. For example, the reference signal generating circuitry 1640 may be implemented as any suitable type of voltage- and/or current-controlled voltage or current source (e.g., a VCCS, a CCCS, a CCVS, a VCVS, etc.). As another example, the reference signal generating circuitry 1640 may generate the reference signal in response to a reference photosite electric signal that is output by a reference photosite of a detection array, as noted above. Again, the reference signal may be a voltage or current signal that is maintained at the same voltage or current level for certain sampling time durations (e.g., each detection window within a frame), but which may be adjusted for others (e.g., between frames). The reference signal may be generated with properties (e.g. current or voltage magnitudes) that are selected at specific times based upon specific operating conditions such as ambient light levels, temperature, etc. The reference signal generating circuitry 1640 may be controlled via the controller 1602.

The electro-optical system 1600 may also include readout circuitry 1640. The readout circuitry 1640 may be implemented as the readout circuitry 610 discussed above with reference to Section I. Alternatively, the readout circuitry 1640 may be implemented with any suitable number and/or type of hardware components to read the detection signals (e.g., the accumulated voltages) from the photosites 1300, to provide the detection signals to the controller 1602 and/or the processor 1608 for further processing (e.g., in order to reduce noise, for image processing, etc.), to store the detection signals in the memory 1610, or for any other suitable purpose.

For example, the readout circuitry 1650 may temporally arrange the readout values (e.g., the accumulated voltage values) of the different photosites 1300 sequentially (e.g., after some processing by one or more processors 1608) before providing the readout values for further processing, storage, or any other action. The readout circuitry 1650 may be implemented as one or more components fabricated on the same wafer as other components of the electro-optical system 1600 (e.g., the photosites 1300). Optionally, the readout circuitry 1650 may be implemented as one or more components on a printed circuit board (PCB) connected to such a wafer. It is noted that a readout circuitry such as readout circuitry 1650 may be implemented in any of the photodetecting devices discussed in Section I above (e.g., PDDs 300, 700, 800, and 900). The readout circuitry 1650 may be implemented as a microcontroller, processing circuitry, processors, hardware components, executable instructions, or combinations of these.

For instance, the readout circuitry 1650 may include one or more analog-to-digital converters (ADCs) and/or components to perform for analog signal processing to digitize the detection signals. Additionally or alternatively, the readout circuitry 1650 may perform weighting (amplification), offset, and/or binning (combining output signals from two or more photosites 1300). Digitization of the detection signals may be implemented on the electro-optical system 1600 or the readout circuitry 1650 may be external to the electro-optical system 1600 and perform the same functions as described herein.

Again, the imaging sensor 1601 may include any suitable number of photosite readout circuitries 1301 as discussed above, and each photosite readout circuitry 1301 of the imaging sensor 1601 may accumulate the voltage across its respective capacitor 1314 during each sampling window of a larger overall sampling time period, such as a frame for instance. The controller 1602 may control the switching states of each of the photosites 1300 of the imaging sensor 1601, or organized subsets thereof such as rows or columns, e.g., as discussed in further detail herein. Furthermore, the readout circuitry 1650 may be coupled to each one of the photosites 1300 and respective photosite readout circuitries 1301 that are implemented by the imaging sensor 1601. Thus, the readout circuitry 1650 is configured to measure the accumulation of the voltage across each respective capacitor 1314 of each photosite readout circuitry 1301 during any of the hold phases, as discussed herein.

In any event, the controller 1602 may optionally function to synchronize the switching states of any suitable portion of the photosites 1300 of the imaging sensor 1601 with respect to each sampling window and/or with respect to each successive sampling time period (e.g., successive frames). This synchronization may function to control each photosite 1300 in the imaging sensor 1601 in a similar manner as discussed above with reference to FIG. 15, i.e., by sequentially operating each one of a set of the photosites 1300 (e.g., a row, column, etc.) in accordance with the reset switching state, the integration state, the transition state, and the readout state as shown in FIG. 15. To do so, the controller 1602 may be configured to control the respective set of switches (e.g., 1310, 1312) identified with each respective photosite 1300 implemented by the imaging sensor 1601 such that the switching state operation of the entirety of the photosite readout circuitries 1301 or predetermined groups thereof (e.g., rows, columns, etc.) are synchronized with one another. As an illustrative example, the controller 1602 may control the switching state of the entirety of the photosite readout circuitries 1301 or predetermined groups thereof (e.g., rows, columns, etc.) such that each photosite readout circuitry 1301 operates in accordance with the reset phase, the integration phase, the transition phase, and/or the hold phase at the same time as one another.

Thus, the controller 1602 may control the switching states of each readout circuitry 1301 implemented by the imaging sensor 1601 in accordance with any suitable pattern, schedule, etc., based upon the particular application. For instance, the controller 1602 may control the timing of each readout circuitry 1301 implemented by the imaging sensor 1601 to facilitate a line-by-line reset (e.g., row-by-row or column-by-column), exposure, and reading sequence, which may be used as part of the implementation of the imaging sensor 1601 in accordance with a rolling shutter. As another example, the controller 1602 may control each readout circuitry 1301 implemented by the imaging sensor 1601 using a global reset and integration sequence. In such a case, the switching states of each of the readout circuitries 1301 may be synchronized with one another, but the measured voltage across the capacitor of each photosite readout circuitry 1301 may be read out line-by-line (e.g., row-by-row or column-by-column), which may be used as part of the implementation of the imaging sensor 1601 in accordance with a global shutter.

FIG. 17 illustrates a process flow, in accordance with examples of the present disclosure. With reference to FIG. 17, the process flow 1700 may be a computer-implemented method executed by and/or otherwise associated with one or more processors (processing circuitry) and/or storage devices. These processors and/or storage devices may be associated with one or more computing components identified with an electro-optical device (such as one or more components of the electro-optical device 1600 as shown in FIG. 16, e.g., the controller 1602, the readout circuitry 1650, the processor 1608, etc.). Optionally, the process flow 1700 may be executed by one or more such components by using dedicated hardware and/or by reading executable instructions stored in a suitable memory or other storage device (e.g., the memory 1610). The various processes of the flow 1700 may be implemented in combination and/or shared among one or more of these components of the electro-optical device 1600 as shown in FIG. 16, or other suitable components of other devices that are not shown in the Figures.

When executing machine-readable or other suitable instructions, the one or more components as discussed herein may execute instructions stored on other computer-readable storage mediums not shown in the Figures (which may be, for example, locally-stored instructions and/or as part of the processing circuitries themselves). The process flow 1700 may include alternate or additional steps that are not shown in FIG. 17 for purposes of brevity, and may be performed in a different order than those shown in FIG. 17.

The flow 1700 may represent, for example, a method for operating a sensor (e.g., the imaging sensor 1601) that includes a photosite readout circuity (e.g., photosite readout circuity 1301) comprising an amplifier (e.g., amplifier 1302) having a photodiode signal input (e.g. photodiode signal input 1304), a reference signal input (e.g. reference signal input 1306), and an amplifier output (e.g. amplifier output 1307).

The process flow 1700 may include controlling (block 1701) the activation of a light source to generate a plurality of light pulses. This may include, for instance, the controller 1602 controlling the light source 1604 to generate a plurality of light pulses of any suitable wavelength, as discussed herein. The generation and timing of the light pulses in this manner may be controlled in parallel with and/or synchronized with the other acts of the process flow 1700 as shown in FIG. 17, as further discussed below.

The process flow 1700 may include controlling (block 1702A) a plurality of switches to selectively connect or disconnect a first feedback path that couples the photodiode signal input and the amplifier output, and to selectively connect or disconnect a second feedback path that couples the photodiode signal input to the amplifier output via a capacitor. This may include, for instance, the controller 1602 controlling the state of the switching components 1310, 1312 via one or more electrical control signals, as discussed above with reference to FIG. 13. The first feedback path may represent the direct connection between the photodiode signal input 1304 and the amplifier output 1307 (excluding the capacitor 1314), and the second feedback path may represent the connection between the photodiode signal input 1304 and the amplifier output 1307 including the capacitor 1314. An example of controlling the plurality of switches may include placing the photosite readout circuitry 1301 into the various switching states as shown in FIGS. 14A-14D to operate in accordance with the corresponding operational phases as shown in FIG. 15, as discussed herein and further below.

The process flow 1700 may further include receiving (block 1704), during a first phase corresponding to a first switching state, a photodiode-generated current that results in an accumulation of a voltage across the capacitor 1314. The photodiode-generated current may be received by one or more of the photodiode readout circuitries 1301 that form part of the imaging sensor 1601 as noted herein. This first switching state may correspond, for instance, to the integration phase as shown in FIG. 14B, in which the first feedback path is disconnected and the second feedback path is connected.

Furthermore, and as noted above, each photosite readout circuitry 1301 of the imaging sensor 1601 may be configured to perform sampling over successive detection windows during an overall larger sampling time period, such as a frame for instance. The process flow 1700 may include a determination (block 1706) of whether a sampling time period (e.g., a frame) has ended. If not, then the flow 1700 may repeat the act of controlling (block 1702A) the plurality of switches, which may include, in this example, placing the photosite readout circuitry 1301 into the transition switching state, the hold switching state, and another transition switching state between adjacent detection windows, and then placing the photosite readout circuitry 1301 into the integration switching state to continue to receive (block 1704) the photodiode-generated current during the integration phase for the next detection window, as discussed above with reference to FIG. 15. Thus, the blocks 1702A, 1704, and 1706 may be repeated for any suitable number of successive detection windows.

In this way, the imaging sensor 1601 may be operated (e.g., via the controller 1602) such that the photosite readout circuitry 1301 accumulates the voltage across the capacitor 1314 for each one of a set of separated detection windows. The photosite readout circuitry 1301 may thus be placed into the hold switching state between each adjacent one of the set sequence (e.g. a set) of separated detection windows, as shown in FIG. 15. As discussed herein, each of the sequence of detection windows may correspond to a sampling time period in which reflections of one or more of the plurality of light pulses impinges on the photodiode 1308. Thus, the act of controlling (block 1701) the light source to generate the light pulses as noted above may include synchronizing the generation of the light pulses with each of the reset phase, the integration phase, the transition phase, and the hold phase based upon a predetermined detection range associated with the sensor 1601. For example, using knowledge of the predetermined range (e.g. a maximum range) to a target object, the time when the light is expected to arrive at a photosite 1308, which may be used as the basis for operation of the photosite readout circuitry 1301 in the integration phase, may be calculated from the time when one or more respective light pulses were generated. As one example, this calculation may be represented in Equation 1 as follows:

$$T = 2\left(\frac{d}{v}\right), \qquad \text{Eqn. 1}$$

with T representing the time for the respective light pulse to reach the photosite 1308, d representing the desired predetermined range between the photodiode 1308 and the target object to be detected, v representing the speed of light in air or relevant medium, and the constant 2 being used from the light having to travel to the target object and to return to the photodiode 1308 via reflection.

However, if the sampling time period (e.g., frame) has ended (block 1706 'Y'), then another act of controlling (block 1702B) the plurality of switches is performed. In this case, however, the photosite readout circuitry 1301 may be placed into the transition switching state and the hold switching state prior to measuring (block 1708) the accumulation of voltage across the capacitor 1314. Thus measuring (block 1708) may thus include, during a second phase corresponding to a second switching state, the accumulation of the voltage across the capacitor 1314. The accumulated voltage may include, for instance, the voltage at point C of the photosite readout circuitry 1301 as shown in FIG. 13. The second switching state may correspond, for instance, to the hold phase as shown in FIG. 14D, in which the first feedback path is connected and the second feedback path is disconnected. Again, and as noted above, during the measuring (block 1708), the connection of the first feedback path causes the accumulation of the voltage across the capacitor 1314 to be maintained while a bias voltage at the photodiode signal input 1304 is maintained at a constant voltage level.

In any event, once the measurement (block 1708) has been completed, then another act of controlling (block 1702A) the plurality of switches is performed. In this case, however, the photosite readout circuitry 1301 may be placed into the transition switching state and the hold switching state prior to being placed into the reset switching state (or optionally placed directly into the reset switching state), in which both the first feedback path and the second feedback path are connected. Again, this reset switching state may correspond to the voltage across the capacitor being reset to zero volts or other suitable voltage value, and correspond to the next sampling time period (e.g., the next frame). Thus, the blocks 1702A, 1704, 1706, 1702B, and 1708 may be repeated for any suitable number of successive sampling time periods (e.g., frames). In this way, the sensor 1601 may be sequentially operated in accordance with the reset phase, the integration phase, the transition phase, and the hold phase measure the accumulated voltage across the capacitor 1314 for each one of a set of successive frames.

Thus, the act of measuring (block 1708) the accumulated voltage across the capacitor 1314 during the hold phase may represent the measurement of an accumulation of the voltage across the capacitor 1314 at the end of a particular frame from among the set of successive frames. This measurement may include another measurement (not shown) that occurs after the reset phase, at which time the voltage across the capacitor 1314 at the end of the frame is reset to zero volts or other predetermined value. That is, although only one measurement block (1708) is shown in FIG. 17, it is noted that the measurement may include two separate measurements as noted above, e.g., one during the hold phase (e.g., at the end of a frame), and another during the reset phase (e.g., prior to starting the next successive frame), with the difference between the two readout detection signals being used as the measurement, indicative of an amount of detectable light impinging on the photodiode during a sequence of detection windows (but not between them). Thus, the measurement of the accumulated voltage across the capacitor 1314 during a particular frame may be determined using a difference between the accumulation of the voltage across the capacitor 1314 during the hold phase and during the reset phase, which again is indicative of an amount of light captured by the photosite readout circuitry 1301 during that particular frame. Of course, the measurement (block 1708) of the accumulated voltage across the capacitor 1314 is not limited to only the end of each frame, and may be readout during any hold phase, as shown in FIG. 15 by each indicated potential readout time period.

FIG. 18 illustrates a process flow, in accordance with one or more embodiments of the present disclosure. With reference to FIG. 18, the process flow 1800 may be a computer-implemented method executed by and/or otherwise associated with one or more processors (processing circuitry) and/or storage devices. These processors and/or storage devices may be associated with one or more computing components identified with an electro-optical device (such as one or more components of the electro-optical device 1600 as shown in FIG. 16, e.g., the controller 1602, the readout circuitry 1650, the processor 1608, etc.). Optionally, the process flow 1800 may be executed by one or more such components using dedicated hardware and/or by reading executable instructions stored in a suitable memory or other storage device (e.g., the memory 1610). The various processes of the process flow 1800 may be implemented in combination and/or shared among one or more of these components of the electro-optical device 1600 as shown in FIG. 16, or other suitable components of other devices that are not shown in the Figures. The various processes of the process flow 1800 may be implemented in combination and/or shared among one or more of the components of photosite readout circuitry 1301 as shown in FIG. 13, or other suitable components of other devices that are not shown in the Figures.

When executing machine-readable or other suitable instructions, the one or more components as discussed herein may execute instructions stored on other computer-readable storage mediums not shown in the Figures (which may be locally-stored instructions and/or as part of the processing circuitries themselves). The process flow 1800 may include alternate or additional steps that are not shown in FIG. 18 for purposes of brevity, and may be performed in a different order than the steps shown in FIG. 18.

The flow 1800 may represent, for example, a method for detecting light collected by a one or more photodiodes (e.g., the photodiode 1308), and may be with respect to the photosite readout circuitry 1301 as shown and discussed in this Section with respect to FIG. 13, for example.

The process flow 1800 may include controlling (block 1801) the activation of a light source to generate a plurality of light pulses. This may include, for instance, the controller 1602 controlling the light source 1604 to generate a plurality of light pulses of any suitable wavelength, as discussed herein. The generation and timing of the light pulses in this manner may be controlled in parallel with and/or synchronized with the other acts of the process flow 1800 as shown in FIG. 18, as further discussed below.

The flow 1800 may include continuously providing (block 1802) a photodiode-generated current generated by a photodiode to a first input (e.g., the photodiode signal input 1304) of an amplifier (e.g., amplifier 1302) while providing a reference signal to a second input (e.g., the reference signal input 1306) of the amplifier. The various blocks as shown in FIG. 18 that constitute the process flow 1800 may occur concurrently with continuously providing the photodiode-generated current (i.e., any combination of one or more of stages 1804, 1806, 1808, 1810, 1812, and 1814 may be executed concurrently with execution of stage 1802), and may occur in the sequential order as shown or in any other suitable order.

The process flow 1800 may include connecting (block 1804) for a first detection duration, a second feedback path between an amplifier output (e.g., amplifier output 1307) of the amplifier and the photodiode signal input via a capacitor (e.g., capacitor 1314) for collecting, on the capacitor, a first charge that corresponds to an integration of the photodiode-generated current over the first detection duration. This first detection duration may include, for instance, a detection window that corresponds to the photodiode-readout circuitry 1302 operating in accordance with the integration phase and corresponding switching state, as shown in FIG. 14B. The first detection duration may be synchronized (e.g., via the controller 1602) with an emission of one or more first light pulses (e.g., via the light source 1604) towards a target, as discussed herein (e.g., the one or more first light pulses corresponding to a first detection duration).

The flow 1800 may include, for example, after collecting (block 1804) the first charge on the capacitor, disconnecting (block 1806), for a first idle duration, the second feedback path, and connecting (block 1086) the amplifier output to the photodiode signal input via a first feedback path that excludes the capacitor. This first idle duration may correspond to, for instance, the photodiode-readout circuitry 1302 operating in accordance with the hold phase and corresponding switching state, as shown in FIG. 14D.

The flow 1800 may include, after the first idle duration, connecting (block 1808), for a second detection duration, the second feedback path for collecting, on the capacitor, a second charge that corresponds to an integration of the photodiode-generated current over the second detection duration. This second detection duration may include, for instance, the next consecutive detection window that corresponds to the photodiode-readout circuitry 1302 operating in accordance with the next integration phase and corresponding switching state, as shown in FIG. 14B. For example, the first detection duration may correspond to one of the integration phases as shown in FIG. 15, whereas the second detection duration may correspond to a subsequent (e.g., adjacent or next) integration phase within the sampling time period. The second detection duration may be synchronized (e.g., via the controller 1602) with an emission of at least one second light pulse (e.g. via the light source 1604) towards a target, as discussed herein (e.g., the at least one second light pulse corresponding to a second detection duration). Thus, the first charge and the second charge may each correspond to an accumulation of charge due the photodiode-generated current as a result of the light of the at least one first light pulse and light of the at least one second light pulse, respectively, being reflected off the target and impinging onto the photodiode 1308.

The flow 1800 may include, after collecting the second charge on the capacitor, disconnecting (block 1810), for a second idle duration, the second feedback path and connecting (block 1810) the amplifier output to the photodiode signal input via the first feedback path. This second idle duration may correspond to, for instance, the photodiode-readout circuitry 1302 operating in accordance with the next hold phase and corresponding switching state, as shown in FIG. 14D. For example, the first idle duration may correspond to one of the hold phases as shown in FIG. 15, whereas the second idle duration may correspond to a subsequent (e.g., adjacent or next, or somewhat later) hold phase within the sampling time period.

The act of disconnecting the second feedback path during the first idle duration and the second idle duration (blocks 1806, 1810) may include disconnecting the capacitor 1314 from the photodiode-generated current. In doing so, the hold phase may also function to prevent saturation of the capacitor 1314 by the photodiode-generated current during the first and the second idle durations. Moreover, connecting (block 1806, 1810) the amplifier output to the photodiode signal input via the first feedback path during the first idle duration and the second idle duration maintains an operational bias over the photodiode 1308 during each of the first and the second idle durations (e.g., during the two hold phases), as discussed herein.

The flow 1800 may include, during the second idle duration, connecting (block 1812) the capacitor to a readout circuitry for sampling, from the capacitor, a first electric signal having a magnitude corresponding to a sum of the first charge and the second charge. This connection may include, for instance, the photodiode-readout circuitry 1301 operating in accordance with the next hold phase as discussed above for block 1810, and further include readout circuitry (e.g., the readout circuitry 1650) measuring the electric signal that represents the voltage across the capacitor 1314 during this next hold phase. Because the transition and hold phases of operation between consecutive detection windows ensure that the accumulated charge on the capacitor 1314 does not diminish, the voltage measured across the capacitor 1314 during the next hold phase represents a sum or aggregation of the voltage accumulated over the capacitor 1314 during all previous detection windows since the most resent reset phase.

The flow 1800 may include, for example, determining (block 1814), based on the first electric signal, an amount of light impinging on the photodiode during the first detection duration and the second detection duration. Again, because the accumulated charge on the capacitor 1314 does not diminish between adjacent detection windows, the first electric signal is indicative of (e.g., proportional to or a function thereof that is predetermined) the aggregation of the total amount of light impinging on the photodiode 1308 during the previous detection windows (e.g., the previous integration phases).

Again, and as discussed above with reference to FIG. 15, the photosite readout circuitry 1301 may repeat the process of sequentially alternating operation between the integration phase, the transition phase, and the hold phase over a number of detection windows, which may constitute part of a larger sampling time period such as a frame. The photosite readout circuitry 1301 may additionally be placed into the reset phase at the end of such a sampling time period. Thus, although not shown in FIG. 18 for purposes of brevity, the flow 1800 may further include electrically coupling, after the second idle duration, a first terminal of the capacitor 1314 to a second terminal of the capacitor 1314 to deplete a voltage across the capacitor 1314. This may be implemented for instance via closure of the switching element 1310 during the reset switching state as shown in FIG. 14A.

Additionally, although not shown in FIG. 18 for purposes of brevity, the process flow 1800 may further include sampling, by the readout circuitry (e.g., the readout circuitry 1650), a second electric signal indicative of a voltage on at least one terminal of the capacitor 1314 when the first terminal and the second terminal are connected. In other words, the readout circuitry 1650 may read the voltage level during the reset switching state, during which the voltage should be reset to zero volts or other predetermined voltage value. Doing so enables the readout circuitry 1650 to measure a "baseline" of the voltage accumulated across the capacitor 1314 when no light is impinging the photodiode 1308. Thus, the act of determining (block 1814) the amount of light impinging on the photodiode during the first detection duration and the second detection duration may be further based on the second electric signal, i.e., by taking a difference between the first electric signal measured during the second idle duration (i.e., the hold phase) and the second electric signal measured after the second idle duration (e.g., during the reset phase).

Again, the detection windows noted herein may constitute part of a longer sampling time period, such as a frame, which may alternatively be referred to herein as a detection frame. Thus, the process flow 1800 may be repeated for each detection frame. This may include, for instance, performing the blocks 1802-1814 to determine a first amount of light impinging on the photodiode 1308 during a first detection frame, determining a second amount of light impinging on the photodiode 1308 during a second detection frame that is later than the first detection frame, determining a third amount of light impinging on the photodiode 1308 during a third detection frame that is later than the first detection frame, etc.

The process flow 1800 may further include, as part of this repeated process, applying, to the second input (e.g. the reference signal input 1306) of the amplifier (e.g. the amplifier 1302) during the first frame, a first reference signal that is determined in response to a first reference photosite electric signal that is output by a reference photosite of a detection array to which the photodiode belongs, and which is shielded from ambient light, as discussed above with respect to FIG. 16. Then, for a subsequent second frame, a second, different reference signal may be applied to the second input, which is determined in response to a second reference photosite electric signal that is output by the reference photosite. Then, for a subsequent third frame, a third and different reference signal may be applied to the second input, which is determined in response to a third reference photosite electric signal that is output by the reference photosite. This process may be performed by the controller 1602 to cause the reference signal generating circuitry 1640 to provide the different reference signals based upon temperature or other operating conditions, as noted herein. The process may be repeated any suitable number of times over successive frames, with the reference signal being adjusted on a per-frame basis as noted herein.

EXAMPLES

The following examples pertain to various aspects of the presently disclosed subject matter.

Example 1. A photodetecting device, comprising: an active photosite comprising an active photodiode; a reference photosite comprising a reference photodiode; a first voltage controlled current circuit that includes a voltage-controlled current source or a voltage-controlled current sink, the first voltage controlled current circuit coupled to the active photodiode; and control-voltage generating circuitry coupled to the active voltage controlled current circuit and to the reference photosite and used to provide to the voltage controlled current circuit a control voltage having a voltage level that is responsive to dark current of the reference photodiode, to reduce an effect of dark current of the active photodiode on an output of the active photosite.

Example 2. The photodetecting device of Example 1, wherein the control-voltage generating circuitry comprises an amplifier for providing the control voltage.

Example 3. The photodetecting device of any combination of Examples 1-2, wherein the photodetecting device comprises a reference voltage controlled current circuit that includes a voltage-controlled current source or a voltage-controlled current sink, the reference voltage controlled current circuit coupled to the reference photodiode, wherein a first input of the amplifier is supplied with a first input voltage and wherein a second input of the amplifier is electrically coupled between the reference photodiode and the reference voltage controlled current circuit.

Example 4. The photodetecting device of any combination of Examples 1-3, wherein the first voltage controlled current circuit and the reference voltage controlled current circuit are coupled to an output of the amplifier, and the amplifier continuously reduces a difference between an output of the reference voltage controlled circuit and the first input voltage, thereby generating the control voltage.

Example 5. The photodetecting device of any combination of Examples 1-4, wherein the photodetecting device comprises: a plurality of active photosites, each active photosite comprising an active photodiode, a plurality of reference photosites, each reference photosite comprising a plurality of reference photodiodes, a plurality of first voltage controlled current circuits, each first voltage controlled current circuit coupled to at least one of the active photodiodes, and a plurality of reference voltage controlled current circuits, each reference voltage controlled current circuit coupled to at least one of the reference photodiodes, wherein the second input of the amplifier is electrically coupled to each of the reference photodiodes, and wherein the control voltage is supplied to each of the plurality of first voltage controlled current circuits.

Example 6. The photodetecting device of any combination of Examples 1-5, wherein different active photodiodes concurrently generate different levels of dark current, wherein different reference photodiodes concurrently generate different levels of dark current, and wherein the control-voltage generating circuitry provides to the different active photodiodes a same control voltage based on averaging of the differing dark currents of the reference photodiodes.

Example 7. The photodetecting device of any combination of Examples 1-6, wherein the photodetecting device comprises a plurality of first voltage controlled current circuits, the plurality of first voltage controlled current circuits comprising at least one voltage-controlled current source collectively coupled to each active photosite and at least one voltage-controlled current sink collectively coupled to each active photosite, and wherein the control-voltage generating circuitry includes: a first amplifier coupled to the at least one voltage-controlled current source for providing at a first time a first control voltage to the plurality of active photosites, a second amplifier coupled to the at least one voltage-controlled current sink for providing at a second time a second control voltage to the plurality of active photosites, and switching circuitry for selecting between providing of the first control voltage and providing of the second control voltage.

Example 8. The photodetecting device of any combination of Examples 1-7, further comprising a controller for providing the first input voltage, wherein the first input voltage has a level that is determined corresponding to a bias on the active photodiode.

Example 9. The photodetecting device of any combination of Examples 1-8, wherein the controller provides the first input voltage such that a bias on the reference photodiode is substantially the same as a bias on the active photodiode.

Example 10. The photodetecting device of any combination of Examples 1-9, comprising a physical barrier preventing light from a field of view of the photodetecting device from reaching the reference photodiodes.

Example 11. The photodetecting device of any combination of Examples 1-10, comprising a plurality of photosites and a controller for setting at least one photosite of the plurality of photosites to operate as an active photosite or as a reference photosite.

Example 12. The photodetecting device of any combination of Examples 1-11, wherein the photodetecting device comprises: a plurality of active photosites, each comprising an active photodiode, a plurality of reference photosites, each comprising a plurality of reference photodiodes, a plurality of first voltage controlled current circuits, each coupled to at least one of the active photodiodes, and a plurality of reference voltage controlled current circuits, each coupled to at least one of the reference photodiodes, wherein when the photodetecting device operates at a first temperature, the control-voltage generating circuitry provides to the voltage controlled current circuit a first control voltage for providing a current at a first level in response to dark currents of the plurality of reference photodiodes to reduce effect of dark currents of the active photodiodes on output of the active photosites, wherein when the photodetecting device operates at a second temperature higher than the first temperature, the control-voltage generating circuitry provides to the voltage controlled current circuit a second control voltage for providing a current at a second level in response to dark currents of the plurality of reference photodiodes to reduce effect of dark currents of the active photodiodes on output of the active photosites, wherein the second level is larger in magnitude than the first level.

Example 13. The photodetecting device of any combination of Examples 1-12, comprising: a plurality of active photosites, each comprising an active photodiode; a plurality of reference photosites, each comprising a plurality of reference photodiodes; a plurality of first voltage controlled current circuits, each coupled to at least one of the active photodiodes; a plurality of reference voltage controlled current circuits, each coupled to at least one of the reference photodiodes; optics for directing light from a field of view of the photodetecting device to the plurality photosite; a power source for providing power to the active photosites, to the reference photosites, and to the amplifier; readout circuitry for providing detection information in response to detection signals of the active photosites; a processor for processing the detection information to provide an image of at least object in the field of view; and a memory module for storing at least one of the detection information and the detection signals.

Example 14. A photosite readout circuitry, comprising: an amplifier having a photodiode signal input, a reference signal input, and an amplifier output; a first switch configured to selectively connect or disconnect a first feedback path that couples the photodiode signal input and the amplifier output; and a second switch configured to selectively connect or disconnect a second feedback path that couples the photodiode signal input to the amplifier output via a capacitor, wherein the photodiode signal input is configured to receive a photodiode-generated current that results in an accumulation of a voltage across the capacitor when the photosite readout circuitry is in a first switching state, wherein the accumulation of the voltage across the capacitor is maintained when the photosite readout circuitry is in a second switching state, wherein, in the first switching state, the first switch disconnects the first feedback path and the second switch connects the second feedback path, and wherein, in the second switching state, the first switch connects the first feedback path and the second switch disconnects the second feedback path.

Example 15. The photosite readout circuitry of Example 14, wherein, in the second switching state, the connection of the first feedback path causes the accumulation of the voltage across the capacitor to be maintained while a bias voltage at the photodiode signal input is maintained at a constant voltage level.

Example 16. The photosite readout circuitry of any combination of Examples 14-15, wherein, in a third switching state, the first switch connects the first feedback path, and the second switch connects the second feedback path, and wherein the third switching state corresponds to the voltage across the capacitor being reset to zero volts.

Example 17. The photosite readout circuitry of any combination of Examples 14-16, wherein the photosite readout circuitry is configured to accumulate the voltage across the capacitor during each detection window of a set of separate detection windows, the first switch and the second switch causing the photosite readout circuitry to, between each adjacent one of the set of separate detection windows, operate in accordance with the second switching state.

Example 18. The photosite readout circuitry of any combination of Examples 14-17, wherein the photosite readout circuitry is part of an imaging sensor and is configured to accumulate the voltage across the capacitor for each one of a set of successive frames by sequentially operating in accordance with the first, the second, and the third switching states, wherein the sequential operation of the first, the second, and the third switching states are synchronized with at least one other photosite readout circuitry of the imaging sensor.

Example 19. The photosite readout circuitry of any combination of Examples 14-18, wherein the photosite readout circuitry is from among a plurality of photosite readout circuitries of a shortwave infrared (SWIR) imaging sensor.

Example 20. An electro-optical system, comprising: a plurality of photosite readout circuitries, each photosite readout circuitry from among the plurality of photosite readout circuitries comprising: an amplifier having a photodiode signal input, a reference signal input, and an amplifier output; and a plurality of switches configured to (i) selectively connect or disconnect a first feedback path that couples the photodiode signal input to the amplifier output, and (ii) selectively connect or disconnect a second feedback path that couples the photodiode signal input to the amplifier output via a capacitor, wherein the photodiode signal input is configured to receive a photodiode-generated current that results in an accumulation of a voltage across the capacitor when the photosite readout circuitry is in a first switching state, the accumulation of the voltage across the capacitor being maintained when the photosite readout circuity is in a second switching state; a controller configured to, for each one of the plurality of photosites: control the plurality of switches to (i) operate the electro-optical system during the first switching state by disconnecting the first feedback path and connecting the second feedback path, and (ii) operate the electro-optical system during the second switching state by connecting the first feedback path and disconnecting the second feedback path; and readout circuitry configured to, for each one of the plurality of photosites, measure the accumulation of the voltage across the capacitor during one of the first switching state or the second switching state.

Example 21. The electro-optical system of Example 20, wherein for each photosite readout circuitry from among the plurality of photosite readout circuitries, in the second switching state the connection of the first feedback path of a respective photosite readout circuity causes the accumulation of the voltage across the capacitor of the respective photosite readout circuity to be maintained while a bias voltage at the photodiode signal input of the respective photosite readout circuity is maintained at a constant voltage level.

Example 22. The electro-optical system of any combination of Examples 20-21, wherein the controller is configured to control the plurality of switches for each photosite readout circuity from among the plurality of photosite readout circuities to operate the electro-optical system in a third switching state to couple a photodiode signal input of each respective photosite readout circuity to the amplifier output of each respective photosite readout circuity by connecting the first feedback path of each respective photosite readout circuity and the second feedback path of each respective photosite readout circuity, and wherein the third switching state corresponds to the voltage across the capacitor of each respective photosite readout circuity being reset to zero volts.

Example 23. The electro-optical system of any combination of Examples 20-22, further comprising: a light source configured to generate a plurality of light pulses, wherein each photosite readout circuity from among the plurality of photosite readout circuities is configured to accumulate the voltage across the capacitor of each respective photosite readout circuity for each one of a sequence of detection windows, each detection window of the sequence of detection windows corresponding to a sampling time period in which each respective one of the plurality of light pulses impinges on a photodiode coupled to each respective photosite readout circuity.

Example 24. The electro-optical system of any combination of Examples 20-23 wherein, between each adjacent detection window of the sequence of detection windows, each photosite readout circuity from among the plurality of photosite readout circuities operates in accordance with the second switching state.

Example 25. The electro-optical system of any combination of Examples 20-24, wherein the plurality of photosite readout circuities are part of an imaging sensor, and wherein the controller is configured to cause each photosite readout circuity from among the plurality of photosite readout circuities to accumulate the voltage across the capacitor of each respective photosite readout circuity for each one of a set of successive frames by sequentially operating the imaging sensor in accordance with the first, the second, and the third switching states.

Example 26. The electro-optical system of any combination of Examples 20-25, wherein the controller is configured to control a respective plurality of switches identified with each respective photosite readout circuity from among the plurality of photosite readout circuities to synchronize the operation of each respective photosite readout circuity in accordance with the first switching state and the second switching state.

Example 27. A method for operating a sensor that includes a photosite readout circuity including an amplifier having a photodiode signal input, a reference signal input, and an amplifier output, the method comprising: controlling a plurality of switches to (i) selectively connect or disconnect a first feedback path that couples the photodiode signal input and the amplifier output, and (ii) selectively connect or disconnect a second feedback path that couples the photodiode signal input to the amplifier output via a capacitor; receiving, during a first phase corresponding to a first switching state, a photodiode-generated current that results in an accumulation of a voltage across the capacitor, the first switching state corresponding to the first feedback path being disconnected and the second feedback path being connected; measuring, during one of the first phase or a second phase corresponding to a second switching state, the accumulation of the voltage across the capacitor, the second switching state corresponding to the first feedback path being connected and the second feedback path being disconnected.

Example 28. The method of Example 27, wherein, in the second switching state, the connection of the first feedback path causes the accumulation of the voltage across the capacitor to be maintained while a bias voltage at the photodiode signal input is maintained at a constant voltage level.

Example 29. The method of any combination of Examples 27-28, further comprising: operating the sensor in third phase corresponding to a third switching state by connecting, via the plurality of switches, the first feedback path and the second feedback path, wherein the third switching state corresponds to the voltage across the capacitor being reset to zero volts.

Example 30. The method of any combination of Examples 27-29, further comprising: operating the sensor to accumulate the voltage across the capacitor for each one of a sequence of separate detection windows, wherein the photosite readout circuity, is placed in the second switching state between each adjacent one of the sequence of separate detection windows.

Example 31. The method of any combination of Examples 27-30, further comprising: sequentially operating the sensor in accordance with the first, the second, and the third switching states to accumulate the voltage across the capacitor for each one of a set of successive frames.

Example 32. The method of any combination of Examples 27-31, wherein measuring the accumulation of the voltage across the capacitor comprises: measuring, during the second phase, the accumulation of the voltage across the capacitor at the end of a first frame from among the set of successive frames; and measuring, during the third phase, the voltage across the capacitor at the end of the first frame being reset to zero volts, wherein the difference between the accumulation of the voltage across the capacitor during the second phase and the third phase is indicative of an amount of light captured by the photosite readout circuity during the first frame.

Example 33. The method of any combination of Examples 27-32, further comprising: controlling activation of a light source to generate a plurality of light pulses; and operating the sensor to accumulate the voltage across the capacitor for each one of a sequence of detection windows, each detection window of the sequence of detection windows corresponding to a sampling time period in which each respective one of the plurality of light pulses impinges on a photodiode that is coupled to the photodiode signal input.

Example 34. The method of any combination of Examples 27-33, further comprising: wherein controlling the activation of the light source comprises synchronizing the generation of the plurality of light pulses with the first, the second, and the third phases based upon a predetermined detection range associated with the sensor.

Example 35. A method for detecting light collected by a photodiode, the method comprising: continuously providing a photodiode-generated current generated by the photodiode to a first input of an amplifier while providing a reference signal to a second input of the amplifier and, during the continuously providing of the photodiode-generated current: connecting, for a first detection duration, a second feedback path between an amplifier output of the amplifier and the photodiode signal input via a capacitor for collecting, on the capacitor, a first charge that corresponds to an integration of the photodiode-generated current over the first detection duration; after collecting the first charge on the capacitor, disconnecting, for a first idle duration, the second feedback path, and connecting the amplifier output to the photodiode signal input via a first feedback path that excludes the capacitor; after the first idle duration, connecting, for a second detection duration, the second feedback path for collecting, on the capacitor, a second charge that corresponds to an integration of the photodiode-generated current over the second detection duration; after collecting the second charge on the capacitor, disconnecting, for a second idle duration, the second feedback path and connecting the amplifier output to the photodiode signal input via the first feedback path; during the second idle duration, connecting the capacitor to a readout circuitry for sampling, from the capacitor, a first electric signal having a magnitude corresponding to a sum of the first charge and the second charge; and determining, based on the first electric signal, an amount of light impinging on the photodiode during the first detection duration and the second detection duration.

Example 36. The method according to Example 35, comprising: electrically coupling, after the second idle duration, a first terminal of the capacitor to a second terminal of the capacitor to deplete a voltage across the capacitor; and sampling, by the readout circuitry, a second electric signal indicative of a voltage on at least one terminal of the capacitor when the first terminal and the second terminal are connected, wherein the act of determining the amount of light impinging on the photodiode during the first detection duration and the second detection duration is further based on the second electric signal.

Example 37. The method of any combination of Examples 35-36, further comprising: synchronizing the first detection duration with an emission of a first light pulse towards a target; and synchronizing the second detection duration with an emission of a second light pulse toward the target, wherein the first charge and the second charge correspond to light of the first light pulse and light of the second light pulse, respectively, which is reflected off the target toward the photodiode.

Example 38. The method of any combination of Examples 35-37, wherein the act of disconnecting the second feedback path during the first idle duration and the second idle duration includes disconnecting the capacitor from the photodiode-generated current to prevent saturation of the capacitor by the photodiode-generated current during at least the second idle duration.

Example 39. The method of any combination of any combination of Examples 35-38, wherein the act of connecting the amplifier output to the photodiode signal input via the first feedback path during the first idle duration maintains an operational bias over the photodiode during the first idle duration.

Example 40. The method of any combination of any combination of Examples 35-39, comprising: determining a first amount of light impinging on the photodiode during a first detection frame; determining a second amount of light impinging on the photodiode during a second detection frame that is later than the first detection frame; determining a third amount of light impinging on the photodiode during a third detection frame that is later than the first detection frame; and applying, to the second input of the amplifier during the first frame, a first reference signal that is determined in response to a first reference photosite electric signal that is output by a reference photosite of a detection array to which the photodiode belongs, and which is shielded from ambient light; applying, to the second input during the second frame, a second reference signal determined in response to a second reference photosite electric signal that is output by the reference photosite; and applying, to the second input during the third detection frame, a third reference signal determined in response to a third reference photosite electric signal that is output by the reference photosite, wherein the first reference signal, the second reference signal, and the third reference signal differ from one another.

An apparatus as shown and described.

A method as shown and described.

CONCLUSION

While this disclosure has been described in terms of certain embodiments and generally associated methods, alterations and permutations of the embodiments and methods will be apparent to those skilled in the art. For example and optionally, a single photosite may include more than a single photodiode, e.g., if a different spectral filter is placed in front of different photodiodes. If different photodiodes (e.g., for different ranges) are used, a separate feedback circuit may be implemented for all photodiodes of the same kind. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A photosite readout circuitry, comprising:

an amplifier having a photodiode signal input, a reference signal input, and an amplifier output;

a first switch configured to selectively connect or disconnect a first feedback path that couples the photodiode signal input and the amplifier output; and a second switch configured to selectively connect or disconnect a second feedback path that couples the photodiode signal input to the amplifier output via a capacitor, wherein the photodiode signal input is configured to receive a photodiode-generated current that results in an accumulation of a voltage across the capacitor when the photosite readout circuitry is in a first switching state, wherein the accumulation of the voltage across the capacitor is maintained when the photosite readout circuitry is in a second switching state, wherein, in the first switching state, the first switch disconnects the first feedback path and the second switch connects the second feedback path, and wherein, in the second switching state, the first switch connects the first feedback path and the second switch disconnects the second feedback path.

2. The photosite readout circuitry of claim 1, wherein, in the second switching state, the connection of the first feedback path causes the accumulation of the voltage across the capacitor to be maintained while a bias voltage at the photodiode signal input is maintained at a constant voltage level.

3. The photosite readout circuitry of claim 1, wherein, in a third switching state, the first switch connects the first feedback path, and the second switch connects the second feedback path, and wherein the third switching state corresponds to the voltage across the capacitor being reset to zero volts.

4. The photosite readout circuitry of claim 1, wherein the photosite readout circuitry is configured to accumulate the voltage across the capacitor during each detection window of a set of separate detection windows, the first switch and the second switch causing the photosite readout circuitry to, between each adjacent one of the set of separate detection windows, operate in accordance with the second switching state.

5. The photosite readout circuitry of claim 3, wherein the photosite readout circuitry is part of an imaging sensor and is configured to accumulate the voltage across the capacitor for each one of a set of successive frames by sequentially operating in accordance with the first, the second, and the third switching states, wherein the sequential operation of the first, the second, and the third switching states are synchronized with at least one other photosite readout circuitry of the imaging sensor.

6. The photosite of claim 1, wherein the photosite readout circuitry is from among a plurality of photosite readout circuitries of a shortwave infrared (SWIR) imaging sensor.

7. An electro-optical system, comprising:

a plurality of photosite readout circuitries, each photosite readout circuitry from among the plurality of photosite readout circuitries comprising:

an amplifier having a photodiode signal input, a reference signal input, and an amplifier output; and a plurality of switches configured to (i) selectively connect or disconnect a first feedback path that couples the photodiode signal input to the amplifier output, and (ii) selectively connect or disconnect a second feedback path that couples the photodiode signal input to the amplifier output via a capacitor, wherein the photodiode signal input is configured to receive a photodiode-generated current that results in an accumulation of a voltage across the capacitor when the photosite readout circuitry is in a first switching state, the accumulation of the voltage across the capacitor being maintained when the photosite readout circuitry is in a second switching state;

a controller configured to, for each one of the plurality of photosites:

control the plurality of switches to (i) operate the electro-optical system during the first switching state by disconnecting the first feedback path and connecting the second feedback path, and (ii) operate the electro-optical system during the second switching state by connecting the first feedback path and disconnecting the second feedback path; and readout circuitry configured to, for each one of the plurality of photosites, measure the accumulation of the voltage across the capacitor during one of the first switching state or the second switching state.

8. The electro-optical system of claim 7, wherein for each photosite readout circuitry from among the plurality of photosite readout circuitries, in the second switching state the connection of the first feedback path of a respective photosite readout circuitry causes the accumulation of the voltage across the capacitor of the respective photosite readout circuitry to be maintained while a bias voltage at the photodiode signal input of the respective photosite readout circuitry is maintained at a constant voltage level.

9. The electro-optical system of claim 7, wherein the controller is configured to control the plurality of switches for each photosite readout circuitry from among the plurality of photosite readout circuities to operate the electro-optical system in a third switching state to couple a photodiode signal input of each respective photosite readout circuitry to the amplifier output of each respective photosite readout circuitry by connecting the first feedback path of each respective photosite readout circuitry and the second feedback path of each respective photosite readout circuitry, and wherein the third switching state corresponds to the voltage across the capacitor of each respective photosite readout circuitry being reset to zero volts.

10. The electro-optical system of claim 7, further comprising:

a light source configured to generate a plurality of light pulses, wherein each photosite readout circuitry from among the plurality of photosite readout circuities is configured to accumulate the voltage across the capacitor of each respective photosite readout circuitry for each one of a sequence of detection windows, each detection window of the sequence of detection windows corresponding to a sampling time period in which each respective one of the plurality of light pulses impinges on a photodiode coupled to each respective photosite readout circuitry.

11. The electro-optical system of claim 10, wherein, between each adjacent detection window of the sequence of detection windows, each photosite readout circuitry from among the plurality of photosite readout circuities operates in accordance with the second switching state.

12. The electro-optical system of claim 7, wherein the plurality of photosite readout circuities are part of an imaging sensor, and wherein the controller is configured to cause each photosite readout circuitry from among the plurality of photosite readout circuities to accumulate the voltage across the capacitor of each respective photosite readout circuitry for each one of a set of successive frames by sequentially operating the imaging sensor in accordance with the first, the second, and the third switching states.

13. The electro-optical system of claim 7, wherein the controller is configured to control a respective plurality of switches identified with each respective photosite readout circuitry from among the plurality of photosite readout circuities to synchronize the operation of each respective photosite readout circuitry in accordance with the first switching state and the second switching state.

14. A method for operating a sensor that includes a photosite readout circuitry including an amplifier having a photodiode signal input, a reference signal input, and an amplifier output, the method comprising:

controlling a plurality of switches to (i) selectively connect or disconnect a first feedback path that couples the photodiode signal input and the amplifier output, and (ii) selectively connect or disconnect a second feedback path that couples the photodiode signal input to the amplifier output via a capacitor;

receiving, during a first phase corresponding to a first switching state, a photodiode-generated current that results in an accumulation of a voltage across the capacitor, the first switching state corresponding to the first feedback path being disconnected and the second feedback path being connected;

measuring, during one of the first phase or a second phase corresponding to a second switching state, the accumulation of the voltage across the capacitor, the second switching state corresponding to the first feedback path being connected and the second feedback path being disconnected.

15. The method of claim 14, wherein, in the second switching state, the connection of the first feedback path causes the accumulation of the voltage across the capacitor to be maintained while a bias voltage at the photodiode signal input is maintained at a constant voltage level.

16. The method of claim 14, further comprising: operating the sensor in a third phase corresponding to a third switching state by connecting, via the plurality of switches, the first feedback path and the second feedback path, wherein the third switching state corresponds to the voltage across the capacitor being reset to zero volts.

17. The method of claim 14, further comprising:

operating the sensor to accumulate the voltage across the capacitor for each one of a sequence of separate detection windows, wherein the photosite readout circuitry, is placed in the second switching state between each adjacent one of the sequence of separate detection windows.

18. The method of claim 16, further comprising:

sequentially operating the sensor in accordance with the first, the second, and the third switching states to accumulate the voltage across the capacitor for each one of a set of successive frames.

19. The method of claim 18, wherein measuring the accumulation of the voltage across the capacitor comprises:

measuring, during the second phase, the accumulation of the voltage across the capacitor at the end of a first frame from among the set of successive frames; and measuring, during the third phase, the voltage across the capacitor at the end of the first frame being reset to zero volts, wherein the difference between the accumulation of the voltage across the capacitor during the second phase and the third phase is indicative of an amount of light captured by the photosite readout circuitry during the first frame.

20. The method of claim 16, further comprising: controlling activation of a light source to generate a plurality of light pulses; and operating the sensor to accumulate the voltage across the capacitor for each one of a sequence of detection windows, each detection window of the sequence of detection windows corresponding to a sampling time period in which each respective one of the plurality of light pulses impinges on a photodiode that is coupled to the photodiode signal input.

21. The method of claim 20, further comprising:

wherein controlling the activation of the light source comprises synchronizing the generation of the plurality of light pulses with the first, the second, and the third phases based upon a predetermined detection range associated with the sensor.

* * * * *